United States Patent [19]
Pechanek et al.

[11] Patent Number: 5,517,596
[45] Date of Patent: May 14, 1996

[54] LEARNING MACHINE SYNAPSE PROCESSOR SYSTEM APPARATUS

[75] Inventors: Gerald G. Pechanek, Endwell; Stamatis Vassiliadis; Jose G. Delgado-Frias, both of Vestal, all of N.Y.

[73] Assignee: International Business Machines Corporation, Armonk, N.Y.

[21] Appl. No.: 161,839

[22] Filed: Dec. 1, 1993

Related U.S. Application Data

[62] Division of Ser. No. 79,697, Jun. 18, 1993, abandoned, which is a continuation of Ser. No. 702,261, May 17, 1991, abandoned.

[51] Int. Cl.$^6$ .................................................. G06F 15/18
[52] U.S. Cl. ................................................. 395/23; 395/27
[58] Field of Search ................................. 395/24, 23, 27

[56] References Cited

U.S. PATENT DOCUMENTS

| | | | |
|---|---|---|---|
| 4,874,963 | 10/1989 | Alspector | 395/24 |
| 5,021,988 | 6/1991 | Mashiko | 395/24 |
| 5,075,889 | 12/1991 | Jousselin et al. | 395/27 |
| 5,148,514 | 9/1992 | Arima et al. | 395/24 |
| 5,187,680 | 2/1993 | Engeler | 395/24 |

OTHER PUBLICATIONS

Kung, et al, "A Unifying Algorithm/Architecture Proc. Int'l. Conf for Artificial Neural Networks," ASSP, vol. 4, 1989, 2505–2508.

Kub, et al, "Programmable Analog Vector–Matrix Multipliers," IEEE Jour. Solid–State Circuits, Feb. 1990, 207–214.

IEEE, Jan., 1988, "Mapping Signal Processing Algorithms To Fixed Architectures", V2.10, by Stewart, pp. 2037–2040.

*Primary Examiner*—Robert W. Downs
*Attorney, Agent, or Firm*—Eugene I. Shkurko

[57] ABSTRACT

A Neural synapse processor apparatus having a neuron architecture for the synapse processing elements of the apparatus. The apparatus which we prefer will have a N neuron structure having synapse processing units that contain instruction and data storage units, receive instructions and data, and execute instructions. The N neuron structure should contain communicating adder trees, neuron activation function units, and an arrangement for communicating both instructions, data, and the outputs of neuron activation function units back to the input synapse processing units by means of the communicating adder trees. The apparatus can be structured as a bit-serial or word parallel system. The preferred structure contains $N^2$ synapse processing units, each associated with a connection weight in the N neural network to be emulated, placed in the form of a N by N matrix that has been folded along the diagonal and made up of diagonal cells and general cells. Diagonal cells, each utilizing a single synapse processing unit, are associated with the diagonal connection weights of the folded N by N connection weight matrix and general cells, each of which has two synapse processing units merged together, and which are associated with the symmetric connection weights of the folded N by N connection weight matrix. The back-propagation learning algorithm is first discussed followed by a presentation of the learning machine synapse processor architecture. An example implementation of the back-propagation learning algorithm is then presented. This is followed by a Boltzmann like machine example and data parallel examples mapped onto the architecture.

8 Claims, 79 Drawing Sheets

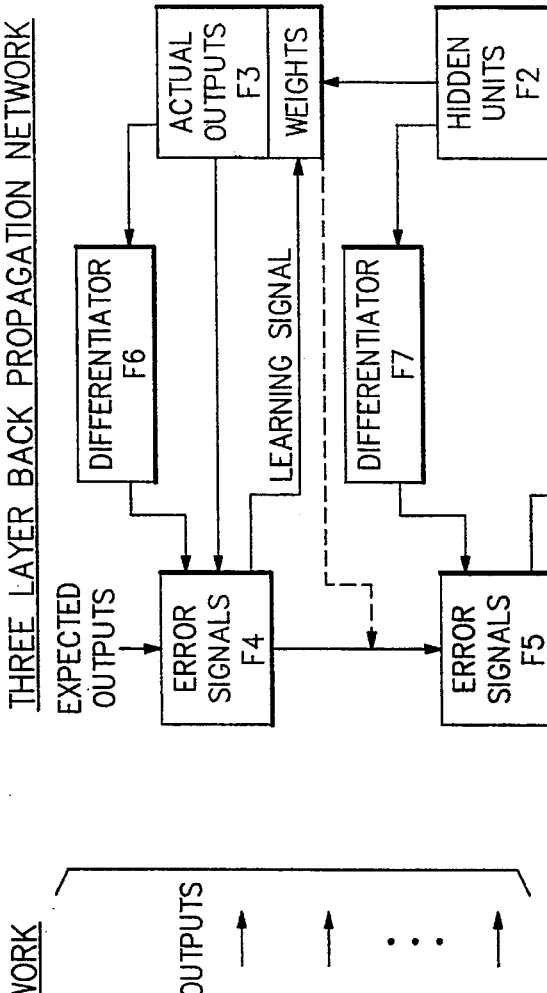
FIG.2 THREE LAYER BACK PROPAGATION NETWORK
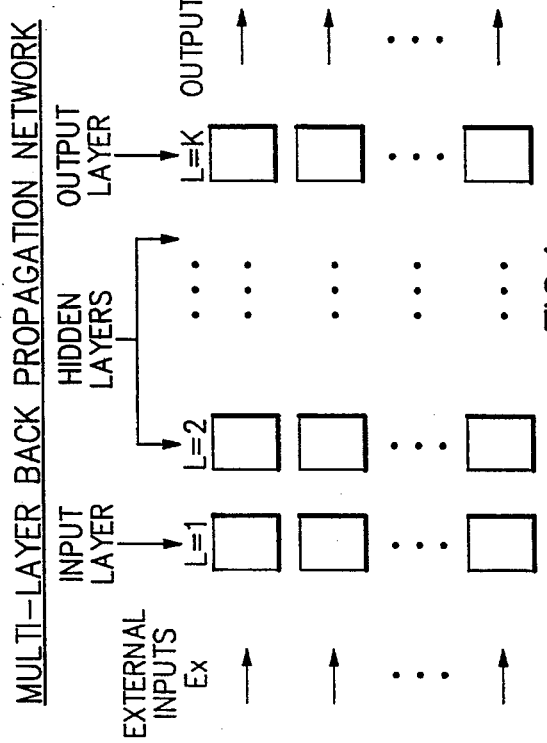
FIG.1 MULTI-LAYER BACK PROPAGATION NETWORK
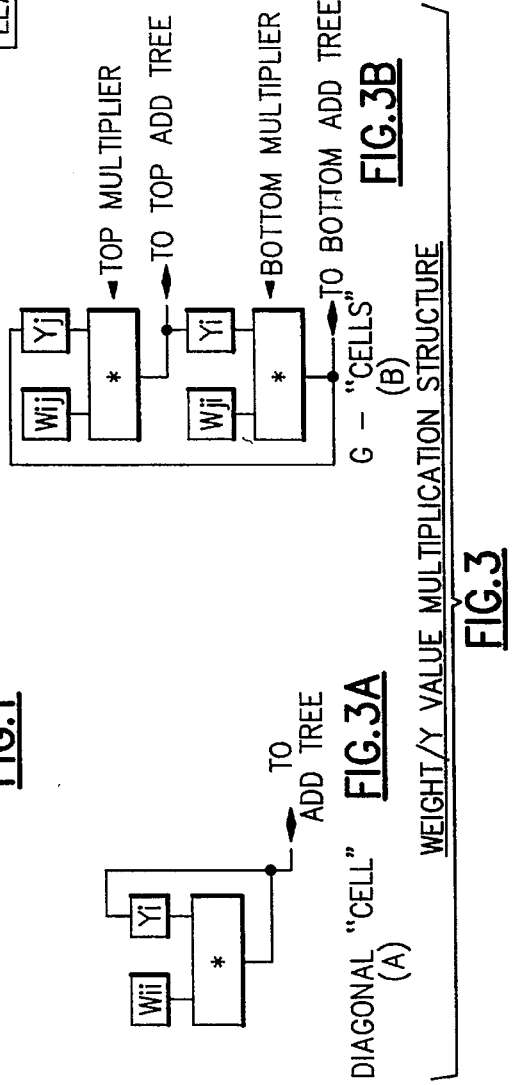
FIG.3 WEIGHT/Y VALUE MULTIPLICATION STRUCTURE

SYNAPSE PROCESSOR ARCHITECTURE

DIAGONAL SYNAPSE PROCESSOR (DSYP)

SYNAPSE PROCESSOR ARCHITECTURE

G — GENERAL SYNAPSE PROCESSOR (GSYP)

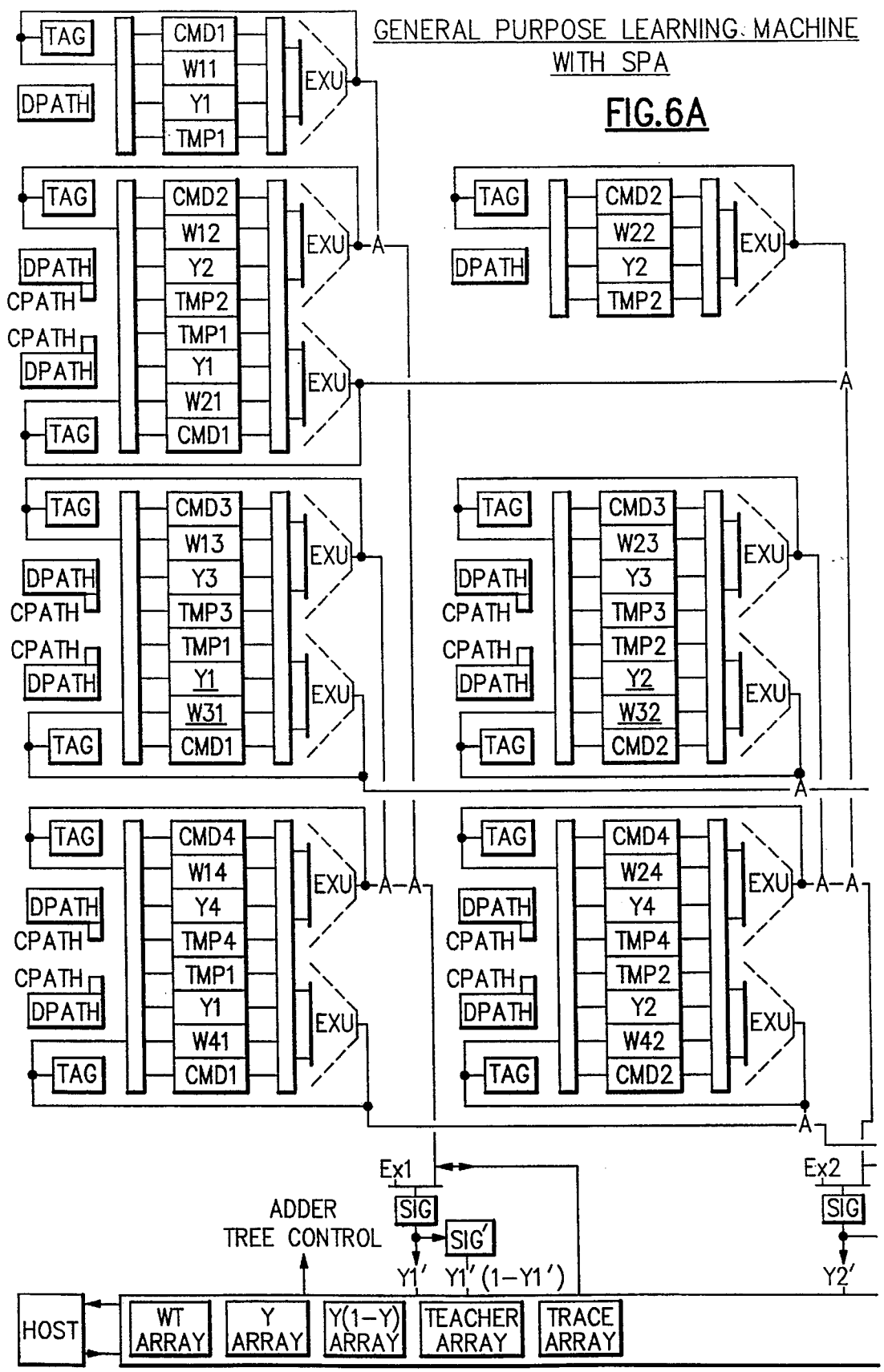

SYNAPSE PROCESSOR ARCHITECTURE IMPLEMENTED ON GPLM

| FIG. 9A | FIG. 9B | FIG. 9C | FIG. 9D | FIG. 9E | FIG. 9F |

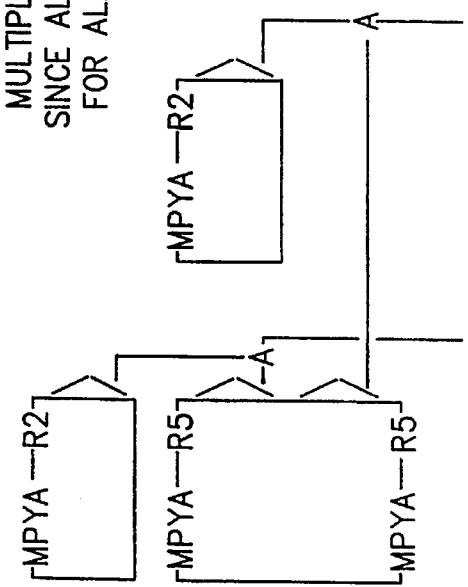

FIG.10

INITIALIZATION AND FIRST LAYER EXECUTION

NEURONS 1, 2, ..., 11 ISSUE MPYA R2*R2 → ALU TREE
CMDS RECEIVED FROM THE TOP ALU TREE GO TO CR2 AND
CMDS RECEIVED FROM THE BOTTOM ALU TREE GO TO CR2
(RELATIVE ADDRESSING ASSUMED)
ON FIRST RECEIPT OF MPYA INSTRUCTION ALL NEURONS
MULTIPLY R2 * R2 AND SEND THE RESULTS TO THEIR ALU TREE.
SINCE ALL Y VALUES ARE INITIALIZED TO ZERO THE SUMMATION
FOR ALL NEURONS PRODUCE A ZERO RESULT.

FIG.10A

SECOND LAYER EXECUTION

SYNAPSE PROCESSORS NOW ONLY MULTIPLY R1 * R2 UPON RECEIPT OF DATA FROM THE ALU TREES, SINCE ONLY NEURONS Y1 AND Y2 OUTPUT VALUES ARE THE RETURNED DATA ONLY THOSE SYNAPSE PROCESSORS RECEIVING Y1 AND Y2 DO THE MULTIPLY PRODUCING THE SUMMATION REQUIRED FOR Y3.

| FIG. 11A | FIG. 11B | FIG. 11C | FIG. 11E |
|---|---|---|---|
|  |  | FIG. 11D | FIG. 11F |

| FIG. 12A | FIG. 12B | FIG. 12C | FIG. 12D |
|---|---|---|---|
| | | FIG. 12E | FIG. 12F |

THIRD LAYER EXECUTION

ONLY THE SYNAPSE PROCESSORS RECEIVING Y3 DO THE MULTIPLY CREATING THE SUMMATIONS REQUIRED TO PRODUCE Y4, Y5, Y6, AND Y7.

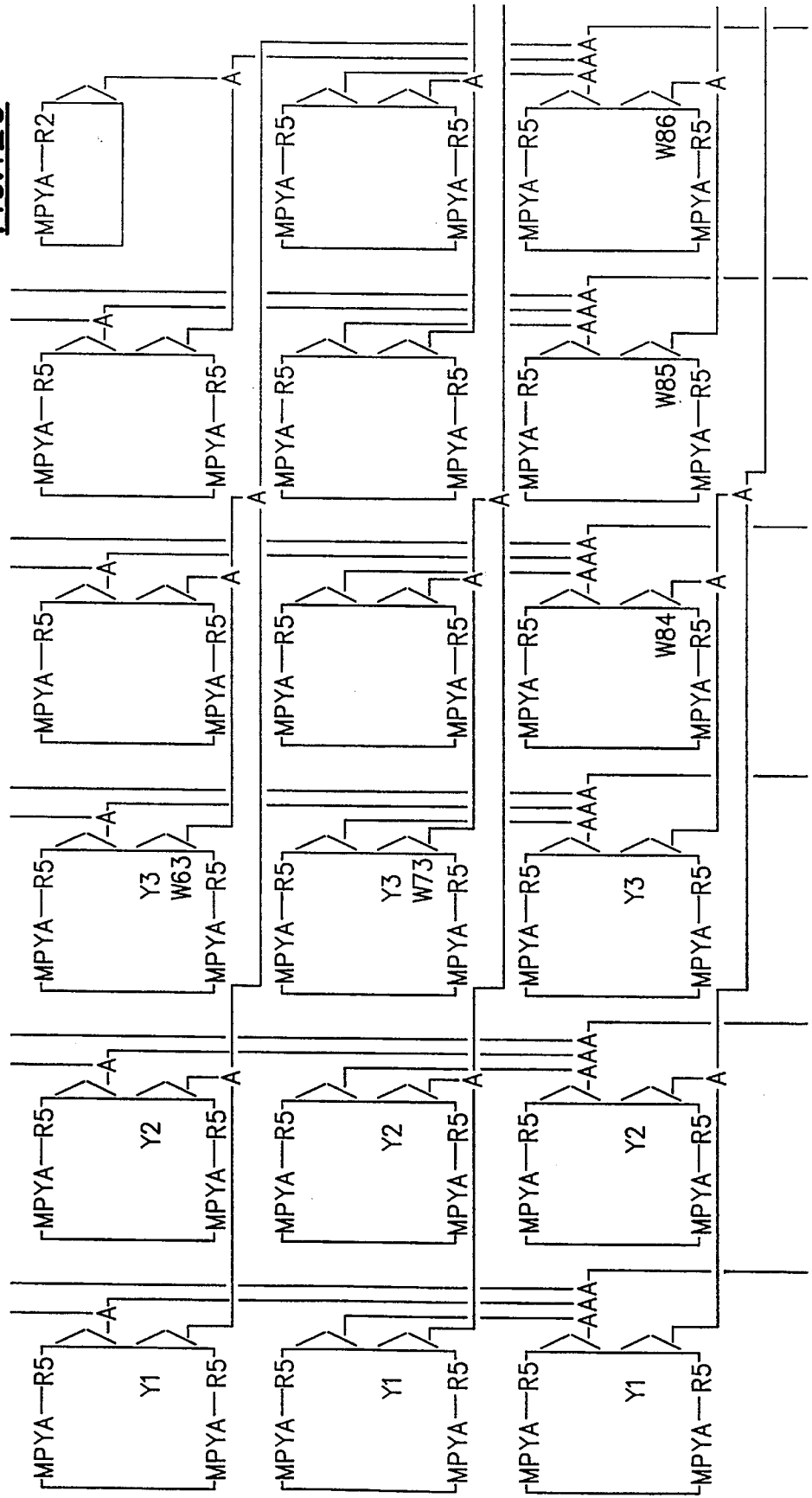

D=DELAY BLOCK

| FIG. 13A | FIG. 13B | FIG. 13C | FIG. 13D | FIG. 13E | FIG. 13F |

FOURTH LAYER EXECUTION

ONLY THE SYNAPSE PROCESSORS RECEIVING Y4, Y5, Y6, AND Y7 DO THE MULTIPLY CREATING THE SUMMATIONS REQUIRED TO PRODUCE Y8, Y9, Y10, AND Y11.

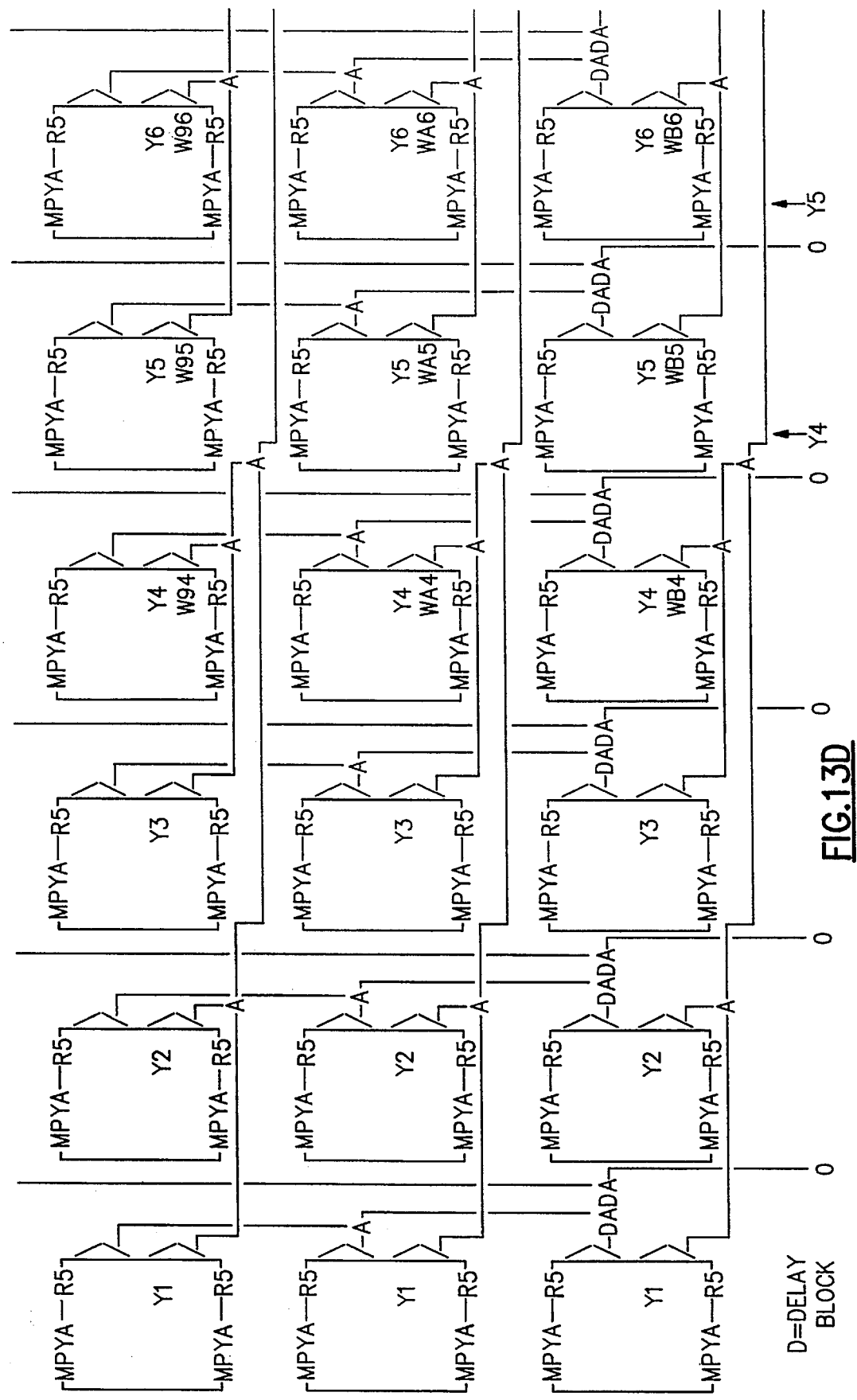

LEARNING MODE
REVERSE COMMUNICATE E8, E9, E10 & E11

NEURONS 1, 2, ..., 11 ISSUE PATH R4
THIS STOPS THE AUTOMATIC MULTIPLY MODE
AND CHANGES THE DATA PATH TO R4

D=DELAY BLOCK

| FIG. 15A | FIG. 15B | FIG. 15C | FIG. 15D | FIG. 15E | FIG. 15F |

LEARNING MODE

CREATE WEIGHTED ERROR SUMMATIONS ER4, ER5, ER6 & ER7

NEURONS 8, 9, 10, AND 11 ISSUE MPY R6 * R3 → ALU TREE

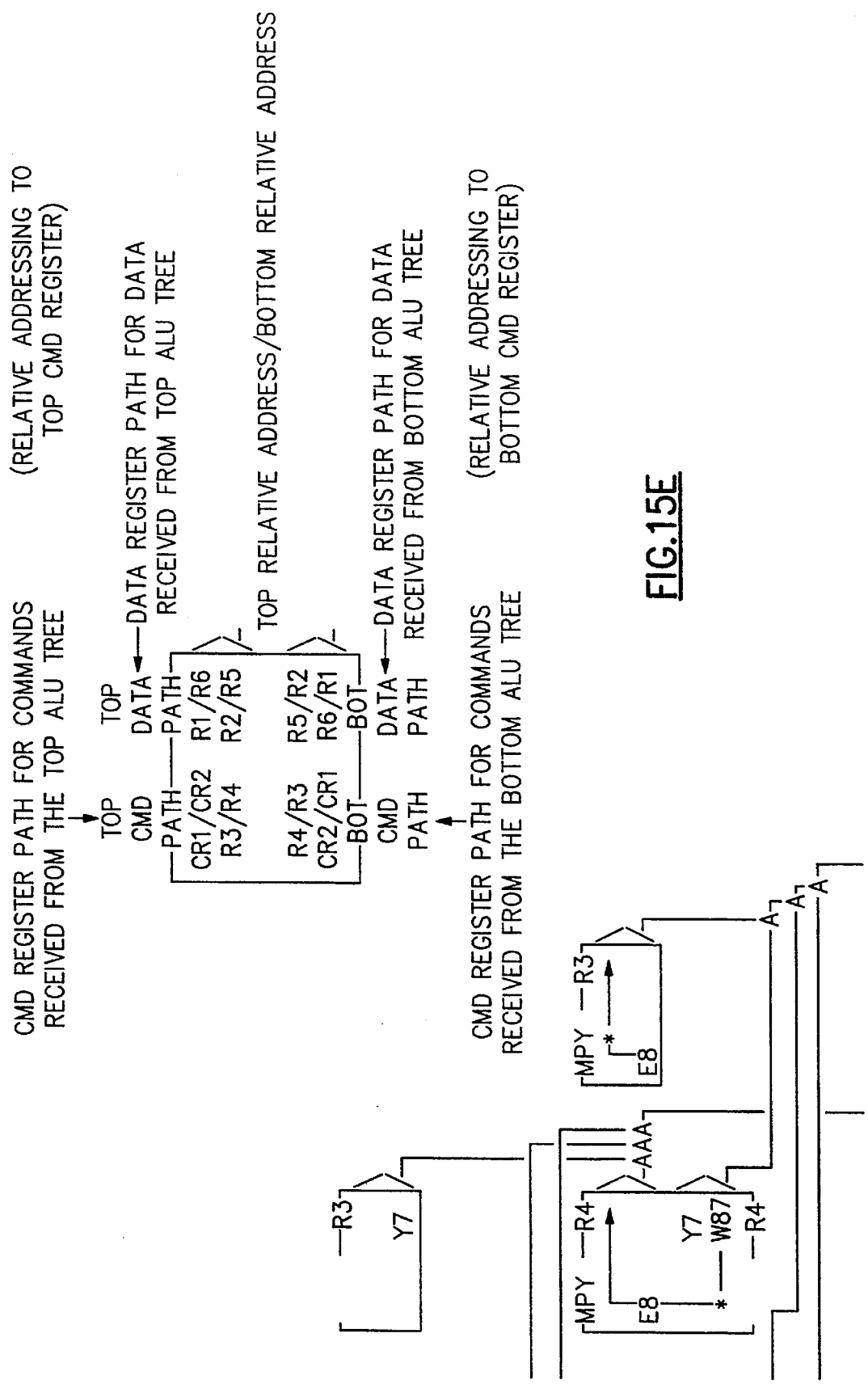

| FIG. 16A | FIG. 16B | FIG. 16C | FIG. 16D | FIG. 16E | FIG. 16F |

LEARNING MODE

REVERSE COMMUNICATE E4,E5,E6 & E7 AND CREATE ERROR SUMMATION ER2

REVERSE COMMUNICATE E4, E5, E6, AND E7

NEURON 3 ISSUES PATH CR1 ( YINMODE )

NEURON 3 ISSUES MPY R6 * R3→ALU TREE

ERROR SUMMATION ER3 IS GENERATED

NEURON 3 ISSUES PATH CR2 ( YOUTMODE )

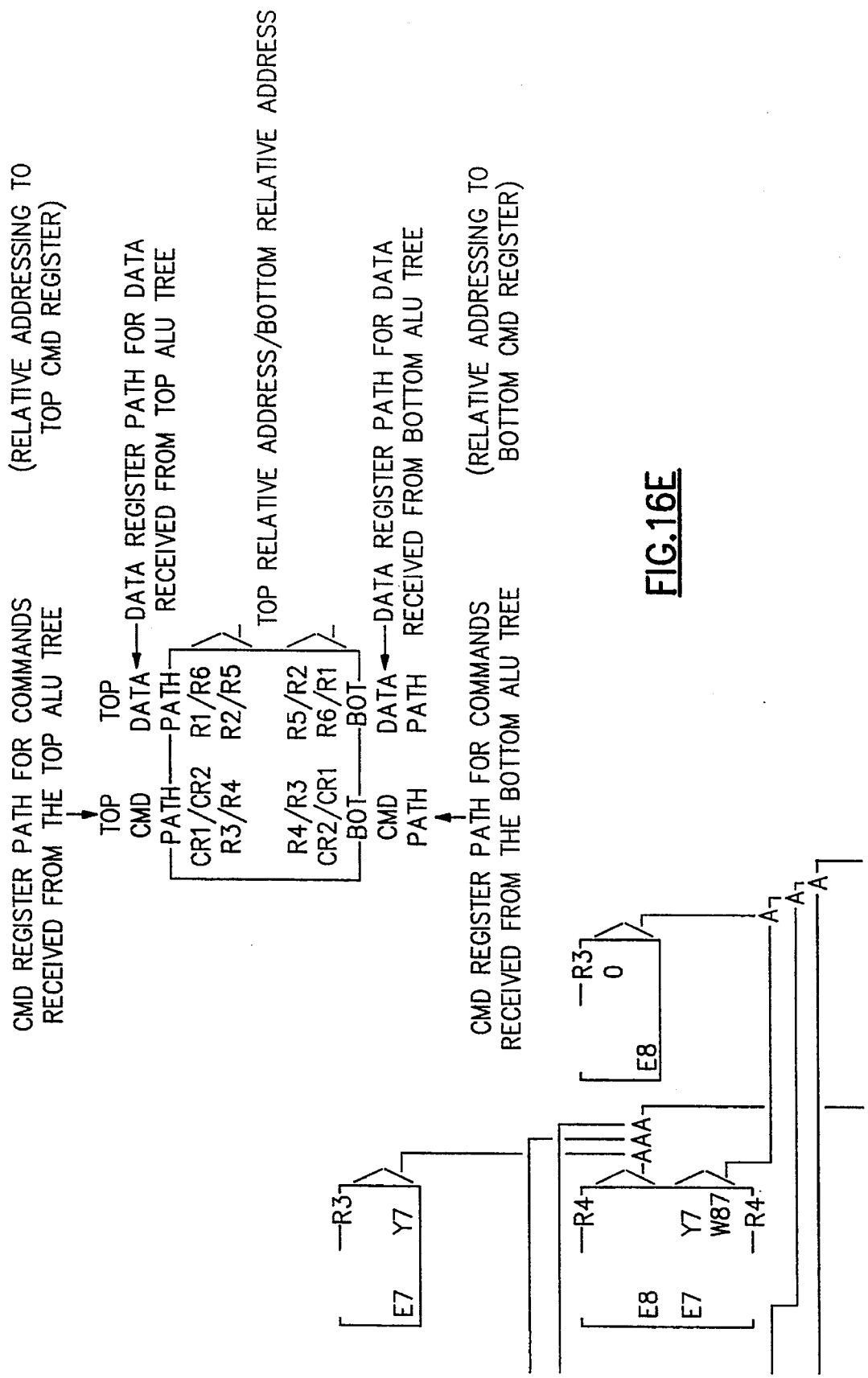

LEARNING MODE REVERSE COMMUNICATE E3

REVERSE COMMUNICATE E3

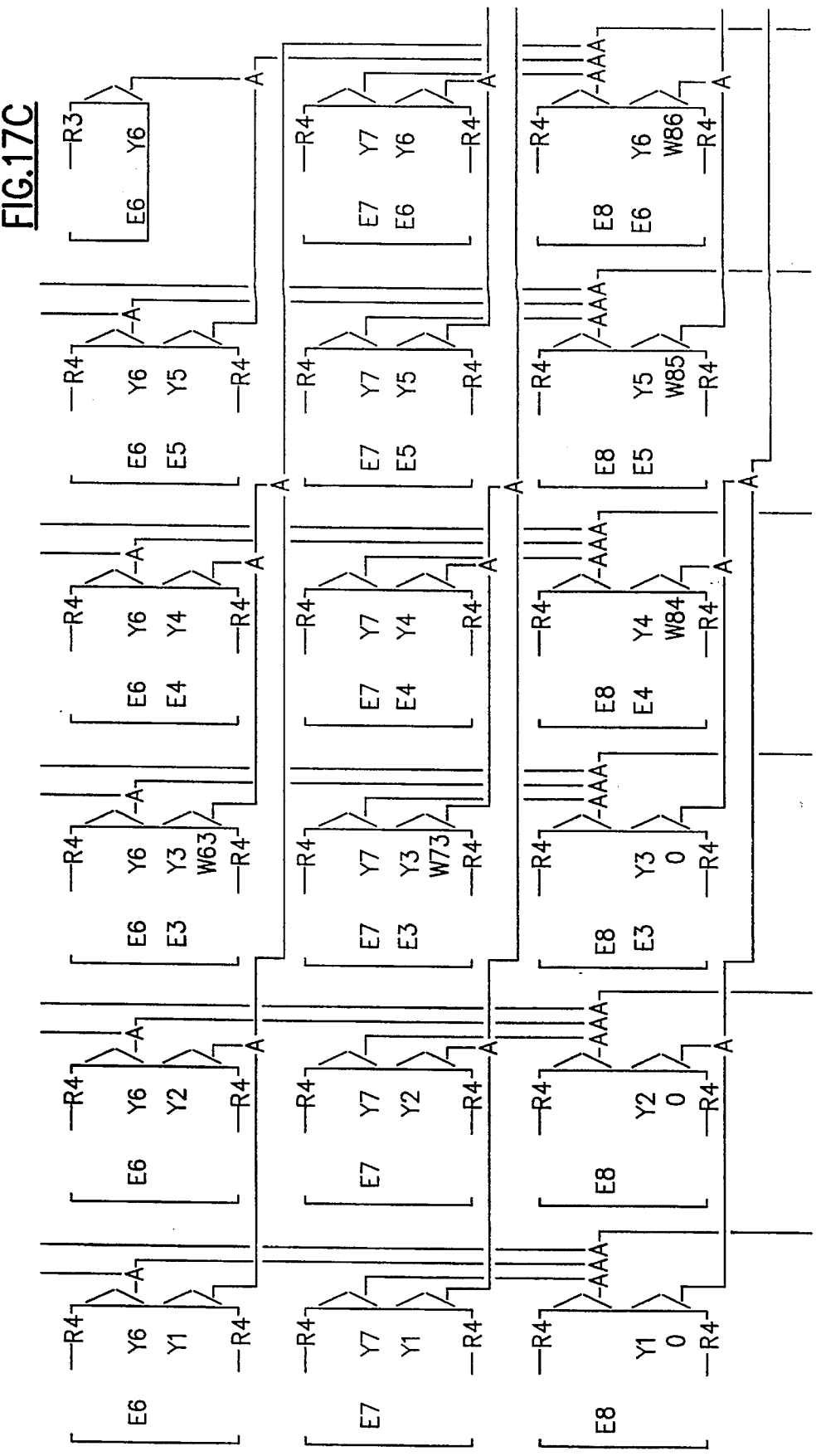

LEARNING MODE
STEP 1 WEIGHT UPDATING

NEURONS 1, 2, ..., 11 ISSUE MPY R5 * R3 → R4

D = DELAY BLOCK

LEARNING MODE
STEP 2 WEIGHT UPDATING

NEURONS 1, 2, ..., 11 ISSUE MPY R4 * IMD→R4

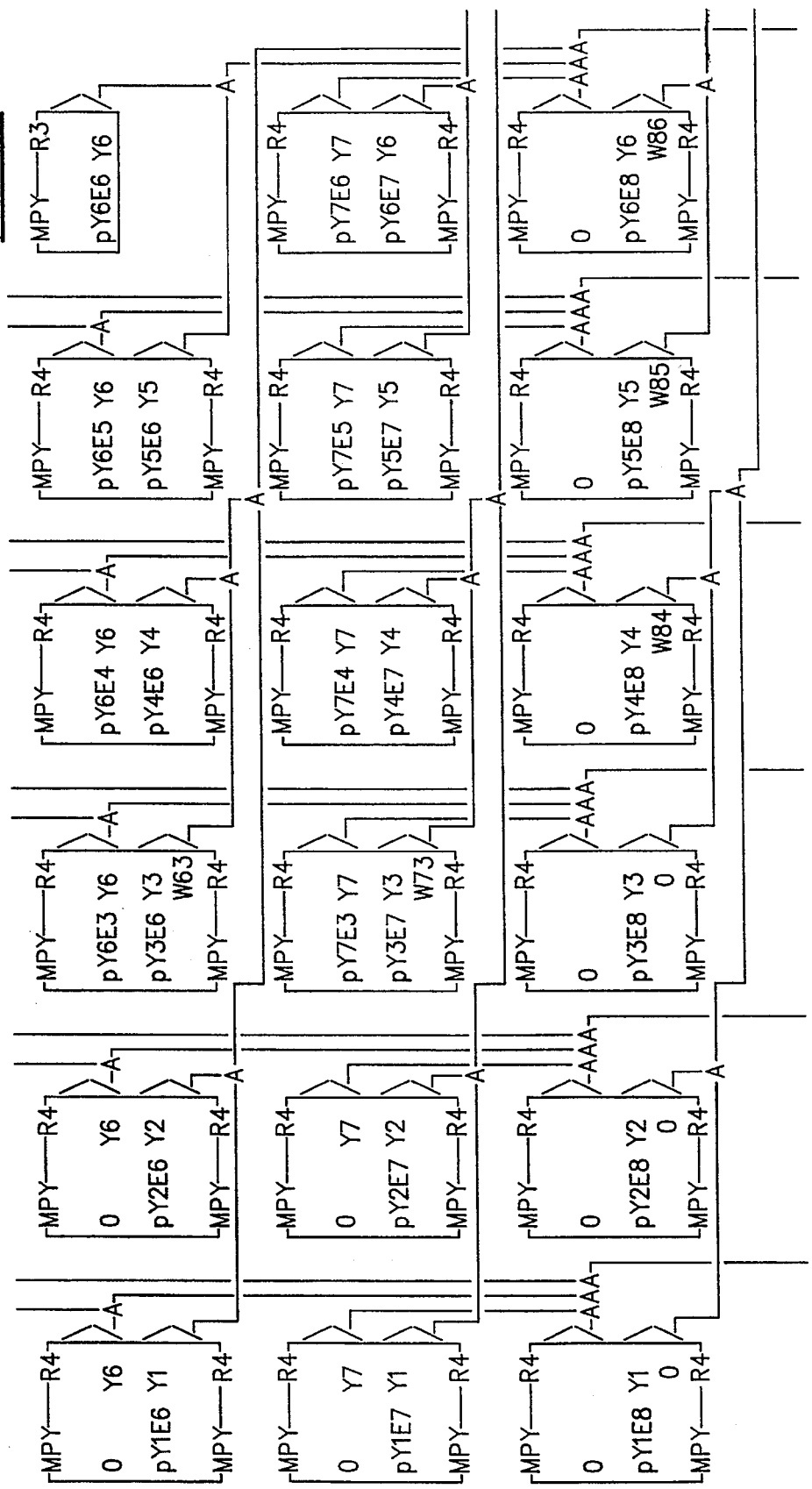

D=DELAY BLOCK

| FIG. 20A | FIG. 20B | FIG. 20C | FIG. 20D |
|---|---|---|---|
|  |  | FIG. 20E | FIG. 20F |

LEARNING MODE
STEP 3 WEIGHT UPDATING

NEURONS 1, 2, ..., 11 ISSUE ADD R6 + R4 → R6
THE WPB REMAINS UNCHANGED

D=DELAY BLOCK

NEURON CALCULATIONS AS MATRIX OPERATIONS $$[Y_1 \ Y_2 \ \ldots \ Y_N] * \begin{bmatrix} W_{11} & W_{21} & \ldots & W_{N1} \\ W_{12} & W_{22} & \ldots & W_{N2} \\ \vdots & \vdots & & \vdots \\ W_{1N} & W_{2N} & \ldots & W_{NN} \end{bmatrix} = [z_1 \ z_2 \ \ldots \ z_N]$$

FIG.21

GENERAL MATRIX MULTIPLICATION $$\begin{bmatrix} Y_{11} & Y_{21} & \ldots & Y_{N1} \\ Y_{12} & Y_{22} & \ldots & Y_{N2} \\ \vdots & \vdots & & \vdots \\ Y_{1N} & Y_{2N} & \ldots & Y_{NN} \end{bmatrix} * \begin{bmatrix} W_{11} & W_{21} & \ldots & W_{N1} \\ W_{12} & W_{22} & \ldots & W_{N2} \\ \vdots & \vdots & & \vdots \\ W_{1N} & W_{2N} & \ldots & W_{NN} \end{bmatrix} = \begin{bmatrix} z_{11} & z_{21} & \ldots & z_{N1} \\ z_{12} & z_{22} & \ldots & z_{N2} \\ \vdots & \vdots & & \vdots \\ z_{1N} & z_{2N} & \ldots & z_{NN} \end{bmatrix}$$

FIG.22

LEARNING MACHINE SYNAPSE PROCESSOR SYSTEM APPARATUS

This application is a Division of U.S. application Ser. No. 08/079,697, filed Jun. 18, 1993, now abandoned, which is a Continuation of U.S. application Ser. No. 07/702,261, filed May 17, 1991, now abandoned.

CROSS REFERENCE TO RELATED APPLICATIONS

The present application claims priority and is a continuation-in-part of the following related Patent Applications:

APPARATUS AND METHOD FOR NEURAL PROCESSOR, S. Vassiliadis, and G. G. Pechanek, U.S. Ser. No. 07/526,866, filed May 18, 1990, divided and issued as U.S. Pat. Nos. 5,065,339, 5,146,420, 5,146,543, 5,148,515, 5,251,287 sometimes referred to as "SNAP".

A TRIANGULAR SCALABLE NEURAL ARRAY PROCESSOR, G. G. Pechanek, and S. Vassiliadis, U.S. Ser. No. 07/682,786, filed Apr. 8, 1991 abandoned in favor of U.S. Ser. No. 08/231,853, filed Apr. 22, 1994, sometimes referred to as "T-SNAP".

SPIN: A SEQUENTIAL PIPELINED NEURO COMPUTER, S. Vassiliadis, G. G. Pechanek,and J. G. Delgado-Frias, U.S. Ser. No. 07/682,842, filed Apr. 8, 1991 U.S. Pat. No. 5,337,395, sometimes referred to as "SPIN".

In addition, filed concurrently are related applications:

VIRTUAL NERUOCOMPUTER ARCHITECTURES FOR NEURAL NETWORKS, G. G. Pechanek, J. G. Delgado-Frias, and S. Vassiliadis, U.S. Ser. No. 07/702, 260, filed May 17, 1991, now issued as U.S. Pat. No. 5,243,688, sometimes referred to as "VIRTUAL".

PLAN: PYRAMID LEARNING ARCHITECTURE NEUROCOMPUTER, G. G. Pechanek, S. Vassiliadis, and J. G. Delgado-Frias, U.S. Ser. No. 07/702,263, filed May 17, 1991, abandoned in favor of U.S. Ser. No. 08/079,695 filed Jun. 18, 1993 now issued as U.S. Pat. No. 5,325,464, sometimes referred to as "PLAN".

SCALABLE FLOW VIRTUAL LEARNING NEUROCOMPUTER G. G. Pechanek, S. Vassiliadis, and J. G. Delgado-Frias, U.S. Ser. No. 07/702,262, filed May 17, 1991, abandoned in favor of U.S. Ser. No. 08/080,989 filed Jun. 21, 1993, now issued as U.S. Pat. No. 5,329,611, sometimes referred to as "SVLM".

These co-pending applications and the present application are owned by one and the same assignee, namely, International Business Machines Corporation of Armonk, N.Y.

The descriptions set forth in these co-pending applications are hereby incorporated into the present application by this reference.

FIELD OF THE INVENTION

This invention relates to computer systems and particularly to a learning machine synapse processor system architecture which can provide the Back-Propogation, a Boltzmann like machine, and matrix processing illustrated by the examples which can be implemented by the described computer system.

REFERENCES USED IN THE DISCUSSION OF THE INVENTIONS

During the detailed discussion of our inventions, we will reference other work including our own unpublished works which are not Prior Art but which will aid the reader in following our discussion. These additional references are:

D. E. Rumelhart, J. L. McClelland, and the PDP Research Group, *Parallel Distributed Processing* Vol. 1: Foundations Cambridge, Mass.: MIT Press 1986. (Herein referred to as "Rumelhart 86".) J. N. Hwang, J. A. Vlontzos, and S. Y. Kung, "A Systolic Neural Network Architecture for Hidden Markov Models, *IEEE Transactions on Acoustics, Speech, and Signal Processing*, Vol 37, No 12. pp. 1967–1979, 1989. (Herein referred to as "Hwang 89".)

M. Caudill, *"Neural Networks Primer*-Part III," AI Expert pp. 53–59, June 1988. (Herein referred to as "Caudill 88".)

APPARATUS AND METHOD FOR NEURAL PROCESSOR, S. Vassiliadis, and G. G. Pechanek, U.S. Ser. No. 07/526,866, filed May 18, 1990, divided and issued as U.S. Pat. Nos. 5,065,339, 5,146,420, 5,146,543, 5,148,515, 5,251,287 herein sometimes referred to as "SNAP" or "Vassiliadis SNAP 90".)

A TRIANGULAR SCALABLE NEURAL ARRAY PROCESSOR, G. G. Pechanek, and S. Vassiliadis, U.S. Ser. No. 07/682,785, filed Apr. 8, 1991 abandoned in favor of U.S. Ser. No. 08/231,853, filed Apr. 22, 1994, herein sometimes referred to as "T-SNAP".)

SPIN: A SEQUENTIAL PIPELINED NEURO COMPUTER>, S., Vassiliadis, G. G. Pechanek,and J. G. Delgado-Frias, U.S. Ser. No. 07/681,842, filed Apr. 8, 1991 now issued as U.S. Pat. No. 5,337,395, herein sometimes referred to as "SPIN" or "Vassilliadis 91".)

B. Widrow and M. E. Hoff, "Adaptive Switching Circuits," IRE WESCON Convention Record, pp. 96–104, 1960. (Herein called "Widrow 60".)

S. Grossberg, "Competitive Learning: From Interactive Activation to Adaptive Resonance," Cognitive Science 11 pp. 23–63, 1987 (Herein referred to as "Grossberg 87".)

E. B. Eichelberger and T. W. Williams, "A Logic Design Structure for Testability," Proceedings 14th Design Automation Conference, IEEE, 1977. (Herein referred to as "Eichelberger 77".)

J. J. Hopfield, "Neurons With Graded Response Have Collective Computational Properties Like Those of Two-State Neurons," *Proceedings of the National Academy of Sciences* 81, pp. 3088–3092, May, 1984. (Herein referred to as "Hopfield 84".)

D. H. Ackley, G. E. Hinton and T. J. Sejnowski, "A Learning Algorithm for Boltzmann Machines," *Cognitive Science* 9, pp. 147–169, 1985. (Herein referred to as "Ackley 85".)

J. L. McClelland and D. E. Rumelhart, *Explorations in Parallel Distributed Processing: A handbook of Models*, Programs and Exercises Cambridge, Mass.: MIT Press, 1988. (Herein referred to as "McClelland 88".)

and J. J. Hopfield, "Neural Networks and Physical Systems with Emergent Collective Computational Abilities," Proceedings of the National Academy of Sciences 79, pp. 2554–2558, 1982. (Herein referred to as "Hopfield 82".)

BACKGROUND OF THE INVENTION

According to a Webster's New Collegiate Dictionary, the word "learn" means "to gain knowledge or understanding of or skill in by study, instruction, or experience". A neural network's knowledge is encoded in the strength of interconnections or weights between the neurons. In a completely connected network of N neurons there are $N^2$ interconnection weights available that can be modified by a learning rule. The "learning" process a network is said to go through, in a similar sense to Webster's definition, refers to the mechanism or rules governing the modification of the interconnection weight values. One such learning rule is called Back-Propagation as illustrated by D. E. Rumelhart, J. L. McClelland, and the PDP Research Group, *Parallel Distributed Processing* Vol. 1: Foundations Cambridge, Mass.: MIT Press 1986. (This work is herein referred to as "Rumelhart 86".) The Back-Propagation learning rule will be described and followed by a discussion of the synapse processor architecture to be used for the implementation of a learning machine. A back-propagation example, using an input/output encoder neural network, will then be illustrated. As our synapse processor architecture which is the subject of this patent is applicable for modeling other neural networks and for the execution of a more general class of parallel data algorithms, we will show in a further series of examples the implementation of a Boltzmann like machine and matrix processing with our new system.

During the detailed discussion of our inventions, we will reference other work including our own unpublished works, as mentioned above. These background literature references are incorporated herein by reference.

SUMMARY OF THE INVENTIONS

Our newly developed computer system may be described as a neural synapse processor apparatus having a new architecture for the synapse processing elements of the apparatus. The apparatus which we prefer will have a N neuron structure having synapse processing units that contain instruction and data storage units, receive instructions and data, and execute instructions. The N neuron structure should contain communicating adder trees, neuron activation function units, and an arrangement for communicating both instructions, data, and the outputs of neuron activation function units back to the input synapse processing units by means of the communicating adder trees.

The preferred apparatus which will be described contains $N^2$ synapse processing units, each associated with a connection weight in the N neural network to be emulated, placed in the form of a N by N matrix that has been folded along the diagonal and made up of diagonal cells and general cells.

In our preferred system the diagonal cells, each utilizing a single synapse processing unit, are associated with the diagonal connection weights of the folded N by N connection weight matrix and the general cells, each of which has two synapse processing units merged together, and which are associated with the symmetric connection weights of the folded N by N connection weight matrix.

With our new architecture for the synapse processing elements which will be described in the best way we know to implement the improvements, back-propagation and Boltzmann like machine algorithms can be utilized and the implementation of both back-propagation and a Boltzmann like machine on our General Purpose Learning Machine (GPLM), as discussed for an input/output encoder neural network example, can be achieved, as well as the GPLM implementation of data parallel algorithms for matrix multiplication, addition, and Boolean operations.

These and other improvements are set forth in the following detailed description. For a better understanding of the inventions, together with advantages and features, reference may be had to the co-pending applications for other developments we have made in the field. However, specifically as to the improvements, advantages and features described herein, reference will be made in the description which follows to the below-described drawings.

BRIEF DESCRIPTION OF THE DRAWINGS.

FIG. 1 shows a multi-layer back propagation network;

FIG. 2 shows a three layer back propagation network;

FIG. 3 shows a weight/Y value multiplication structure in two parts,

FIG. 3-A (Diagonal Cell) and FIG. 3-B (General Cell);

Figure 4A:
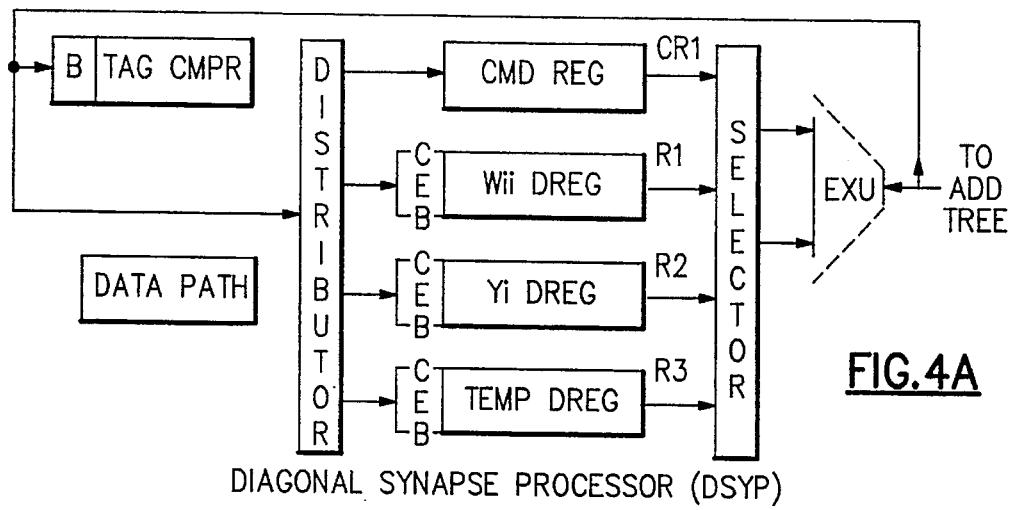
FIG. 4 illustrates our preferred synapse processor architecture in two parts, FIG. 4-A (DIAGONAL SYNAPSE PROCESSOR DSYP) and FIG. 4-B (GENERAL SYNAPSE PROCESSOR GSYP)

(Note: For convenience of illustration, FIGS. 9–20 may be separated. As a convention we place the top of the FIGURE as the first sheet, with subsequent sheets proceeding down when viewing the FIGURE, in the event that multiple sheets are used.)

FIGS. 10, 10A–10F, illustrate the initialization and first layer execution with our system:

FIGS. 11, 11A–11F, illustrate the second layer execution with our system;

FIGS. 12, 12A–12F, illustrate the third layer execution with our system;

FIGS. 13, 13A–13F, illustrate the fourth layer execution with our system;

FIGS. 14, 14A–14F, illustrate the learning mode-reverse communicate E8, E9, E10 & E11;

FIGS. 15, 15A–15F, illustrate the learning mode-create weighted error summations ER4, ER5, ER6, AND ER7;

FIG. 16, 16A–16F, illustrate the learning mode-reverse communicate E4, E5, E6, and E7 and create error summation ER2;

FIG. 17, 17A–17F, illustrate the learning mode-reverse communicate E3;

FIG. 18, 18A–18F, illustrate the learning mode-Step 1 weight updating;

FIG. 19, 19A–19F, illustrate the learning mode-Step 2 weight updating; (p=ρ)

FIG. 20, 20A–20F, illustrate the learning mode-Step 3 weight updating;

FIG. 21 illustrates neuron calculations as matrix operations; while

FIG. 22 illustrates general matrix multiplication.

DETAILED DESCRIPTION OF PREFERRED EMBODIMENTS

Our detailed description follows as parts explaining our preferred embodiments of our inventions provided by way of example.

BACK-PROPAGATION LEARNING BACKGROUND

The back-propagation learning algorithm is typically implemented on feed-forward multi-layer neural networks, though application to recurrent networks has been addressed, for example-see . . . Rumelhart 86 and Hwang 89. We will discuss the feed-forward networks only. The feed-forward network functions as a pattern classifier or pattern mapper where input patterns are applied and the network learns a mapping or classification of these input patterns to an output set of patterns. It is assumed that a subset of classifications or input/output mappings is initially known that can serve as "teachers" for the network. After learning the subset of classifications the network can then respond to unseen patterns and map them to an already learned classification. The network's ability to make a correct classification of the previously unseen patterns is termed a "generalization". The network consists of an input layer, an output layer, and one or more hidden layers of neurons and is set up with an input neuron unit for each character in the input pattern and an output neuron unit for each classification or character in the output pattern, FIG. 1. The number of hidden layers of neurons and the number of neurons in each hidden layer is more difficult to determine. The Kolmogorov theorem—per Caudill 88—indicates that a three layer neural network, made up of m input neurons, n output neurons, and 2m+1 hidden layer neurons will be able to map an input pattern of m characters to an output pattern of n characters, where the input characters are constrained to $0 \leq value \leq 1$. The Kolmogorov theorem does not guarantee a minimum neural network solution to the mapping problem though. See Caudill 88. A method for choosing the minimum number of hidden units for an optimum solution is not known. Experience, common sense, use of the Kolmogorov theorem, or experimental methods are usually used to select the number of hidden units. Once the number of layers and number of neurons per layers are chosen, the connection structure is then decided upon. The feed-forward networks typically allow for complete connectivity between adjacent layers and may also have connections between non-adjacent layers, but all connections are in a feed-forward direction only. The feed-forward connection restriction is assumed to mean no feed-back connection weights and no connections between neurons within a layer. For this connection structure, the weights are usually randomly determined prior to training as in Rumelhart 86.

As we turn to FIG. 1 and other FIGURES, the following notation will be used:

- N neurons in total network.
- The subscript L is used to denote the K layers where $1 \leq L \leq K$
- There are $M_L$ neurons in each layer such that $M_1 + M_2 + \ldots + M_K = N$.
- The weights are double subscripted, $W_{ij}$ which indicates the connection weight from unit j connected to unit i.
- The external inputs will be denoted by a new variable $Ex_i$ where $1 \leq i \leq N$. Each neuron will be allowed to possess an External input $Ex_i$.
- All neuron outputs will be denoted by $Y_i$.
- The neurons are numbered sequentially in the following manner:
  layer L=1 neurons: $Y_1, Y_2, \ldots, Y_{M_1}$
  layer L=2 neurons: $Y_{M_1+1}, Y_{M_1+2}, \ldots, Y_{M_1+M_2}$
  continuing until:
  layer L=K neurons: $Y_{N-M_K+1}, Y_{N-M_K+2}, \ldots, Y_N$ The neuron sigmoid function is modified from the previously assumed form—see . . . Vassiliadis SNAP 90, T-SNAP, and Vassiliadis SPIN 91 by way of example—to the form described in, equation 1. The change has been the addition of a term $Ex_i$ which represents the external input to a neuron processing element.

$$Y_i = F\left( \sum_{j=1}^{N} W_{ij} Y_j + Ex_i \right) \quad (1)$$

In many feed-forward neural networks, only the input layer of neurons use an external input. In the literature, e.g. Rumelhart 86, the input neurons of a feedforward network take on an identity activation/output function, where $Y_1 = Ex_1$, rather than the sigmoid function as do the other neurons in the neural network. A sigmoid function can be used instead for the input neurons, allowing all neurons to possess the same activation function, by extending the range of $Ex_i$ to $-A \leq Ex_i \leq +A$, where $-A$ will equate to $Y_i = 0$ and $+A$ will equate to $Y_i = 1$ assuming the case where $Ex_i$ is the only input to a neuron. Within some acceptable range of error, the input neurons can be forced to a "0" or a "1" state via use of the external input $Ex_i$. The $Ex_i$ for the other neurons in the network can be equated to zero if not required.

The neuron activation function $F(z_i)$ is set equal to a sigmoid function whose form, for example, is:

$$Y_i = F(z_i) = \frac{1}{\left(1 + e^{-\frac{z_i}{T}}\right)} \quad (2)$$

Where:
e=Natural Log (2.71828. . . )
For the function $F(z_i)$:

$$z_i = \sum_{j=1}^{N} W_{ij} Y_j + Ex_i \quad (3)$$

$0 \leq F(z_i) \leq 1$

T is a global control parameter used to modify the slope of the sigmoid function for a given set of $z_i$ values.

Given a set of known input/teacher patterns, a known input is applied to the back-propagation network, and the network is run in an execution mode producing some output. The network is then placed into a learning mode where the weights are adjusted according to some rule. The mismatch between the teacher pattern and the actually produced output pattern represents an error. The basic concept behind the back-propagation learning rule is one of minimizing the total network error, E(W), over all input/teacher patterns, as a function of the adjustable weights. The network error E(W) is chosen as a quadratic function of the teaching inputs and the network outputs (back-propagation/delta rule equations from Rumelhart 86):

$$E(W) = \sum_{p=1}^{Q} \frac{1}{2} \sum_{i=1}^{N} (t_i^p - Y_i^p)^2 \quad (4)$$

Where:
Q equals the number of patterns p.
There are teacher inputs $t_i^p$ on the output units.
For a particular pattern p, $E(W)^p$ is:

$$E(W)^p = \frac{1}{2} \sum_{i=1}^{N} (t_i^p - Y_i^p)^2 \quad (5)$$

Based on the work of Widrow and Hoff (Widrow 60), which showed that for single layer linear threshold unit systems, instead of systems of units with continuous valued outputs, a plot of the quadratic error function vs a range of values of a network weight is a smooth function with one minimum. By using a procedure to minimize the mean square error, the network does a gradient descent along the error surface until the single minimum is reached. In other words, a weight is changed in such a manner as to minimize the error function. To be more specific, the gradient descent is accomplished by making the weight change proportional to the negative of the derivative of the error function. This gradient descent concept used on linear threshold neurons is extended to neurons which have a sigmoidal type response.

To minimize the mean square error with neurons having activation functions defined by equations 1 and 2 the derivative of the error function with respect to any weight change must be calculated. The weight must be changed according to a gradient descent formula:

$$\Delta W_{ij} = -\rho \frac{(dE^p)}{(dW_{ij})} \quad (6)$$

(Where $\rho$ is a constant of proportionality.)

Taking the derivative of the error function, equation 5, with respect to the weights in chain rule fashion is:

$$\frac{(dE^p)}{(dW_{ij})} = \frac{(dE^p)}{(dz_i^p)} \frac{(dz_i^p)}{(dW_{ij})} \quad (7)$$

The first part of equation 7, $(dE^p)/(dz_i^p)$ represents how the error $E^p$ changes with respect to input changes of the $i^{th}$ unit. The second part of equation 7, $(dz_i^p)/(dW_{ij})$ represents how the $i^{th}$ input changes with respect to the changing of a particular weight $W_{ij}$.

Since the external inputs $Ex_i$ are assumed to be constant during network execution, the derivative of the second pad of equation 7 is given as:

$$\frac{(dz_i^p)}{(dW_{ij})} = \frac{d}{(dW_{ij})} \left( \sum_{j=1}^{N} W_{ij} Y_j^p + Ex_i \right) = Y_j^p \quad (8)$$

The derivative of the first part of equation 7 is based on the original delta rule algorithm used with linear neurons as interpreted by Rumelhart 86. If the neurons were linear the $Y_i^p$ would be equal to or a multiplicative constant times the input $z_i^p$. To be "consistent" with this linear formulation, the first derivative is defined in accordance with Rumelhart 86 as $$\frac{(dE^p)}{(dz_i^p)} = -\delta_i^p \quad (9)$$

To implement a gradient descent on the error surface E, the weight changes are made according to th s learning rule based on equation 6:

$$\Delta W_{ij} = \rho \delta_i^p Y_j^p \quad (10)$$

(Where $\rho$ represents the learning rate, a constant of proportionality.)

The determination of $\delta_i^p$ for all the neurons in the multilayer network represents the essence of the back-propagation algorithm. Using the derivative chain rule on equation 9 gives:

$$\delta_i^p = -\frac{(dE^p)}{(dz_i^p)} = -\frac{(dE^p)}{(dY_i^p)} \frac{(dY_i^p)}{(dz_i^p)} \quad (11)$$

The first term $(dE^p)/(dY_i^p)$ represents the change in the error as a function of the output of the neuron and the second term $(dY_i^p)/(dz_i^p)$ represents the change in the output as a function of the input changes. The second term is valid for both output and hidden neurons. The derivative of the activation function, equation 2, is:

$$\frac{(dY_i^p)}{(dz_i^p)} = \frac{\left(e^{-\frac{2z_i^p}{T}}\right)}{\left(\left(1 + e^{-\frac{2z_i^p}{T}}\right)^2\right)} = Y_i^p(1 - Y_i^p) \quad (12)$$

Equation 11's first term's calculation is dependent upon whether the unit is an output neuron or one of the hidden neurons.

For output units, since the teaching input is available:

$$\frac{(dE^p)}{(dY_i^p)} = -(t_i^p - Y_i^p) \quad (13)$$

And:

$$\delta_i^p = (t_i^p - Y_i^p) \frac{(dY_i)}{(dz_i)} \quad (14)$$

Substituting equation 12 for output neurons into equation 14 gives:

$$\delta_i^p = (t_i^p - Y_i^p) Y_i^p (1 - Y_i^p) \quad (15)$$

Then for the output neurons equation 10 becomes:
$\Delta W_{ij} = \rho Y_j^p (t_i^p - Y_i^p) Y_i^p (1 - Y_i^p) + tm$ (16)

For the $i^{th}$ hidden unit in layer L with output $Y_i$ and with $Y_i$ connected to a feed-forward layer, write $(dE^p)/(dY_i^p)$ in chain rule fashion as:

$$\frac{(dE^p)}{(dY_i^p)} = \sum_{c=m+1}^{N} \frac{(dE^p)}{(dz_c^p)} \frac{(dz_c^p)}{(dY_i^p)} \quad (17)$$

Where $m = M_1 + M_2 + \ldots + M_L$

Equation 17 represents the effect $Y_i$ in layer L has on the feed-forward layers of neurons $Y_{m+1}, Y_{m+2}, \ldots, Y_N$. Continuing:

$$\frac{(dE^p)}{(dY_i^p)} = \sum_{c=m+1}^{N} \frac{(dE^p)}{(dz_c^p)} \frac{d}{(dY_i^p)} \sum_{j=1}^{N} W_{cj} Y_j \quad (18)$$

Since the only effect being investigated is that due to $Y_i$, the derivative with respect to $Y_i$ of all the inputs in the feed-forward layers results in:

$$\frac{(dE^p)}{(dY_i^p)} = \sum_{c=m+1}^{N} \frac{(dE^p)}{(dz_c^p)} W_{ci} \quad (19)$$

Substituting equation 9 in equation 19 gives:

$$\frac{(dE^p)}{(dY_i^p)} = -\sum_{c=m+1}^{N} \delta_c^p W_{ci} \quad (20)$$

$W_{ci}$ is interpreted as the connection weight from the hidden unit i to a neuron unit c in a feed-forward layer. Repeating equation 11:

$$\delta_i^p = -\frac{(dE^p)}{(dz_i^p)} = -\frac{(dE^p)}{(dY_i^p)} \frac{(dY_i^p)}{(dz_i^p)} \quad \text{equation 11}$$

Substituting equation 12 and 20 into equation 11 gives:

$$\delta_i^p = Y_i^p (1 - Y_i^p) \sum_{c=m+1}^{N} \delta_c^p W_{ci} \quad (21)$$

Then, based on equation 10:

$$\Delta W_{ij} = \rho Y_j^p Y_i^p (1 - Y_i^p) \sum_{c=m+1}^{N} \delta_c^p W_{ci} \quad (22)$$

Layer L's hidden unit error signal $\delta_i^p$ can be back-propagated to layers previous to L to continue the weight modification process.

For multilayer neural networks, equation 16 and 22 constitute the back-propagation learning rules. All weights are updated according to the following general rule:

New $W_{ij}=OLD W_{ij}+\Delta W_{ij}$ (23)

Turning now to the FIGURES in more detail, back-propagation can be viewed from a high level as shown in FIG. 2, illustrating a three layer back-propagation network. See Grossberg 87. FIG. 1, outlines the main computational blocks involved in a three layer, F1, F2, and F3, back propagation network. Inputs to the network pass through the three layers, F1, F2, and F3, to generate the actual network outputs from the F3 layer. The F1, F2, and F3 layers of units have nonlinear, differentiable, and nondecreasing activation functions which directly produce the neuron's output in each layer. These activation functions go to differentiator blocks, F6 and F7, and to error signal blocks, F4 and F5. Blocks F6 and F7 differentiate the activation functions from layers F3 and F2 respectively, each providing a signal to their corresponding error blocks F4 and F5. Block F4 also receives the direct output from layer F3 and a teaching input, labeled EXPECTED OUTPUTS. Block F4 creates a learning signal which is based on the difference from the expected output and the actual output multiplied by the derivative of the actual output F3, equation 15. The weights, between F3 and F2, are then modified by the learning signal, equation 16 and 23. The weights to layer F2, also called the hidden layer, are modified by a slightly different rule since there is no teacher, i.e. expected outputs, for the F2 layer. The learning signal from the F5 block is equal to equation 21, and the weights are updated based on equation 22 and 23.

The network works in two phases, an execution or a forward propagation phase and a learning phase which is a backward propagation through the network modifying the weights starting from the F3 layer and propagating back to the input layer. This cycle, a forward propagation phase generating new outputs followed by the backward propagation phase updating the weights continues until the actual and target values agree or are within some acceptable tolerance.

LEARNING MACHINE SYNAPSE PROCESSOR ARCHITECTURE

The TSNAP structure as described in T-SNAP. required the HOST processor to provide the learning function required by a neural network model since TSNAP did not provide any weight modification mechanisms. Additionally, TSNAP does not provide the neuron execution function as described by equation 1. In order to accommodate multiple learning algorithms and the new neuron definition, equation 1, major modifications to the TSNAP architecture are required. These modifications provide capabilities beyond those normally associated with the neural network paradigm. Instead of the fixed multiplication function provided in TSNAP, a more general processor architecture is put in place where the multiplication element is replaced by a new type of computing element which receives and executes instructions. This new architecture we now term the Synapse Processor Architecture (SPA). Bit serial communications is an underlying assumption for the following architecture discussion implemented by our illustrated preferred embodiment of the system apparatus, but this bit serial embodiment for a SPA is not limited to a bit serial implementation as the architecture is applicable to a word parallel format, as also detailed below.

The weight/Y value multiplier function corresponds to the input synapse processing in a coarse functional analogy to a biological neuron as defined by equations 1 and 2. The expanded multiplier cell or "synapse" processor architecture includes the weight/Y value multiplication and additional functions as will be described. Two types of processor "cell" structures are required to implement the neural execution capability without learning, the general cell and diagonal cell structures.

Figure 4B:
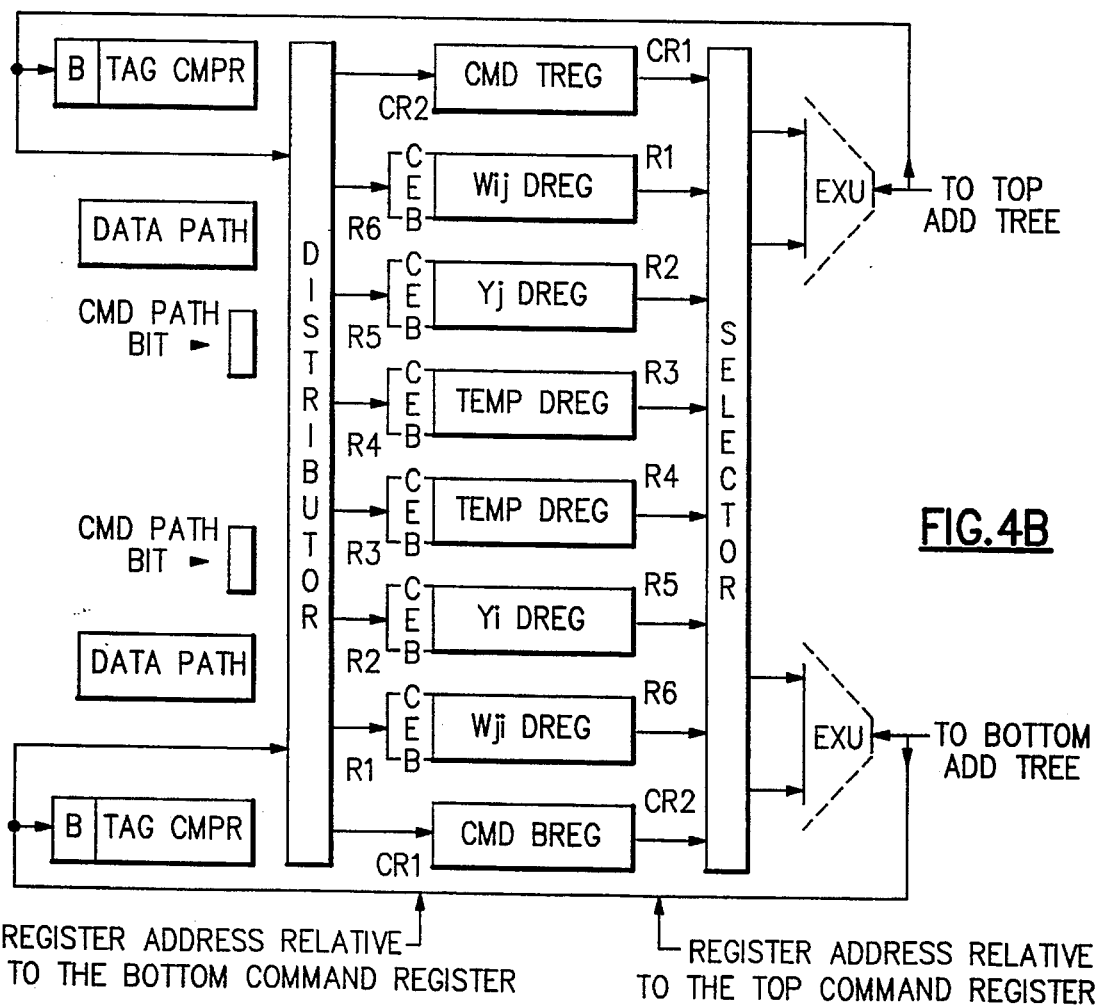

The basic execution structure, without learning, and new processor structure, supporting learning, are shown in FIG. 3 and FIG. 4. The term "element", used in the following discussion, refers to the minimum architected functional unit required for synapse processing without weight modification capability, namely a weight register, a Y value register, and a multiplier symbolically indicated as $W_{ij}Y_j$. The first "cell", FIG. 3-A, is associated with the diagonal elements, $W_{ij} \times Y_i$, and the second "cell", G-CELL, FIG. 3-B, is associated with the rest of the elements $W_{ij}Y_j$ and contains two elements placed in the G-CELL, shown in a top and bottom arrangement. The modifications to the basic neural execution structure, FIG. 3-A and 3-B, are shown in FIGS. 4-A and 4-B and consist in the addition of a tag compare function, a command (CMD) register, a temporary (TEMP) register, Conditional Execution Bits (CEB) in each data register, a data path register, a command path bit, selector and distributor control register, and expanded functions in addition to multiplication, as represented by the Executions Unit (EXU) block. Briefly, the tag compare function allows for individual synapse processor "element" selection or all processor selection through a broadcast B bit. The commands control instruction and data paths as well as the expanded EXU function, a data path register and a command path bit are programmable storage elements. A temporary register provides additional storage capability in each element, and the selector and distributor structures control the internal element path selection based on the stored data/command paths and a command's source and destination addresses. The new form of processor cell is termed the Synapse Processor, SYP, DSYP for the diagonal cells and GSYP for the General Cells, G-CELLS.

An essential and novel architectural characteristic of the SYP cells supporting complete connectivity in a neural network model is briefly reviewed by examination of FIGS. 3-A and 3-B. For example, with a neural network model in an execution mode, implying a multiplication operation in each processing cell, the diagonal cell multiplies its stored weight with its stored Y value and supplies the multiplied result to the attached add tree. In the reverse communications mode for the diagonal cells, a Y value is received from the attached add tree and stored into the Y value register. The "G-CELLS" of the structure also generate a weight times Y value and supply the product to their attached add trees. In the reverse communications mode for these "G-CELLS", a $Y_j$ value received from the bottom multiplier add tree is stored into the top Y value register and likewise a $Y_i$ value received from the top multiplier add tree will be stored into the bottom Y value register. This switch in storing the Y values is an essential characteristic supporting complete connectivity. For the expanded cells, FIGS. 4-A and 4-B, this path switch is programmable, allowing further unique architectural features for processing. The synapse processor programmability is obtained through the commands or instructions which are received at a synapse processor CMD register from the attached Add tree which is in a reverse communications mode. Each SYP element upon receipt of an instruction will execute the operation specified by that instruction. The instruction types include a data and command path determining instruction, arithmetic, and logical instructions. Each SYP contains a command register for each processing element specifying the source and destination paths and EXU functions; a DSYP contains one command register, and the GSYP contains two command registers. Here see FIG. 3 for the preferred weight/Y Value Multiplication Structure and FIG. 4 for an illustration of our Synapse Processor Architecture.

Figure 5:
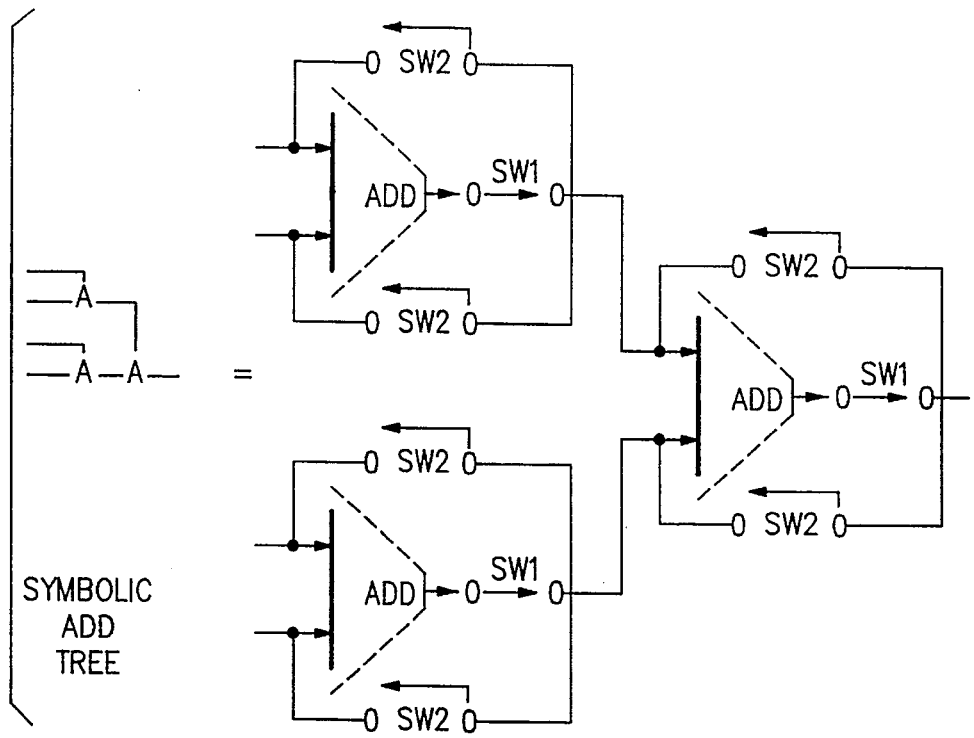
FIG. 5 shows a preferred communicating adder tree.

The function of the communicating adder tree—see T-SNAP—is reviewed with reference to FIG. 5. The symbolic subornation tree is shown on the left of FIG. 5 with Adders at each stage designated by the letter A. Pipeline latches have been left out for more clarity. The more detailed representation of the communicating adder tree structure that will be used is shown on the right-hand side of FIG. 5. Three Adder elements are shown in a 2 stage pipelined tree arrangement. The Add element has a switch 1, SW1, block on its output and two SWitch 2s, SW2, blocks bypassing the Adder. The communicating adder tree can be placed into one of two modes, namely a forward summation mode and a reverse communications mode, also termed a bypass mode. A common control signal is used at each adder element in order to guarantee that all nodes of the tree provide the same function. In a general sense though, the tree processing nodes could be of expanded functional capability, and the processing node control could be made more flexible by having separate control mechanisms in each of the tree nodes. The use of separate control lines or tagged commands to the tree processing nodes are two examples of mechanisms which would extend the trees' processing capabilities. The more extended functions of the tree node functional units may contain additional storage elements, as required by the function definition. For the purposes of this description, the communicating adder tree processing nodes will all provide the same function on their input data, namely summation or bypass communication, utilizing a common tree control signal which is enabled/disabled from a central control point. One of the functions specified by the tree control signal is the Adder bypass. Both switches, SW1 and SW2, have an on/off control which, when in the "off" state, keeps the switch open, i.e. in a high impedance state, and when in the "on" state bypasses the Adder via a low impedance path. When SW1 is enabled, SW2 is disabled and vice versa. In this manner, the Adder tree can provide the summation function, for example, in one direction, SW1's on–SW2's off, while essentially acting as a communication path in Adder bypass mode, SW1's off–SW2's on. The Adder tree using 2 to 1 functional elements, such as 2-1 adders, will require $\log_2 N$ stages. Alternatively, the forward Adder and communications path functions can be implemented with 3-1, 4-1, ..., N-1 functional elements, such as 3-1, 4-1, ..., N-1 adders, and their bypass switches, utilizing all the same element types or in combination, to produce the specified function. It should be noted that the Communicating Adder, FIG. 5, represents its logical function since, for example, depending upon technology, the SW1's function, where "off" equals a high impedance state, could be incorporated in the gate devices required by the last internal stage of each adder element, thereby adding no additional delay to the add function. Alternatively, a separate communications tree path could be provided, thereby allowing communications to occur, for example, while a summation function is in progress.

Figure 6B:
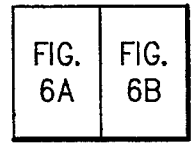
FIGS. 6A and 6B illustrate a 4-neuron general purpose learning machine with synapse processor architecture.
Figure 6:
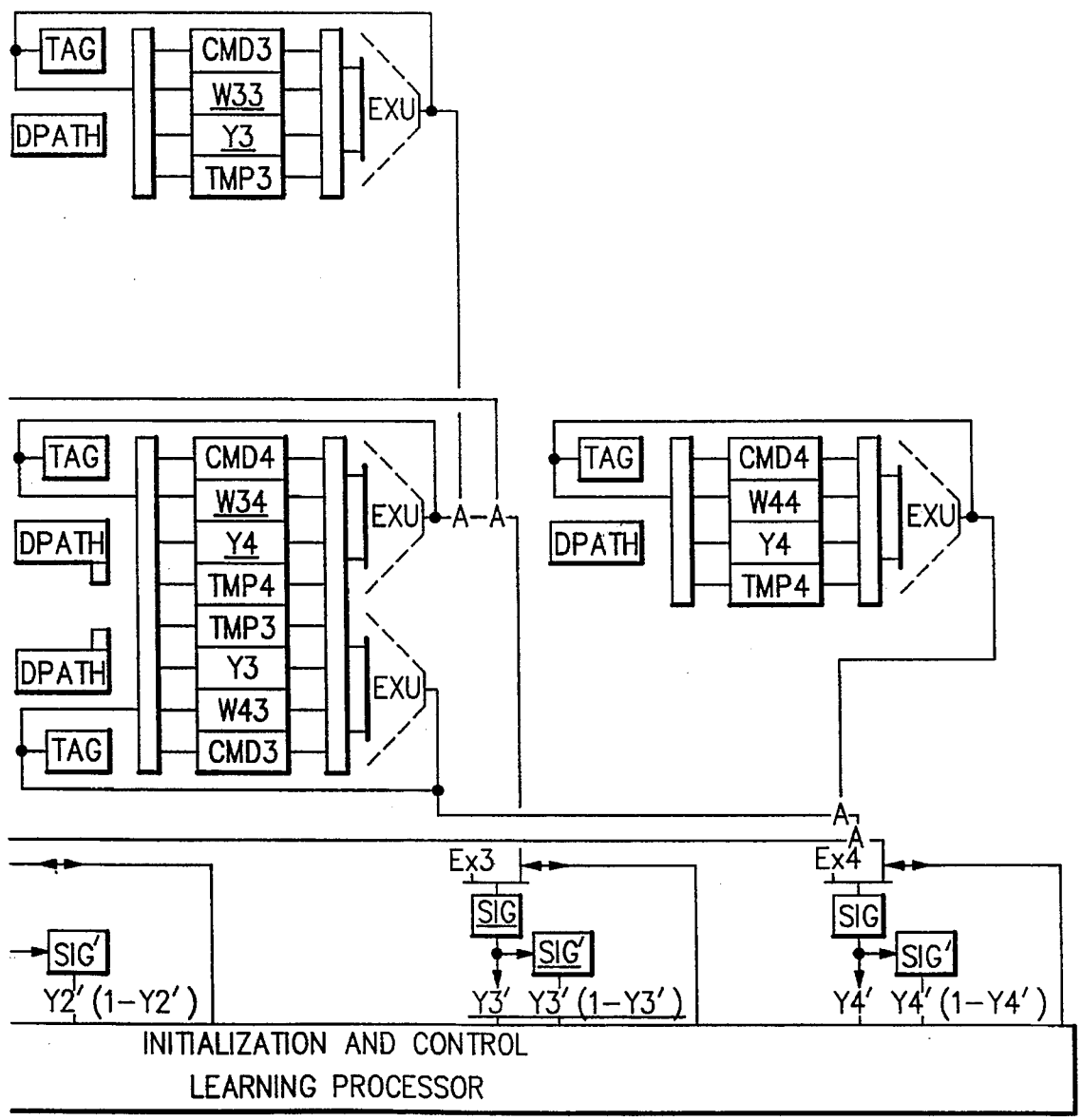

A 4 neuron example is shown in FIG. 6 which connects the communicating adder trees and sigmoid generators to provide a complete picture of the modified SPA structure used in a General Purpose Learning Machine (GPLM) and to symbolically indicate the top and bottom connections for the Add tree. In FIG. 6, the sigmoid generator, SIG, provides the function as described in equations 2 and 3 and the Y derivative generator, SIG', provides the function described by equation 12. The networks external inputs $Ex_i$ are supplied to a final adder stage prior to the sigmoid generators. The learning processor represents a central control point for the array of synapse processors and interfaces with the Host computer which has access to the learning processor's internal storage containing the modeled network's connection weights, neuron Y values, Y derivative values, "teacher" values, and traced values. Some of the functions the learning processor possesses are the following:

1. All synapse processor initializations
2. Starting the GPLM
3. Stopping the GPLM
   Convergence checking of a modeled network's output as compared to the desired output.
   Host specified R update cycles have been completed.
4. Communicating Adder Tree control
5. Synapse processor instruction issuing
6. Sequence control for multi-layer networks
7. Synapse processor data issuing
8. All δ, calculations in learning algorithms The synapse processor registers associated with a neuron input are connected in a serial daisy chained fashion for LSSD scanning. See Eichelberger 77. LSSD scanning supports testing and register initialization. Each neuron may have one or up to multiple scan strings depending upon an implementation technology. For example, a separate scan path containing only the weight registers for each neuron can be provided resulting in N weight register scan paths interfacing with the learning processor. The learning processor will initialize the weight registers via the scan path while the weight updates in learning mode will be accomplished in parallel within the GPLM structure. The Y values are initialized, if required, by reverse communicating them through the adder tree structure. An example of the storage of elements required in a neural calculation for neuron 3 is written here and highlighted in FIG. 6.

$$Y_3 = F(W_{3,1}Y_1 + W_{3,2}Y_2 + W_{3,3}Y_3 + W_{3,4}Y_4)$$

Figure 7:
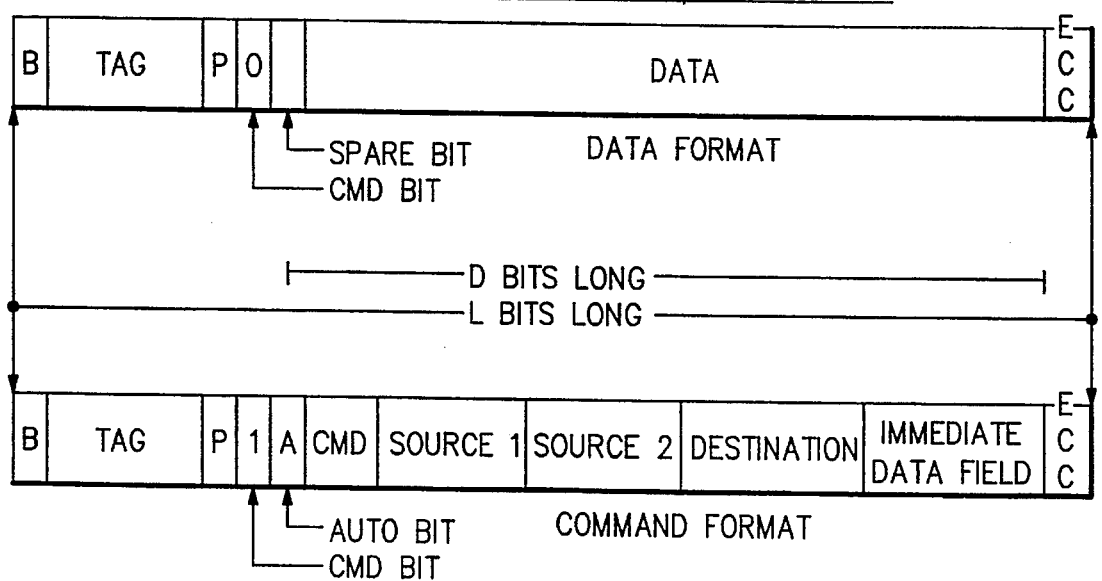
FIG. 7 illustrates a synapse processor tagged instruction/data format.

FIG. 6 illustrates a 4-neuron General Purpose Learning Machine with Synapse Processor Architecture. Each neuron output, $Y_i$, is attached to the learning processor which issues the instructions to the $Y_i$ neuron's synapse processors through the reverse communications path of the Add tree. Both specific synapse processor element and group synapse processor control can be obtained with the addition of tag bits and a Broadcast, "B", bit added to all communications, and tag and "B" bit compare functions in each synapse processor. FIG. 7 depicts the instruction and data format. A "B" bit is added as the first bit in the field indicating a broadcast command/data for B=1 and a tagged command/data for B=0. A broadcast message/data goes to all N synapse processors linked to a particular $Y_i$ neuron independent of the TAG. The TAG field must be at least $\log_2 N$ bits long allowing specific identification of all synapse processors belonging to a neuron. The received tag is bit by bit compared with a stored tag in each synapse processing element which after the last tag bit compare is completed it is known whether the following CMD/DATA is to be received by a particular synapse processor element. A tag match results in the CMD or Data being received while a no match situation prevents the reception of the CMD/Data. A parity bit or error correction bits denoted by a P can also be included in the tag field, as shown in FIG. 7, for error handling reasons.

The reverse communicated commands or data also contain a single bit (CMD) indicating whether the bit string is data or command, an AUTO bit indicating a special automatic execution mode, and error correction/detection bit/s (ECC). It is assumed that the command and data bit lengths are of equal length. Table 1 contains the Synapse Processor instruction set.

Utilizing the Hopfield neural network model—see Hopfield 84—as an example, an automatic mode can be specified for a network operation, where instead of requiring the repeated sending of a MPY instruction after each network execution cycle in order to initiate the next network cycle the automatic mode would start the next update cycle automatically after receipt of the newly calculated Y values. This automatic mode is initiated by setting the AUTO bit to a "1" in the command desired, such as MPY for use in the Hopfield network model, which sets an automatic mode flag in the synapse processors. The first operation is initiated with the receipt of the instruction with the AUTO bit set to a "1". The instruction would be repeated upon receipt of the new updated data continuing until a new command is received which stops the processing, such as receipt of a NOP instruction. A capital A will be appended to an instruction mnemonic to indicate that the auto bit is to be set to a "1", for example MPYA.

The source and destination addresses are relative to the command register. The relative addressing is shown in FIG. 4-B where the top command register CMD TREG relative addresses are shown in columnar fashion located to the right of the register blocks, while the relative addressing for the bottom command register CMD BREG is shown in columnar fashion located to the left of the register blocks. It should be noted, for example, that the bottom command register R2 is the same as the top command register R5. A bit string received from the Add tree, if it is a command, is serialized into one of the two CMD registers in each G-cell and the single CMD register of a diagonal cell. Alternatively, a data bit string received from the Add tree, is serialized to one of the six other registers available in a G-cell and one of the 3 other registers available in a diagonal cell. In the DSYPs a source or destination address of R4 through R6 and CR2 are mapped as follows:

R4→R3

R5→R2

R6→R1

CR2→CR1

For example, assume a three bit source or destination address. Then by having the GSYPs use all three bits and the DSYPs use only the 2 lsb bits the proper mapping can be provided:

000→CR1

001→R1

010→R2

011→R3

100→CR2

101→R6

110→R5

111→R4

The destination register path remains as specified by a PATH instruction and is stored in a data path register or in a command path bit register. The PATH command must be reissued if a different path is desired. If no command is specified, the default register path is as described in T-SNAP. All synapse processor data registers are (D+1) bits in length, due to the conditional execution bit in each data register. See FIG. 7 showing the instruction and data formats. If a CEB is set to a "zero" in an instruction's destination register, that command will be treated as a NOP instruction, ie. the destination register's contents will not be changed and "zeros" will be fed to the Add tree. If the CEB is set to a "one" the register's contents can be modified. For example, this bit is used on the weight registers to identify the presence or absence of a connection since a zero weight value is not always sufficient to accomplish this, as will be seen in the Boltzmann like machine example presented later. "Zeros" are always fed to the Add tree if the Add tree is not a destination point or a NOP situation is occurring. The CEBs can be set upon initialization through the chip's scanning facility or the path command.

Table 1 lists the present preferred instruction set functions.

TABLE 1

| SYNAPSE PROCESSOR INSTRUCTION SET | | | | | | | |
|---|---|---|---|---|---|---|---|
| CMND | *AUTO* | SOURCE 1 | SOURCE 2 | DESTINATION | | IMMED. DATA | COMMENTS |
| PATH | N.U. | N.U. | N.U. | R1, R2, R3, R4, R5, R6 CR1, CR2 | C E B | NOT USED (N.U.) | IF DESTINATION IS CR1 OR CR2 SET THE COMMAND PATH BIT TO A 0 FOR CR1 AND A 1 FOR CR2. (CEB FIELD NOT USED) ELSE SET THE DATA PATH REGISTER TO THE DESTINATION ADDRESS AND THE DESTINATION REGISTER'S CEB AS SPECIFIED. |
| NOP | N.U. | N.U. | N.U. | N.U. | | N.U. | NO OPERATION |
| MPY | 0 = NO 1 = AUTO | R1, R2, R3, R4, R5, R6, IMD1, IMD2 | R1, R2, R3, R4, R5, R6, IMD1, IMD2 | R1, R2, R3, R4, R5, R6, ADD TREE | | DATA | IMD1/2 = CMD REG 1/2 IMMEDIATE DATA |
| ADD | 0 = NO 1 = AUTO | R1, R2, R3, R4, R5, R6, IMD1, IMD2 | R1, R2, R3, R4, R5, R6, IMD1, IMD2 | R1, R2, R3, R4, R5, R6, ADD TREE | | DATA | |
| AND | 0 = NO 1 = AUTO | R1, R2, R3, R4, R5, R6, IMD1, IMD2 | R1, R2, R3, R4, R5, R6, IMD1, IMD2 | R1, R2, R3, R4, R5, R6, ADD TREE | | DATA | |
| OR | 0 = NO 1 = AUTO | R1, R2, R3, R4, R5, R6, IMD1, IMD2 | R1, R2, R3, R4, R5, R6, IMD1, IMD2 | R1, R2, R3, R4, R5, R6, ADD TREE | | DATA | |

TABLE 1-continued

SYNAPSE PROCESSOR INSTRUCTION SET

| CMND | *AUTO* | SOURCE 1 | SOURCE 2 | DESTINATION | IMMED. DATA | COMMENTS |
|------|--------|----------|----------|-------------|-------------|----------|
| IMV | 0 = NO<br>1 = AUTO | R1, R2, R3, R4,<br>R5, R6, IMD1,<br>IMD2 | N.U. | R1, R2, R3, R4,<br>R5, R6,<br>ADD TREE | DATA | |
| EXOR | 0 = NO<br>1 = AUTO | R1, R2, R3, R4,<br>R5, R6, IMD1,<br>IMD2 | R1, R2, R3, R4,<br>R5, R6, IMD1,<br>IMD2 | R1, R2, R3, R4,<br>R5, R6,<br>ADD TREE | DATA | |
| CMPR | 0 = NO<br>1 = AUTO | R1, R2, R3, R4,<br>R5, R6, IMD1,<br>IMD2 | R1, R2, R3, R4,<br>R5, R6, IMD1,<br>IMD2 | TRF, BRF, EF<br>FLAGS | DATA | TRF = TOP<br>REG. > BOT REG. or IMD1/2<br>BRF = BOT<br>REG. > TOP REG. or IMD1/2<br>EF = TOP<br>REG. = BOT REG. or IMD1/2 |
| MIN | 0 = NO<br>1 = AUTO | R1, R2, R3, R4,<br>R5, R6, IMD1,<br>IMD2 | R1, R2, R3, R4,<br>R5, R6, IMD1,<br>IMD2 | R1, R2, R3, R4,<br>R5, R6,<br>ADD TREE | DATA | MIN(SOURCE1, SOURCE2) =<br>DESTINATION |
| MAX | 0 = NO<br>1 = AUTO | R1, R2, R3, R4,<br>R5, R6, IMD1,<br>IMD2 | R1, R2, R3, R4,<br>R5, R6, IMD1,<br>IMD2 | R1, R2, R3, R4,<br>R5, R6,<br>ADD TREE | DATA | MAX(SOURCE1, SOURCE2) =<br>DESTINATION |

*AUTO* = 1 → AUTOMATIC REPEAT OF FUNCTION AFTER RECEIPT OF UPDATED DATA FROM SOURCE EXTERNAL TO SYNAPSE PROCESSOR

As indicated, the PATH command sets up the data and command path within a synapse processor for information reverse communicated up the Adder tree and this path remains the same unless a new PATH command is received which changes the path. For example, in a Hopfield network model on GPLM. if the default path had been changed due to previous processing, the PATH command would be issued once allowing, in reverse communication mode, the top Adder tree to connect its received Y value to the bottom Y value register and the bottom Adder tree to connect its received Y value to the top Y value register. For the Hopfield model this path command remains in effect through out the network execution, assuming a fixed weight mode of execution. The PATH command also allows the specification of the path for the next commands. This represents an interesting new function in that it allows the neurons to operate in two unique modes. In the first mode, termed YINMODE, for all neurons, the command received from the bottom Adder tree is sent to CMD BREG (CR1), and the command received from the top Adder tree is sent to CMD TREG (CR1). Then, for YINMODE all neuron input SYPs will function as specified in the command field. In this way each neuron can be specified with a different input synapse processing function, common across all inputs to that neuron. For example, all inputs to neuron 8 may be specified with a weight register value * neuron Y value multiply operation while all inputs to neuron 7 may be specified with an Temp. register value * neuron Y value operation. Since all neuron communicating adder trees are independent of each other, each neuron input function can have different execution times in YINMODE for different neurons, but note that if this is the case the summation results would occur at different times, which can cause synchronization problems in the learning processor if not handled. YINMODE can be used to asynchronously select a neuron for processing. In the second mode, termed YOUTMODE, for all neurons, the command received from the bottom Adder tree is sent to CMD TREG (CR2), and the command received from the top Adder tree is sent to CMD BREG (CR2). Then, for YOUTMODE all neuron Y value outputs will have the same synapse function applied at their input destination SYP. In this way, each neuron can have multiple functions at its input SYPs. For example, all Y8 destination SYPs may be specified with a weight register value * neuron Y value multiply operation while all Y7 destination SYPs can be specified with a Temp. register value * neuron Y value operation. All functions specified at a neuron input must execute in the same length of time even though the functions are different. In general, YINMODE and YOUTMODE can not be interchanged within a single network structure as conflicts could result. In the initial description of TSNAP in T-SNAP, the neurons functioned in a fixed operational mode which corresponds to YOUTMODE in GPLM with all neuron specified with the same function. The input/output encoder problem and the Boltzmann like machine example will make use of the YINMODE. An example of a Boltzmann like machine will follow the back-propagation example presented in this description.

Many instructions specify a destination which is local to the individual synapse processor. This local processing can cause synchronization problems if not handled correctly. Instead of proliferating synchronization mechanisms throughout the GPLM structure the synchronization problem will be localized to the learning processor at the neuron output point. No notification of local processing completion will be generated from the synapse processors. Rather a fixed hardware mechanism will be provided at the neuron output point to guarantee safety of the operations. It is also not desirable to "solve" the problem via means of queues at the synapse processor locations as this increases the size of the synapse processor limiting the number which could be placed on a single chip. Rather, the instruction issuing point will resolve and avoid all hazards. Any local processing command to the same synapse processor must be separated from the next command to that same synapse processor by the specified synapse processor instructions execution time. For example, a multiply that takes 2L clocks to ensure the completion of a MPY command must complete before the second command can be sent. This is necessary so that a command buffer register is not required, as each command must remain constant in a synapse processor during the operation of the function commanded. Nonlocal instructions, i.e. those instructions where the destination is the ADD TREE provide notification of operation completion when the converged tree result reaches the learning processor. For non-local instructions, the learning processor waits until a result is received before sending a new instruction to the synapse processors attached to that tree. Each neuron output point, in the learning processor, can then be set up with a synchronization mechanism to safely issue instructions to each synapse at a maximum rate.

As a final note, a GPLM compiler would be required to ensure no destination conflicts occur in programs using the described instruction set.

BACK-PROPAGATION LEARNING EXAMPLE

An input/output encoder problem will be used to demonstrate how back-propagation is employed on the GPLM structure. Table 2 presents the input to output pattern encoding problem. See Rumelhart 86.

TABLE 2

INPUT/OUTPUT ENCODING PROBLEM

| INPUT PATTERNS | | OUTPUT PATTERNS |
|---|---|---|
| 00 | → | 1000 |
| 01 | → | 0100 |
| 10 | → | 0010 |
| 11 | → | 0001 |

Figure 8:
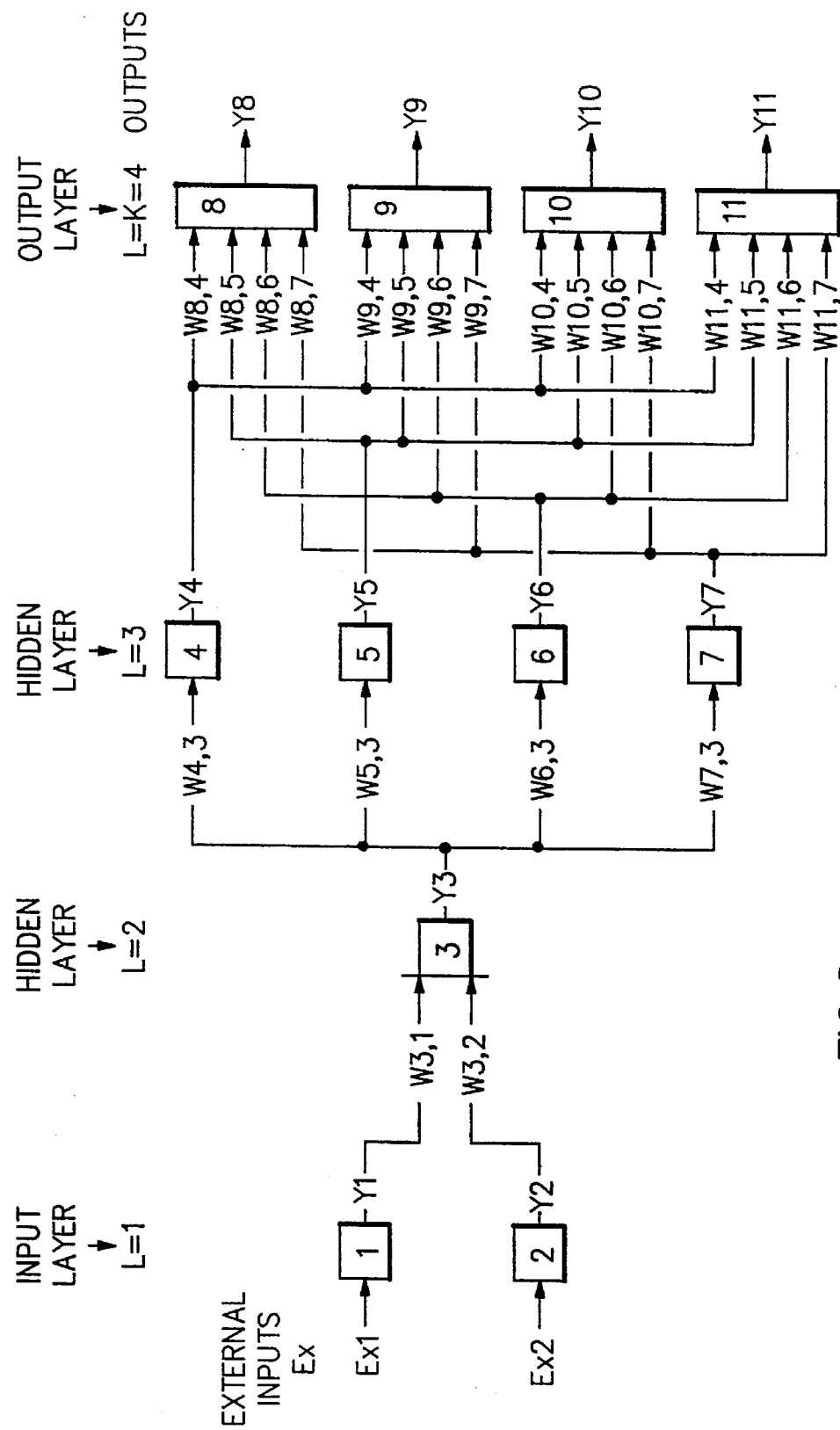
FIG. 8 illustrates a neural network for the input/output encoding problem.

The network structure used for this problem is shown in FIG. 8. illustrates a neural network for the input/output encoding problem and Since all neuron outputs are available to the learning processor there is no such thing as hidden units in multilayer networks when mapped onto a GPLM structure. Multi-layer networks are mapped onto a completely connected network structure where unused connection paths are kept at a zero weight value by the weight registers+ Conditional Execution Bit being set to zero. There are 11 neurons used in the input/output encoding problem requiring an 11 neuron GPLM structure. The input/output encoder problem does not require all possible connections available in the 11-neuron GPLM structure. For example, the input/output encoder network equation for neuron 9 is:

$$Y_9 F(W_{9,4}Y_4 + W_{9,5}Y_5 + W_{9,6}Y_6 + W_{9,7}Y_7)$$

Figures 9, 9A:
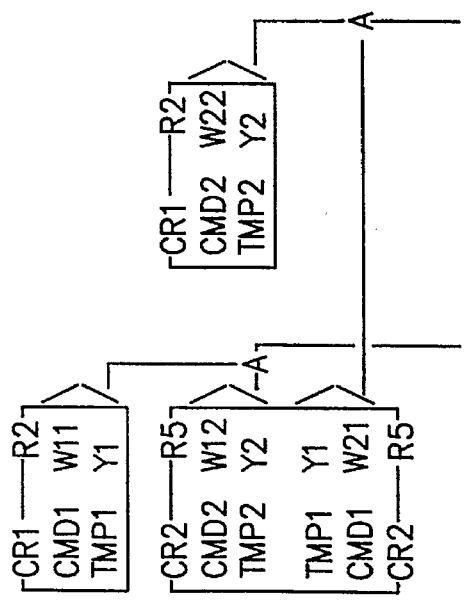
FIGS. 9, 9A–9F, illustrate our synapse processor architecture implemented on GPLM.
Figure 9B:
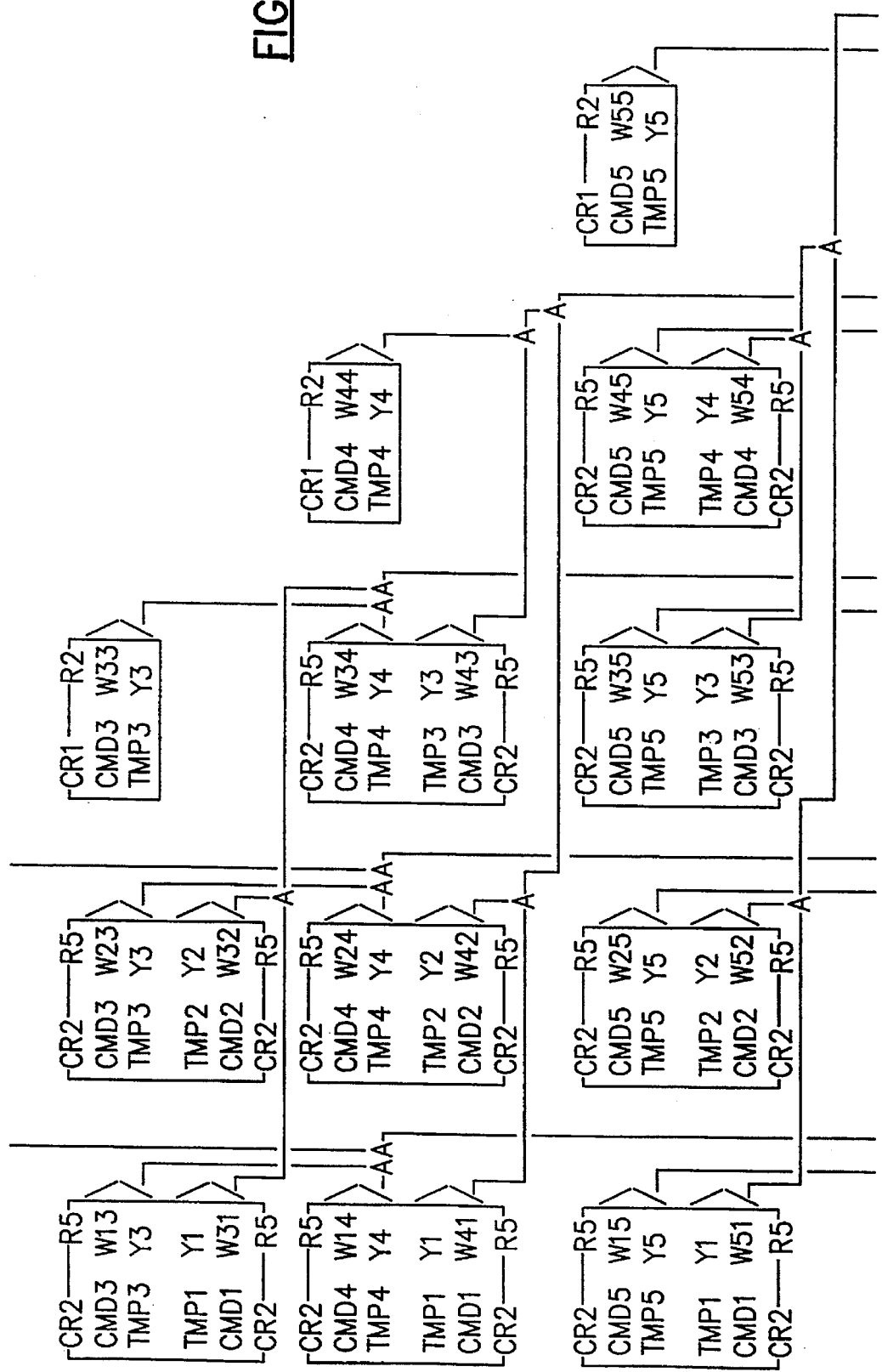
Figure 9C:
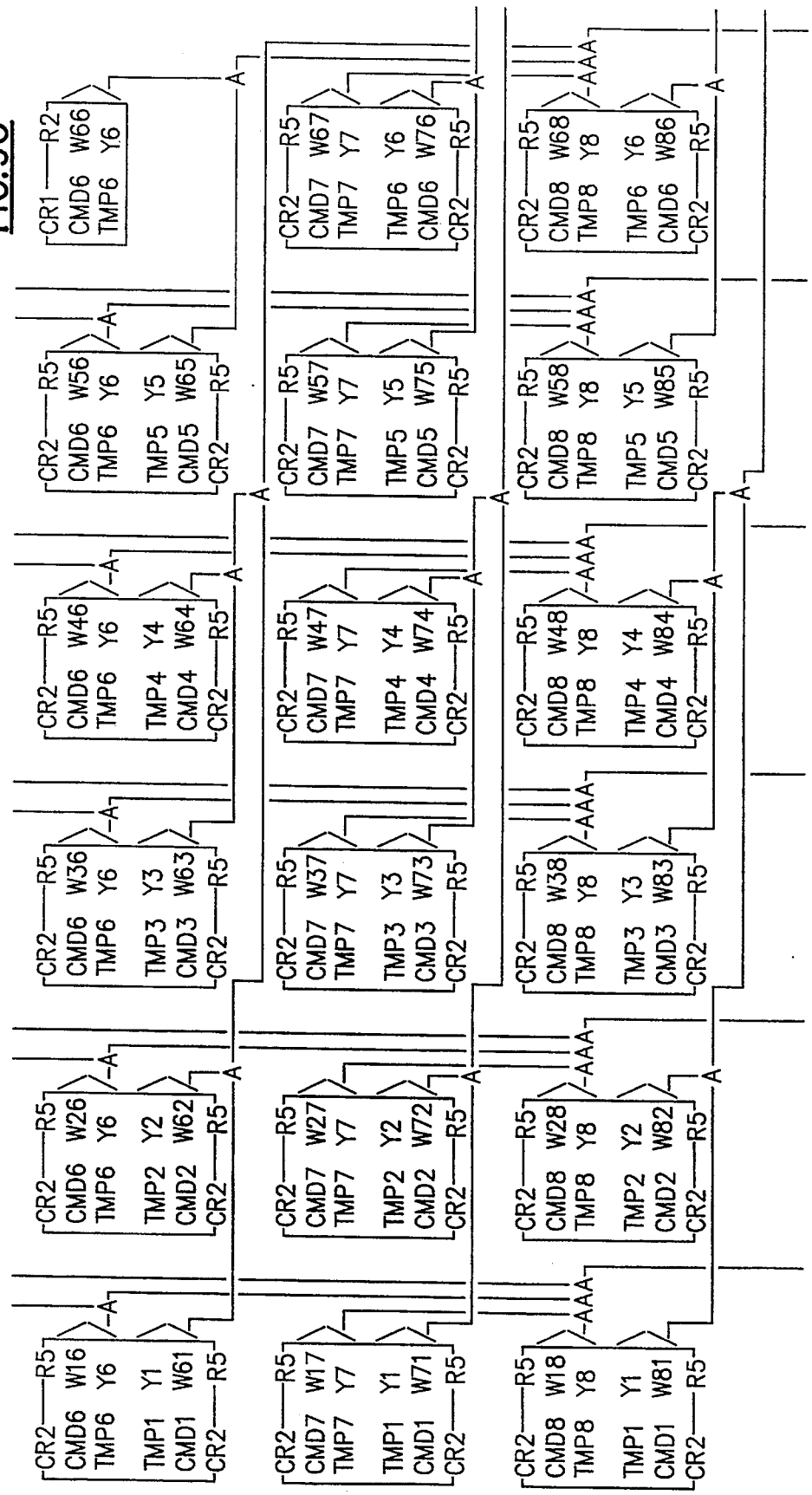
Figure 9D:
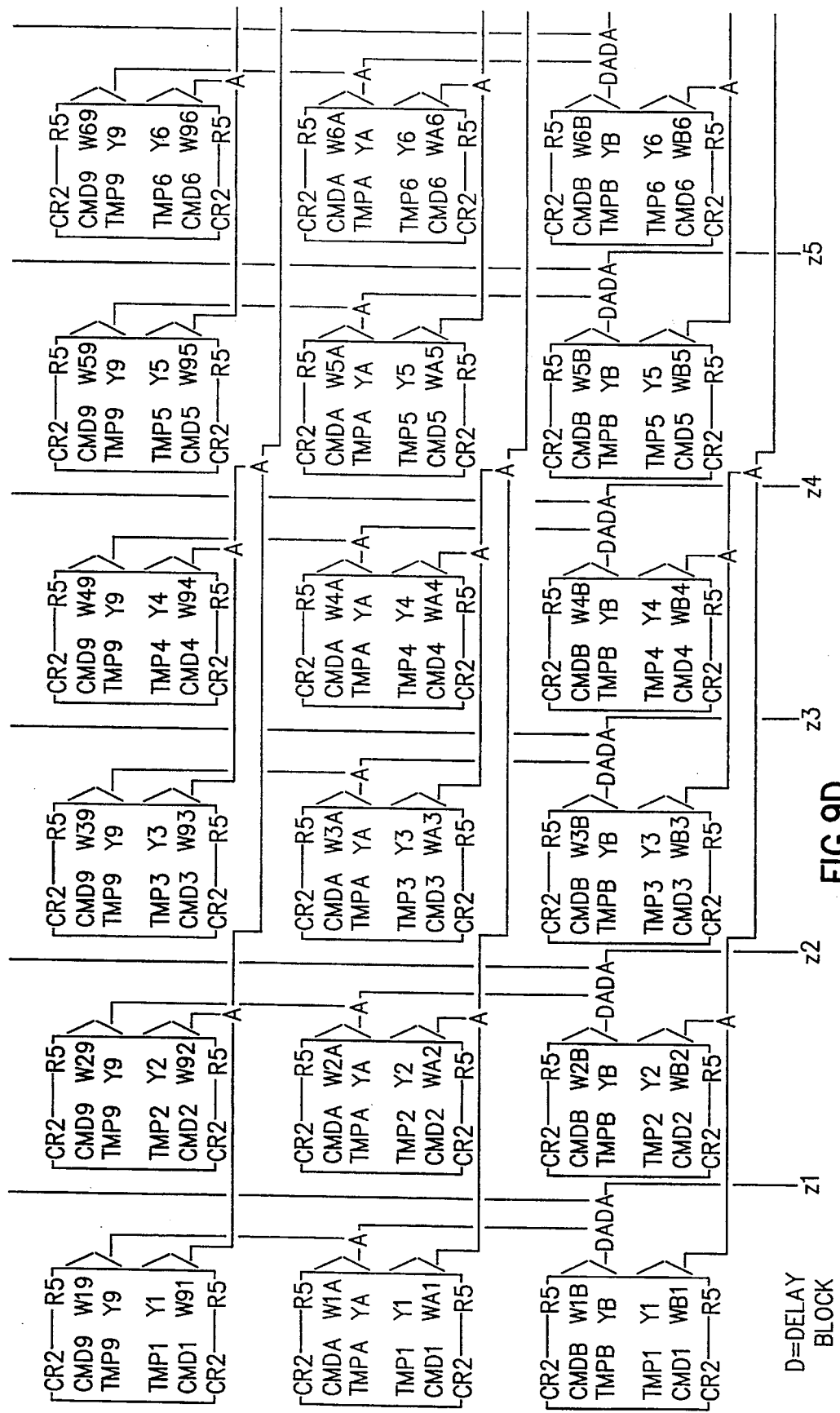
Figure 9E:
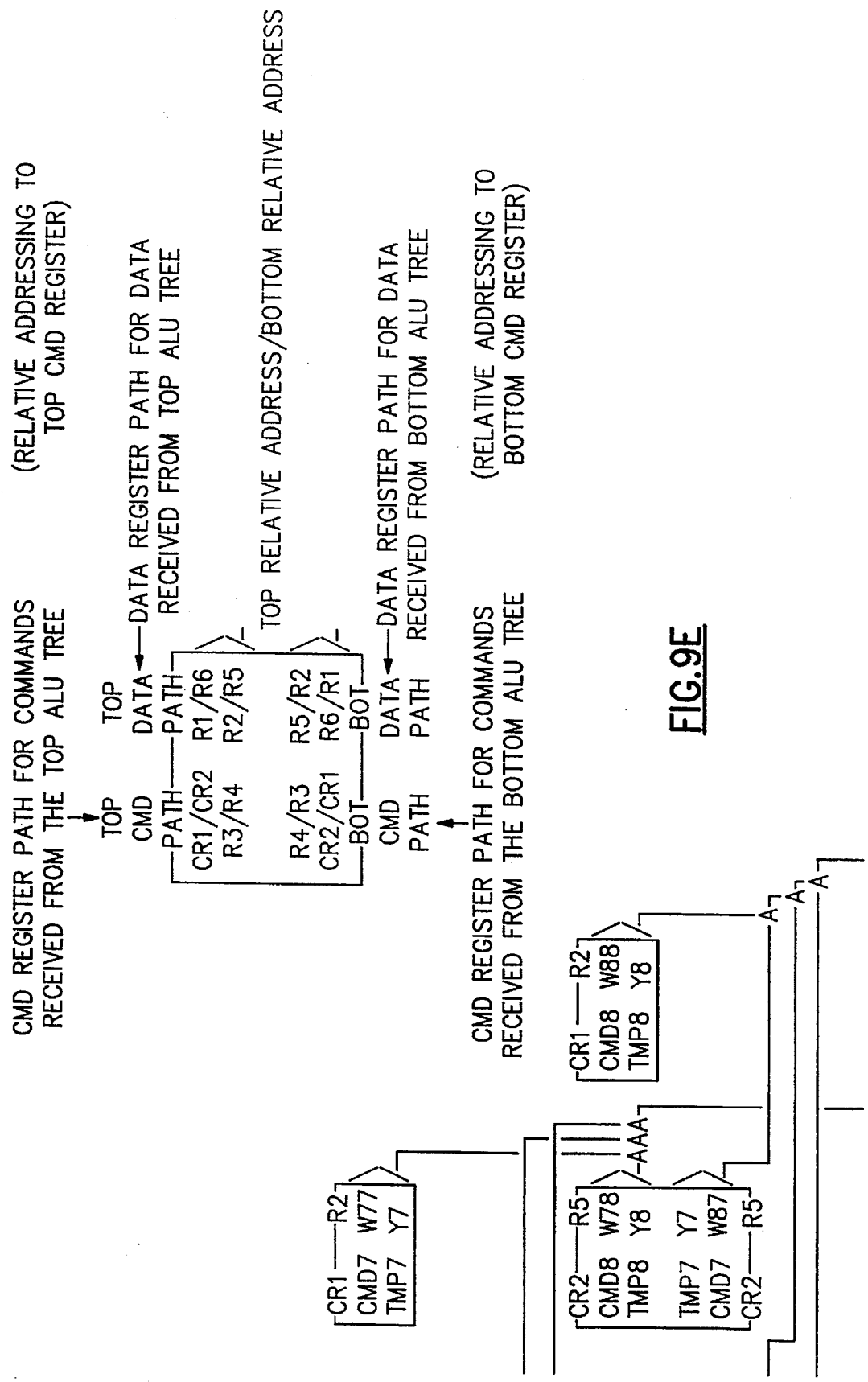
Figure 9F:
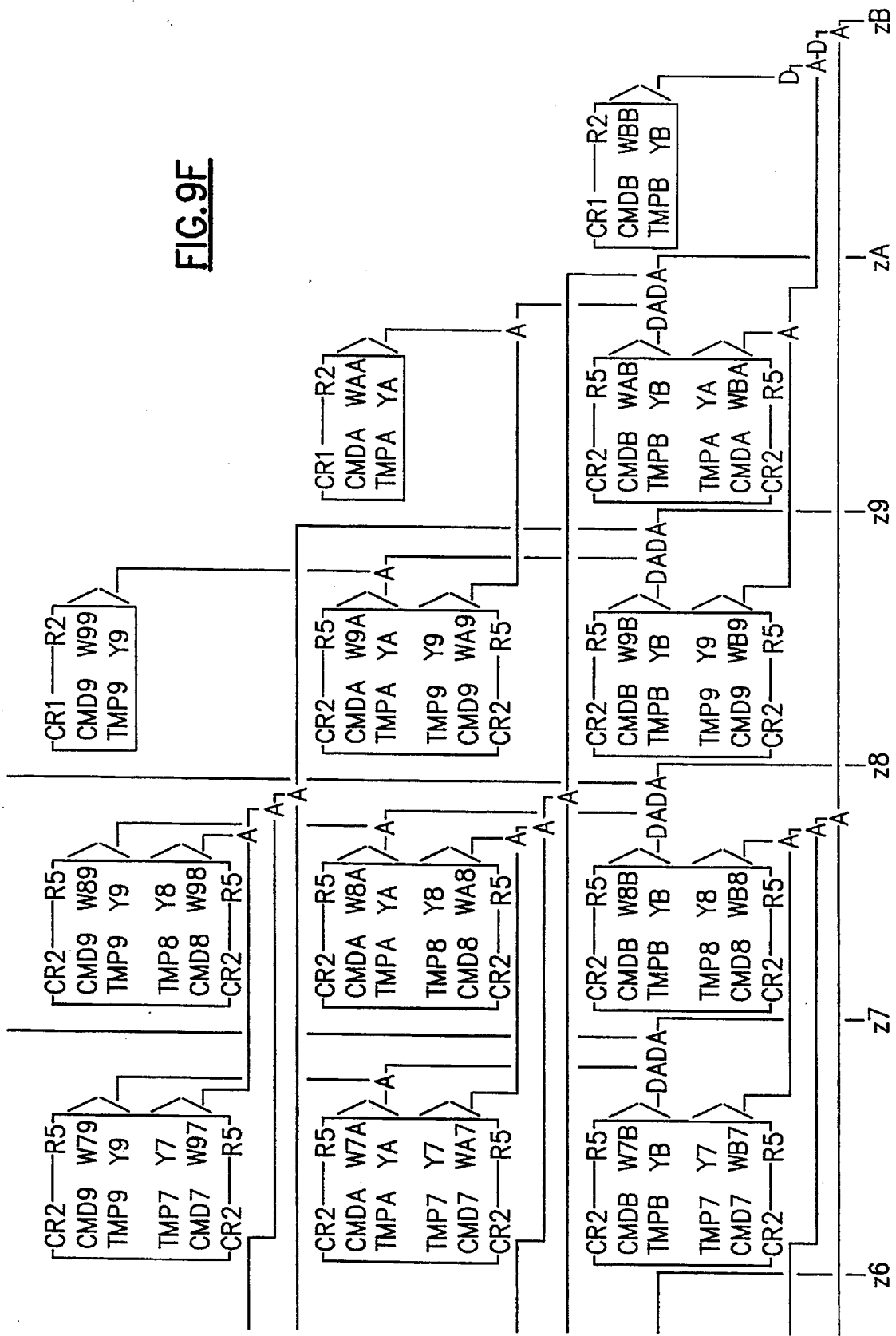
Figure 10B:
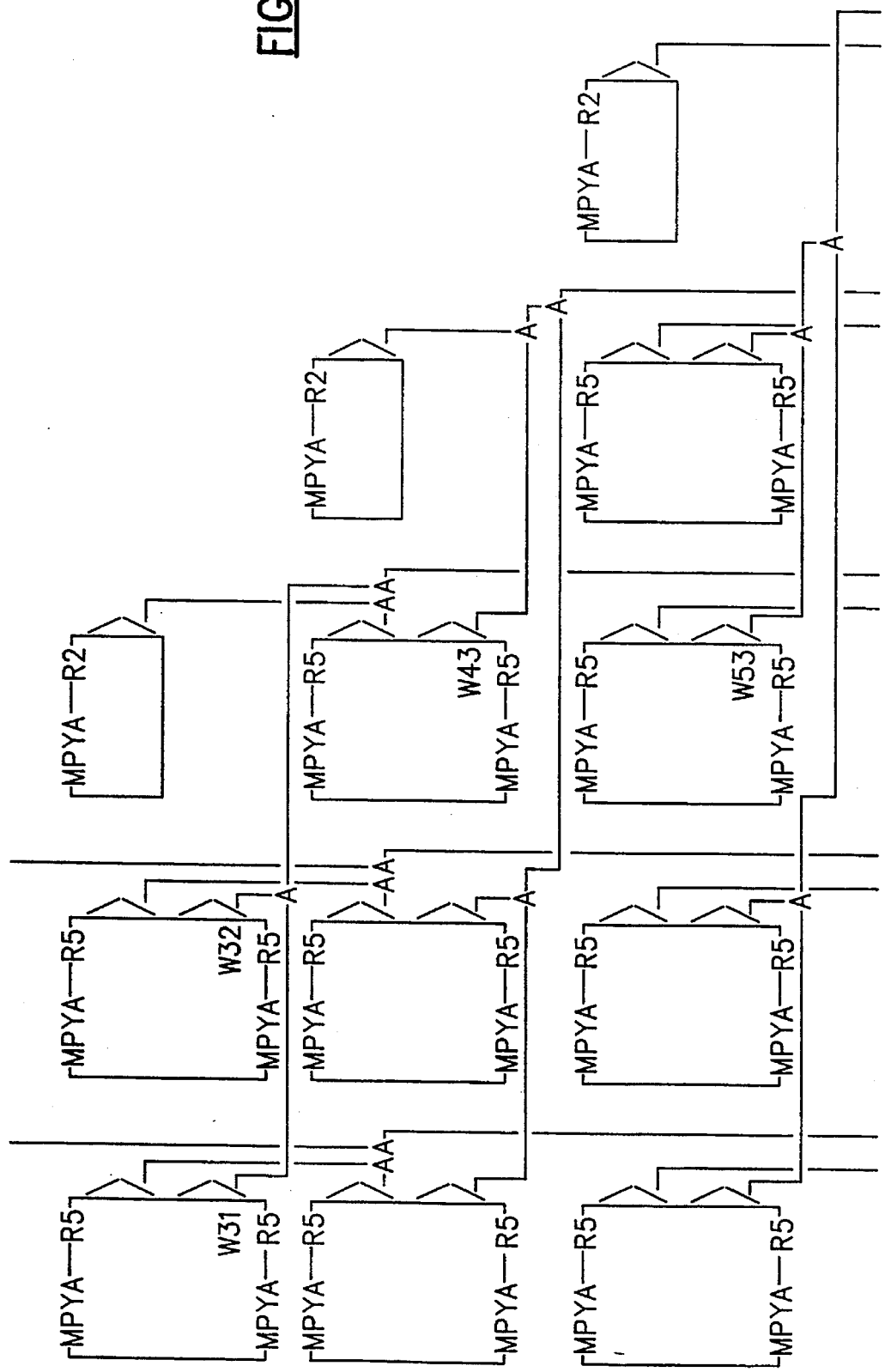
Figure 10C:
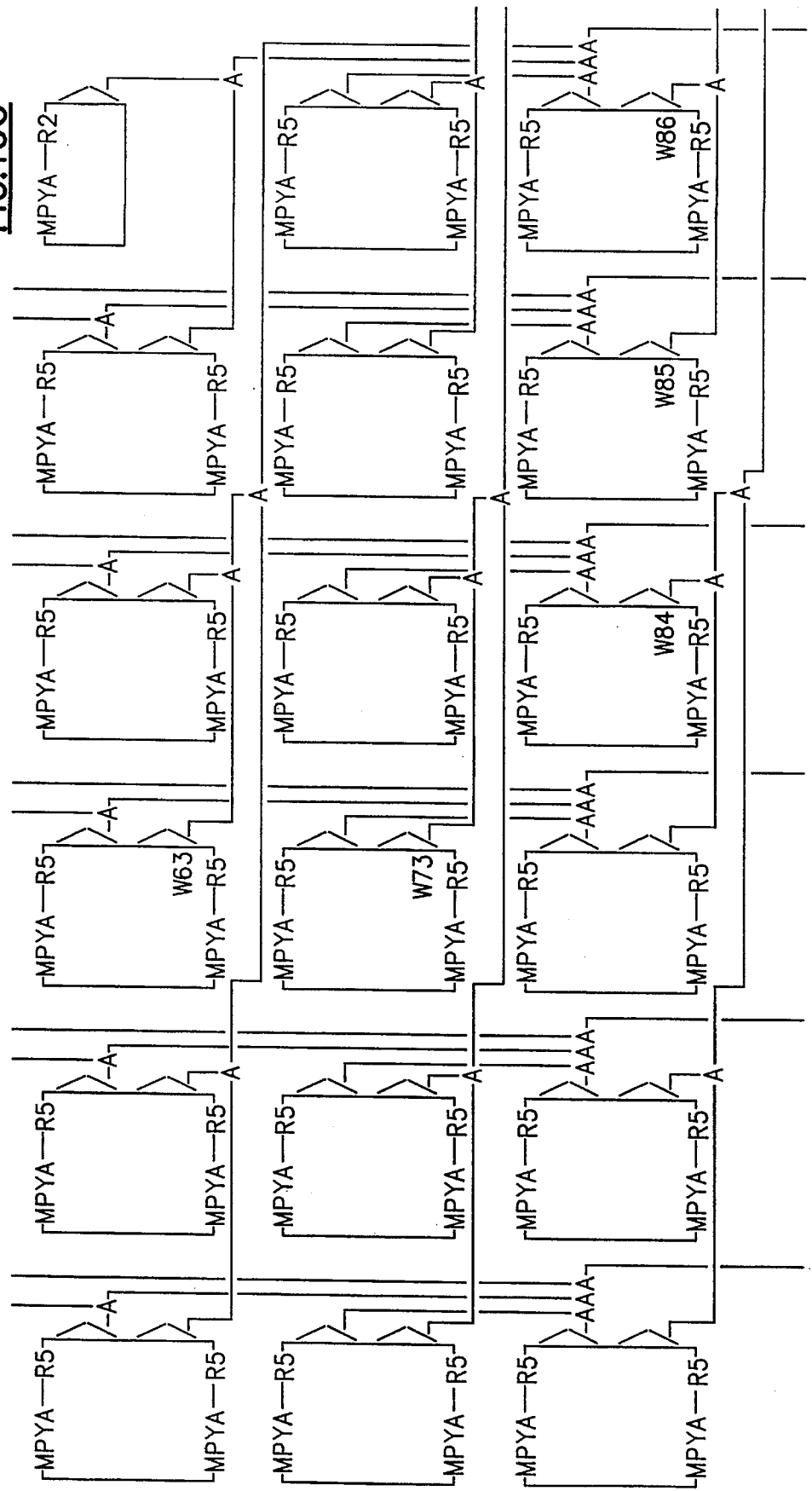
Figure 10D:
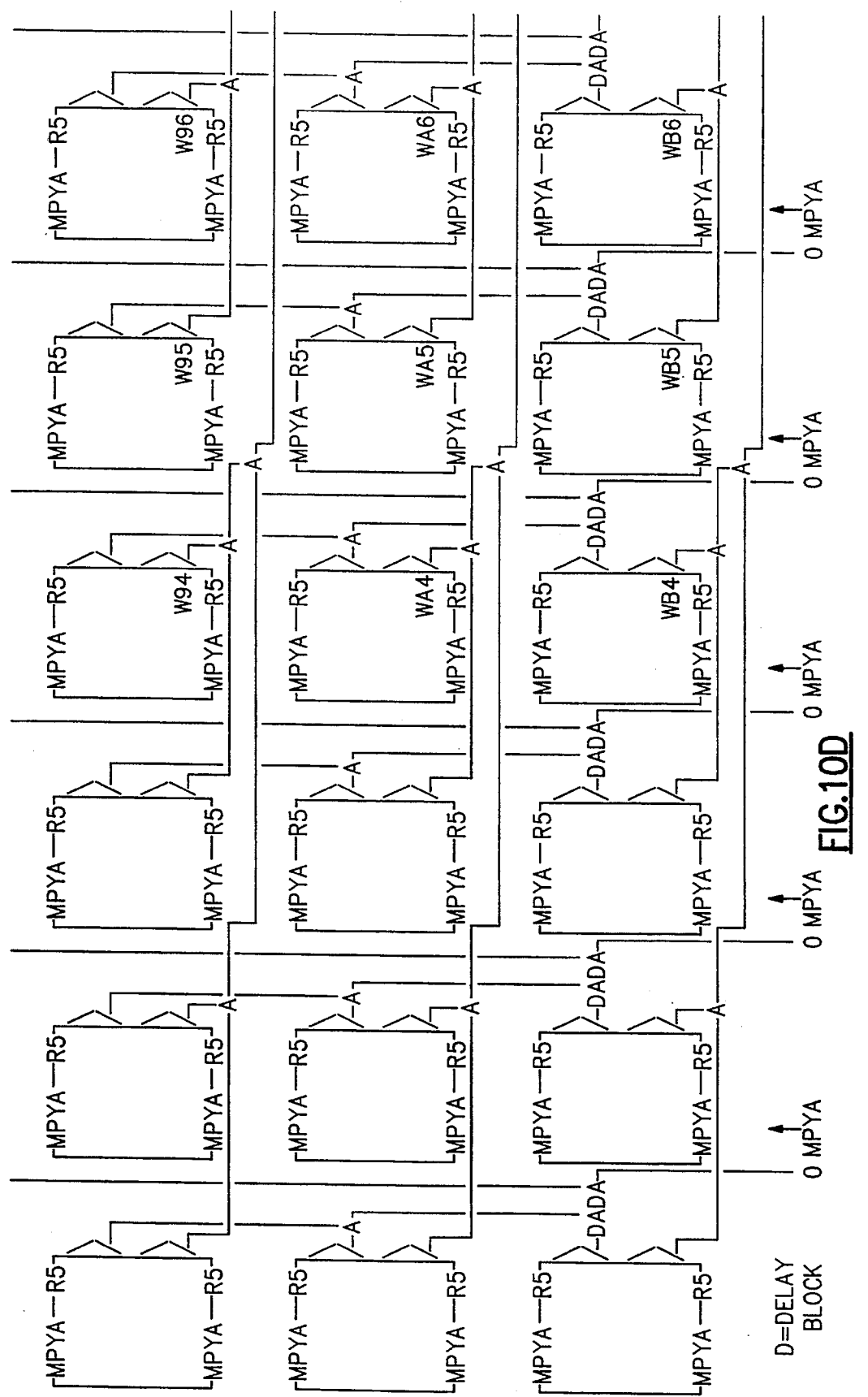
Figure 10E:
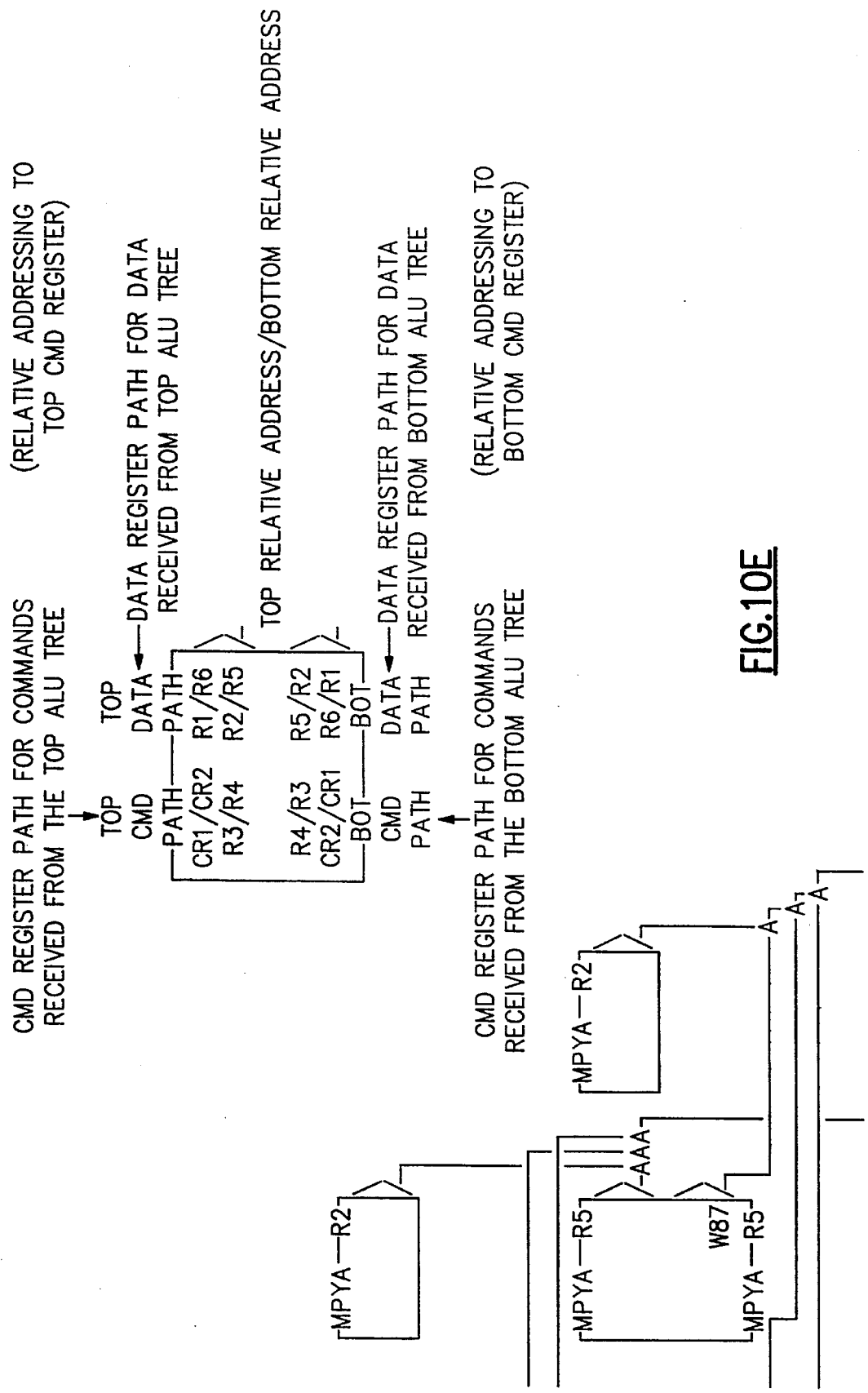
Figure 10F:
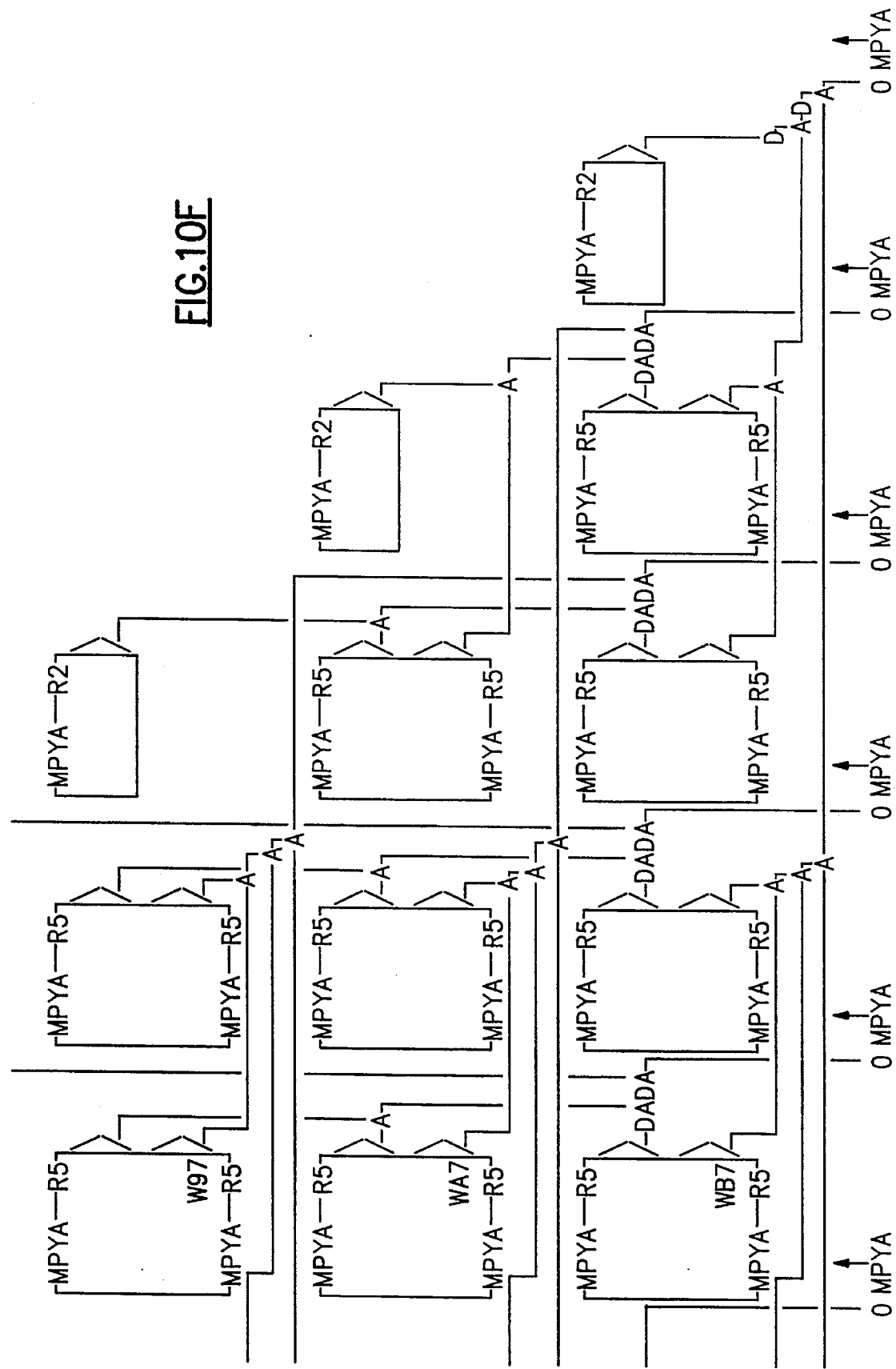
Figures 11, 11A:
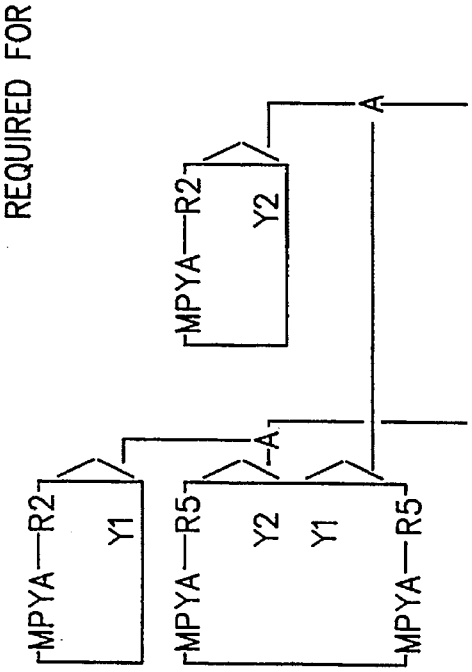
Figure 11B:
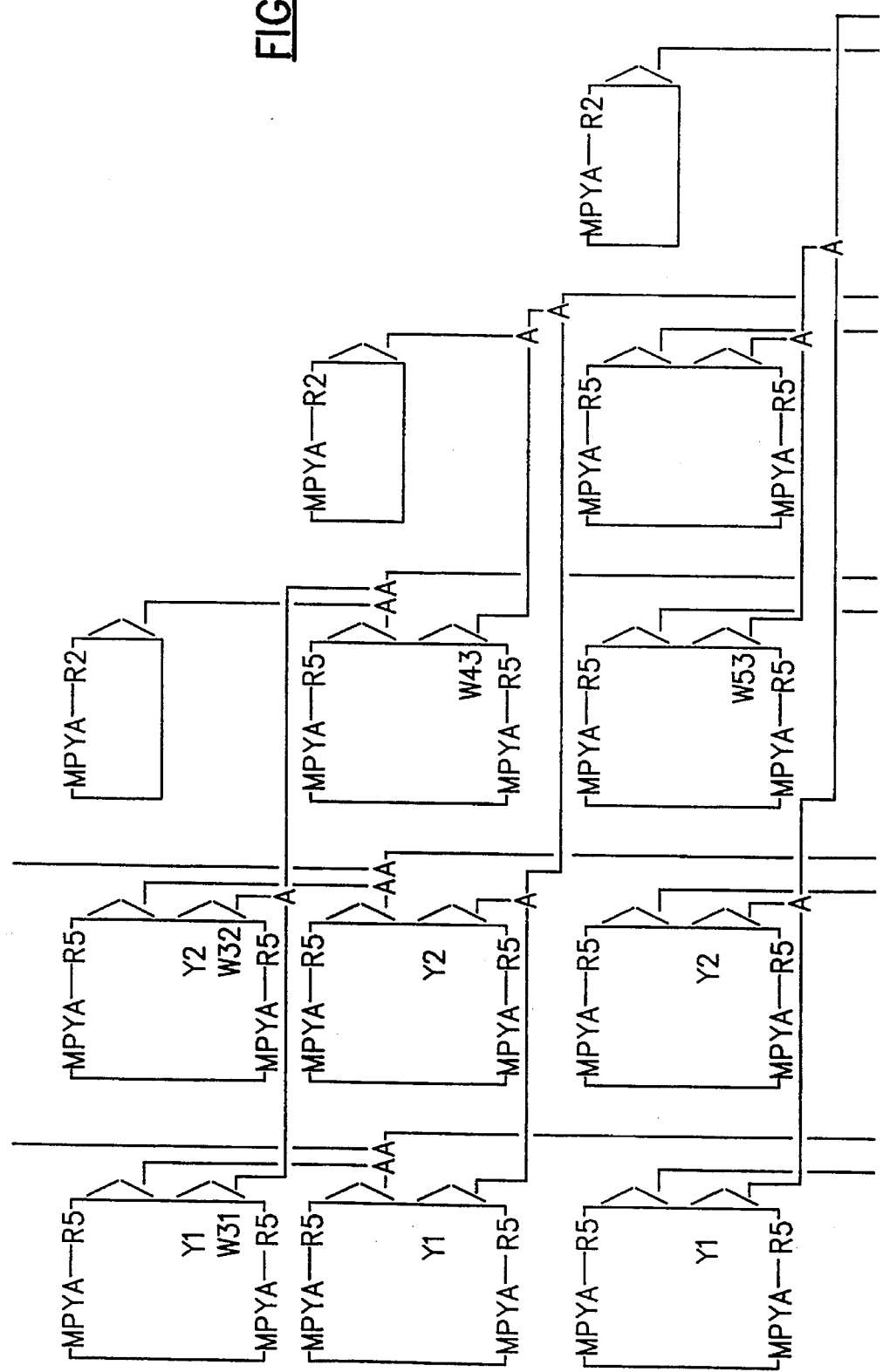
Figure 11C:
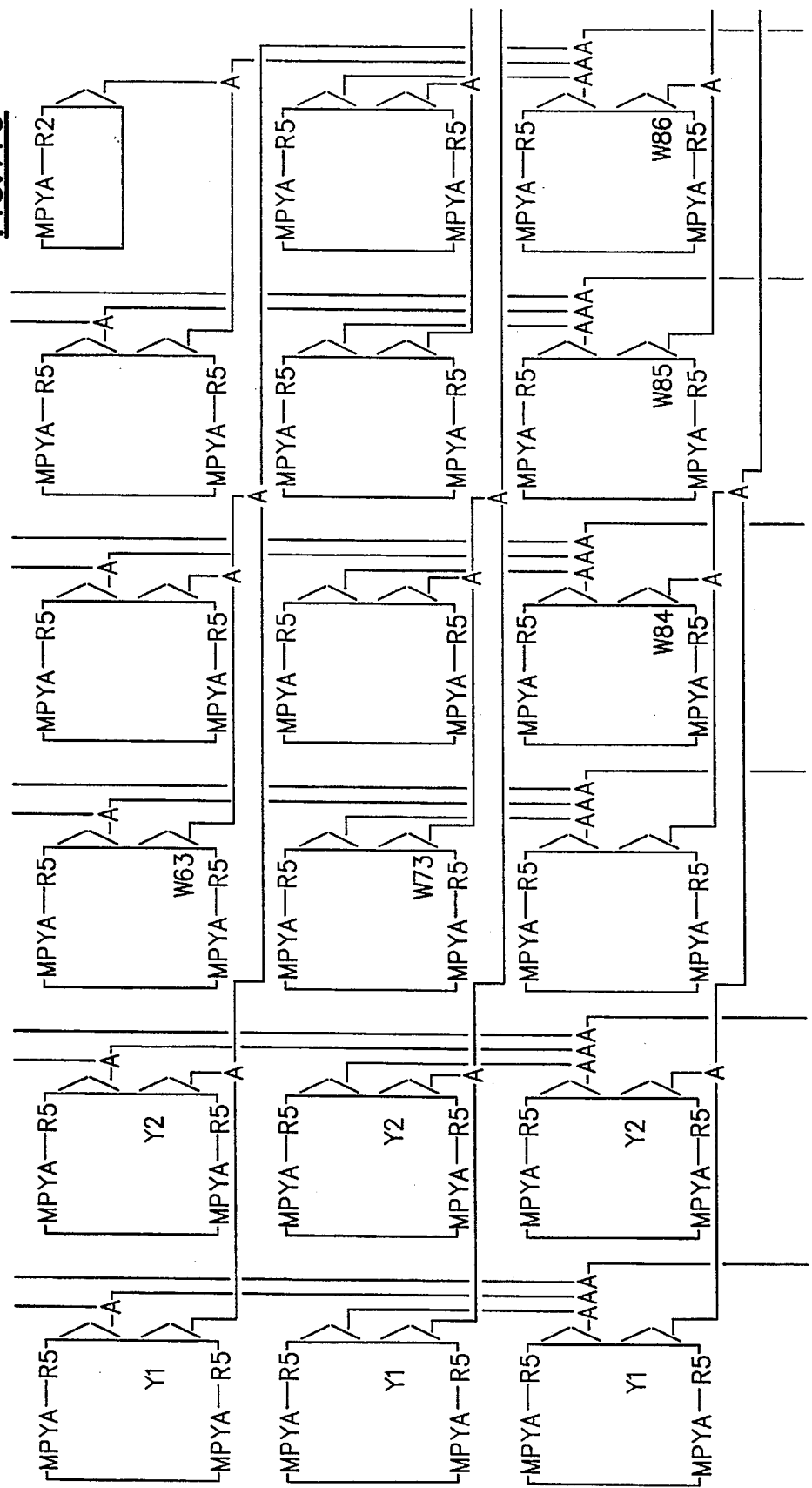
Figure 11D:
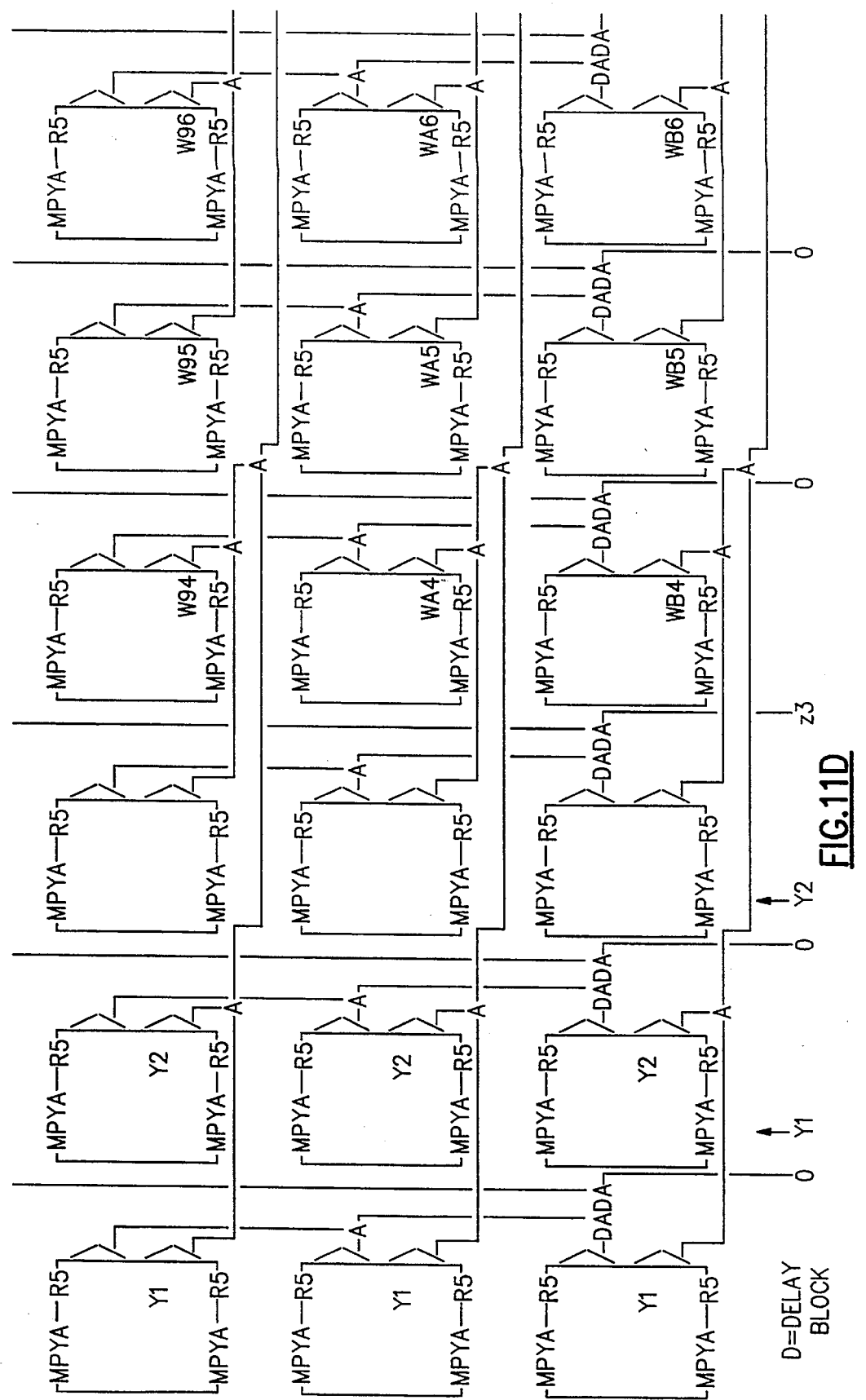
Figure 11E:
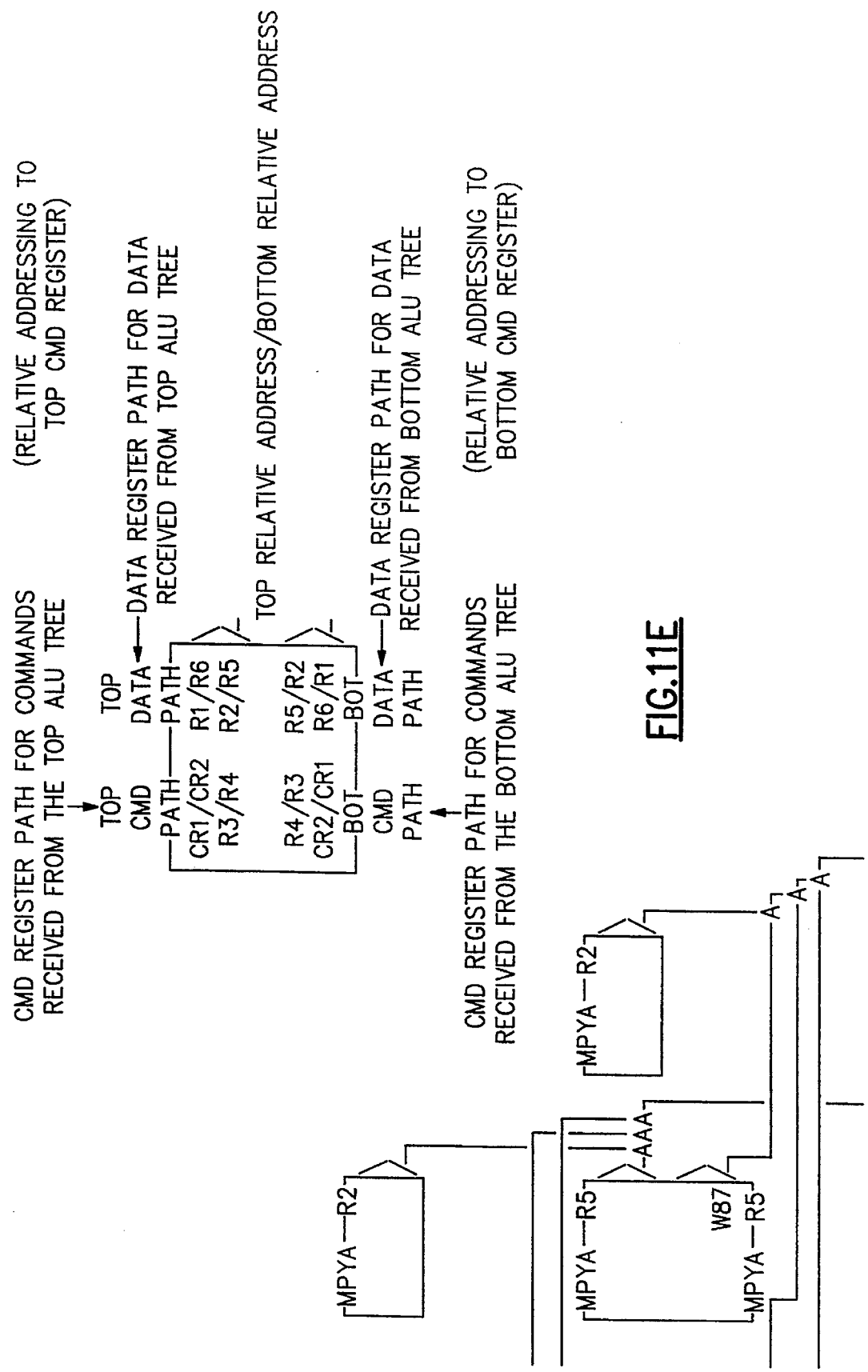
Figure 11F:
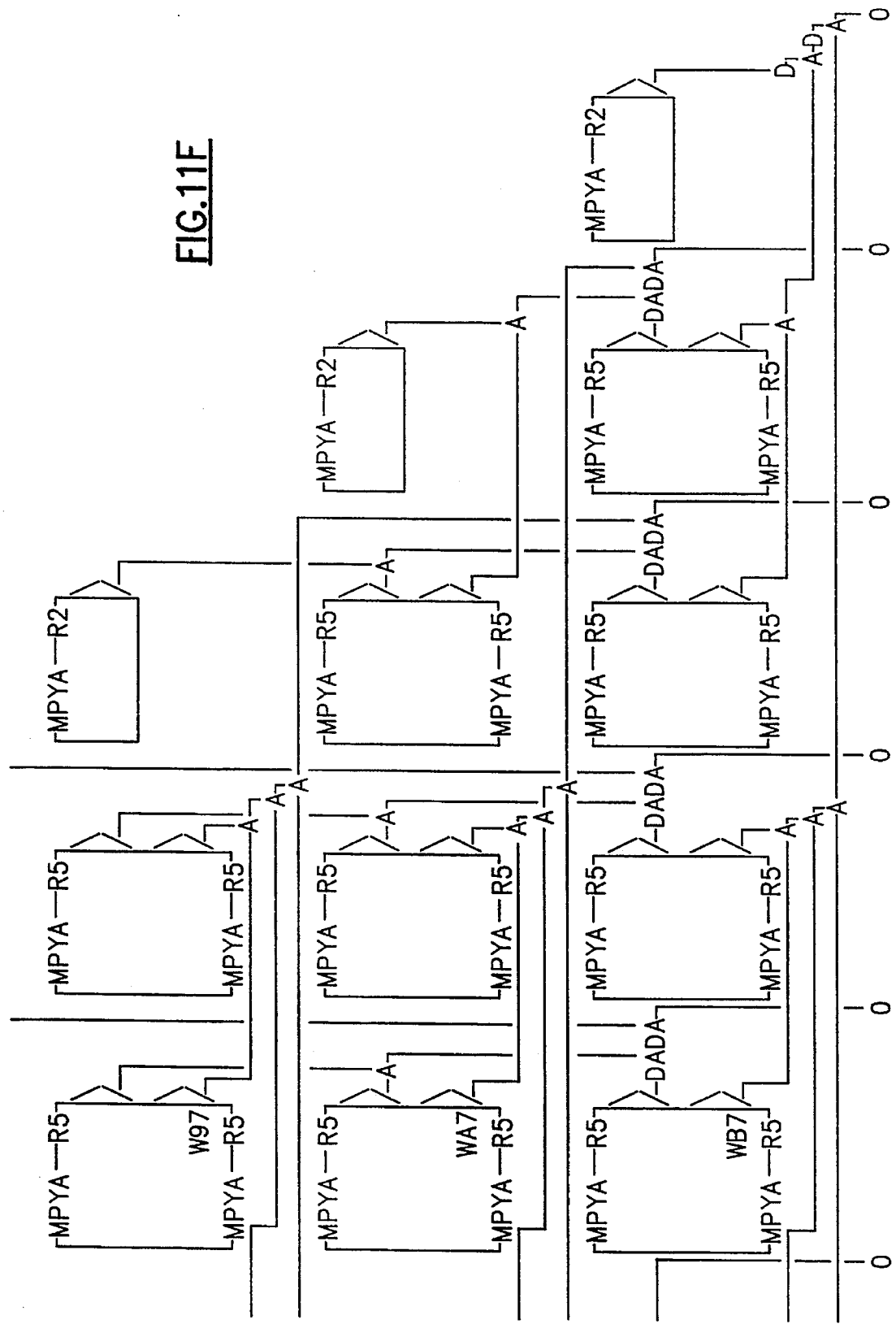
Figures 12, 12A:
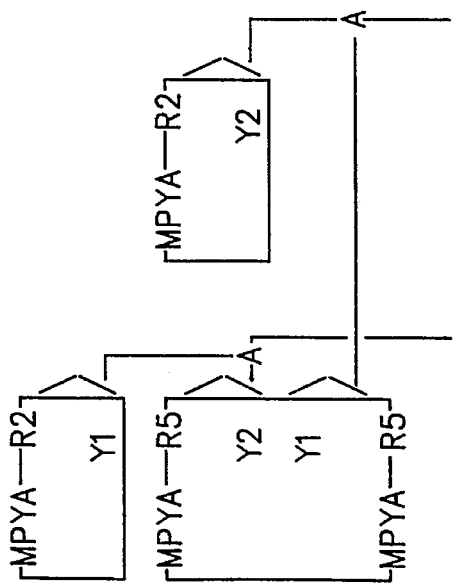
Figure 12B:
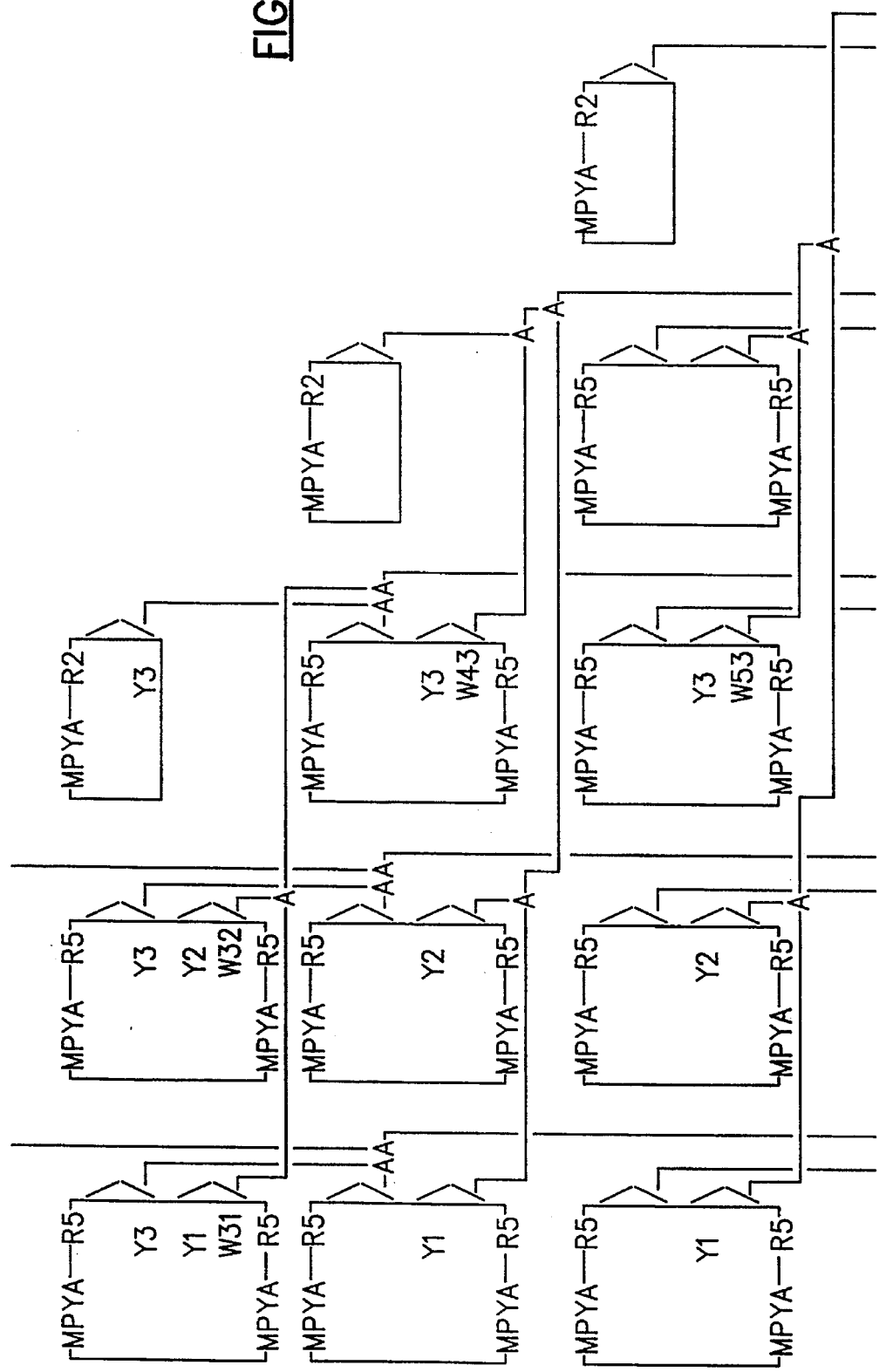
Figure 12D:
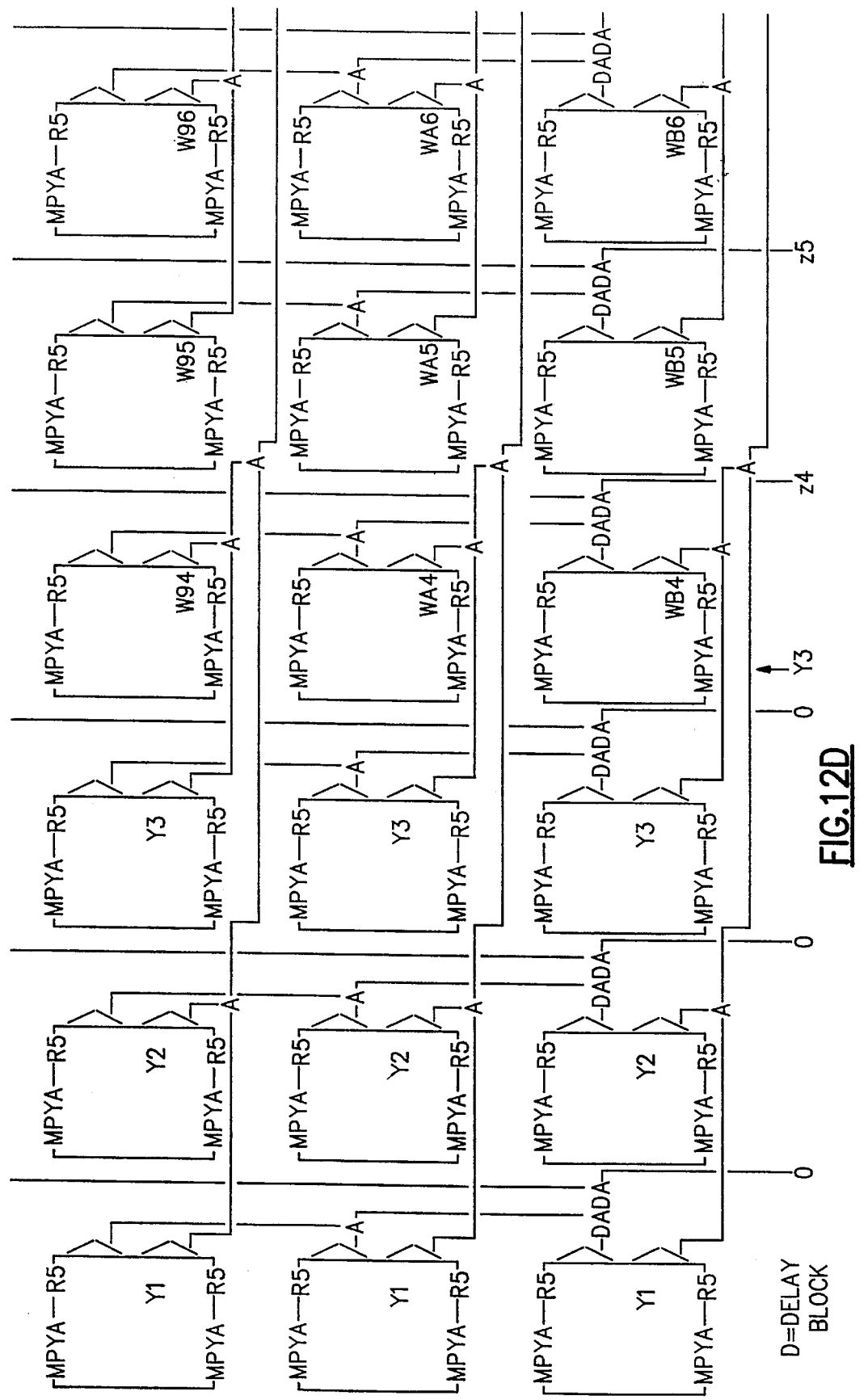
Figure 12E:
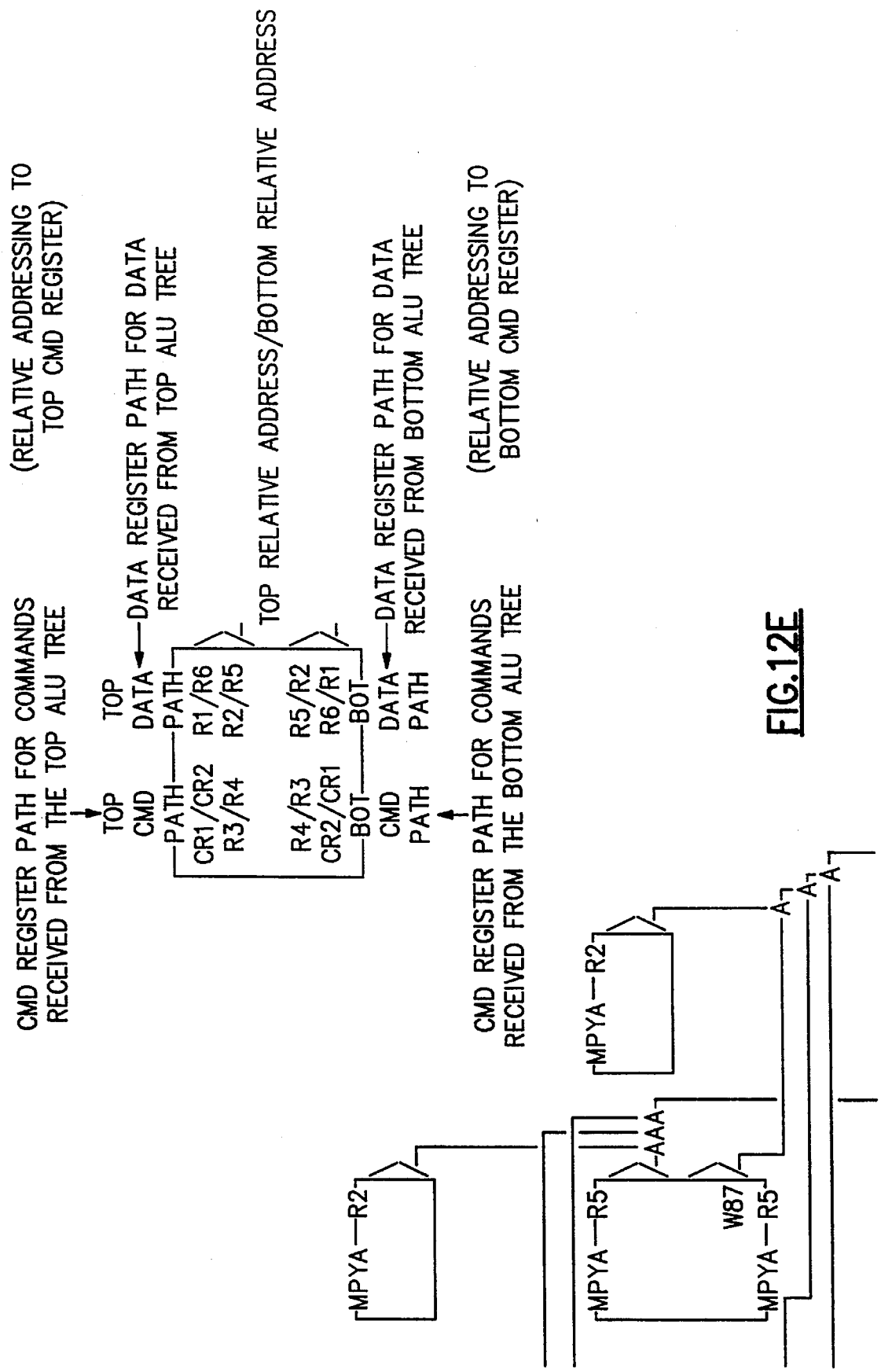
Figure 12F:
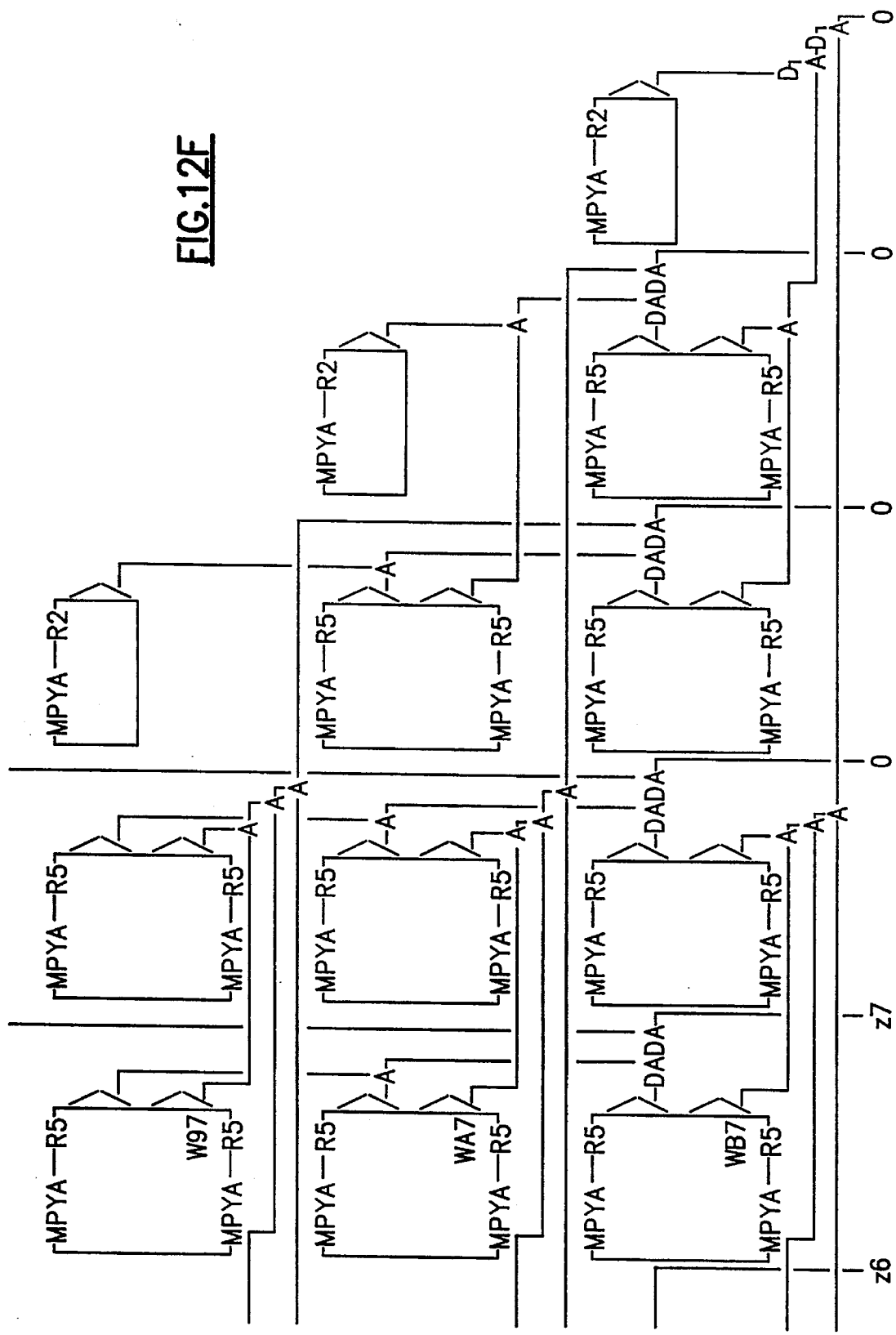
Figures 13, 13A:
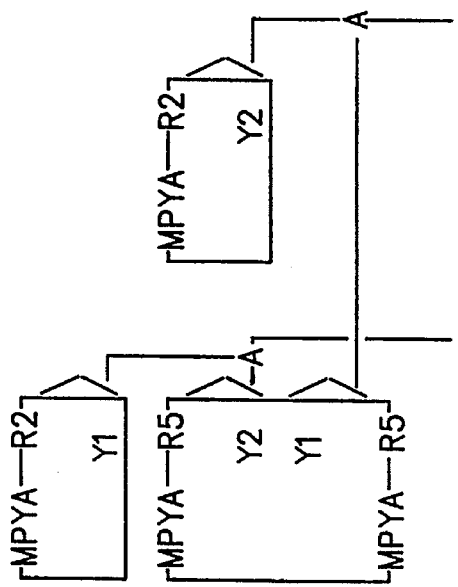
Figure 13B:
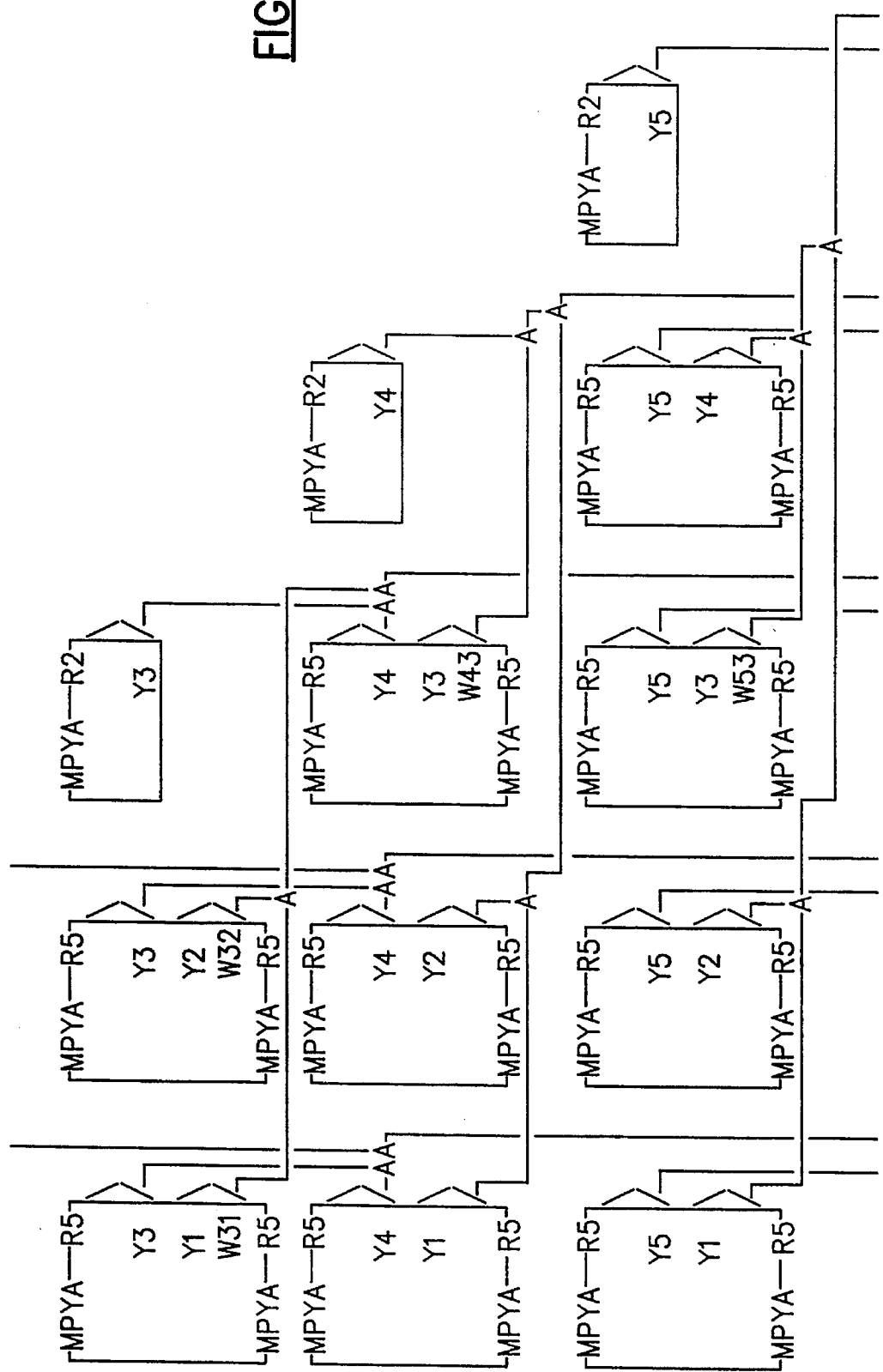
Figure 13C:
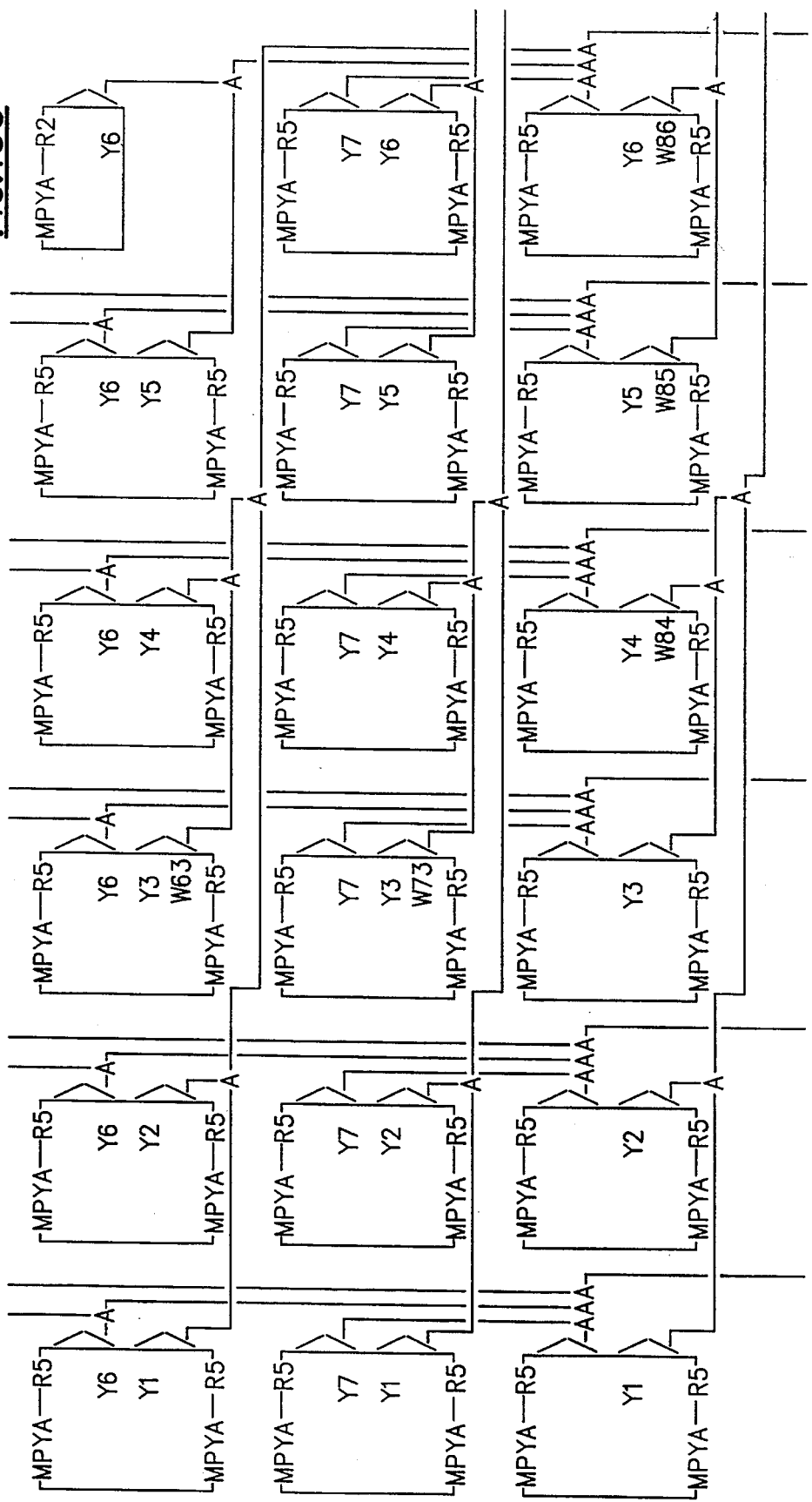
Figure 13E:
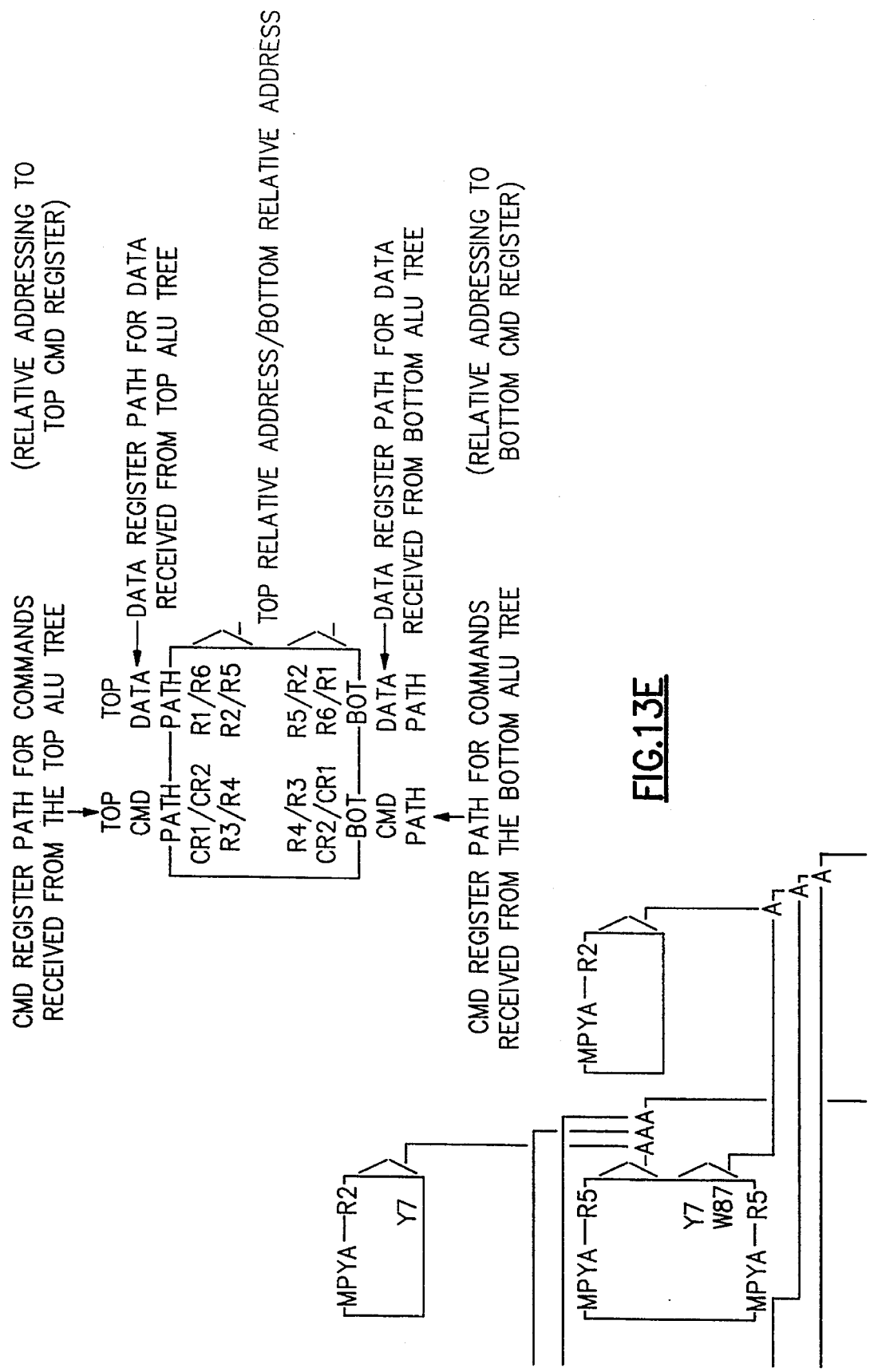
Figure 13F:
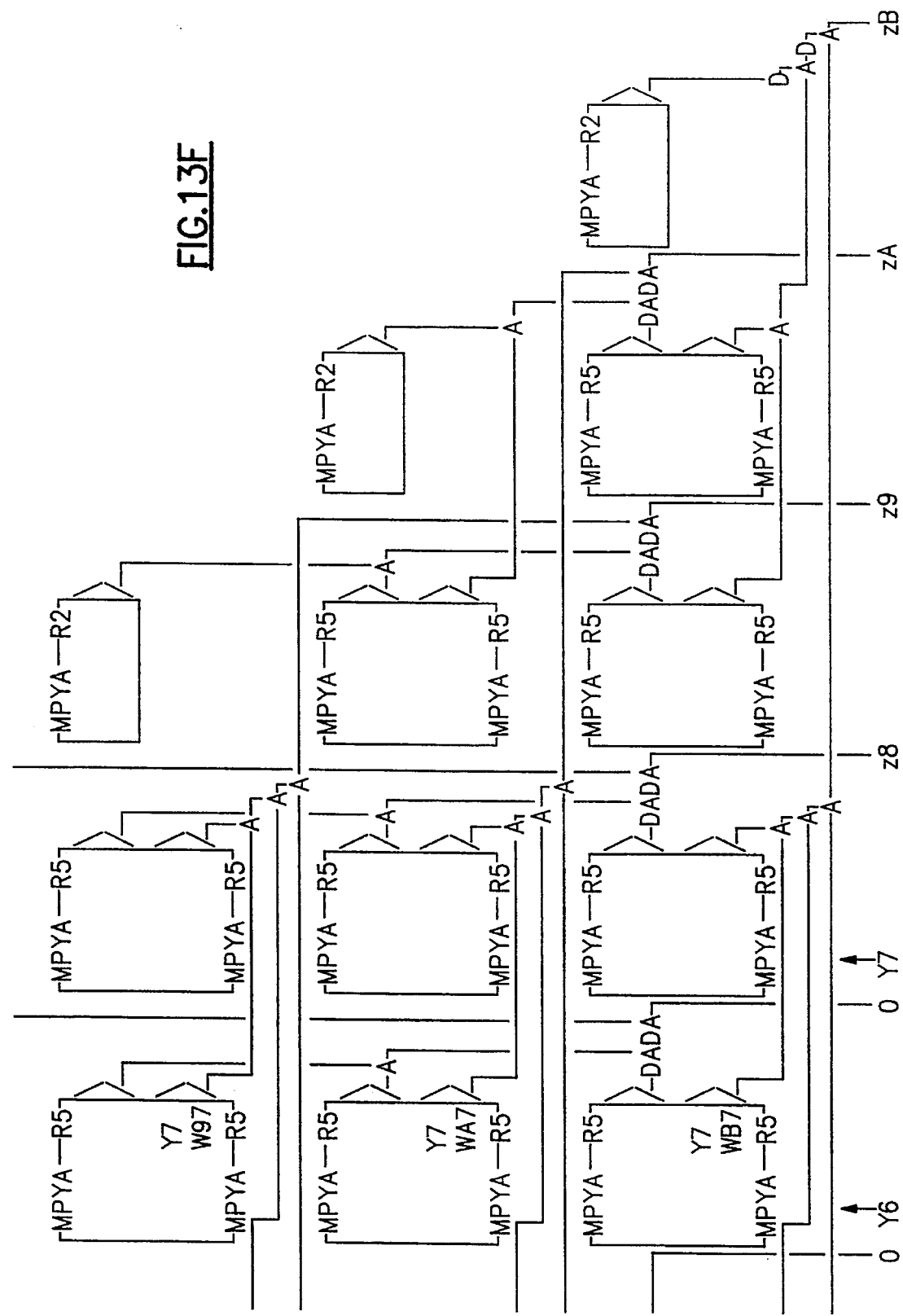
Figures 14, 14A:
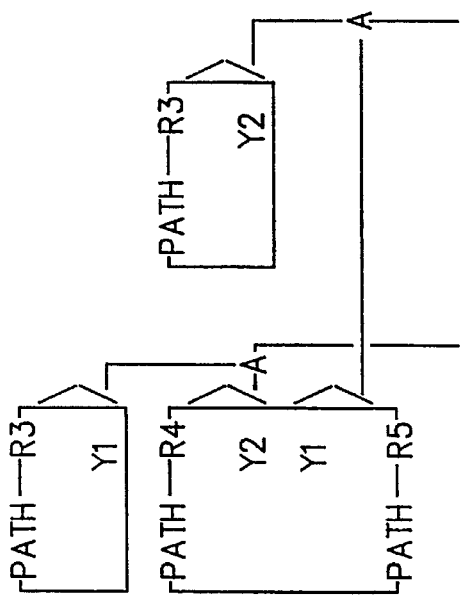
Figure 14B:
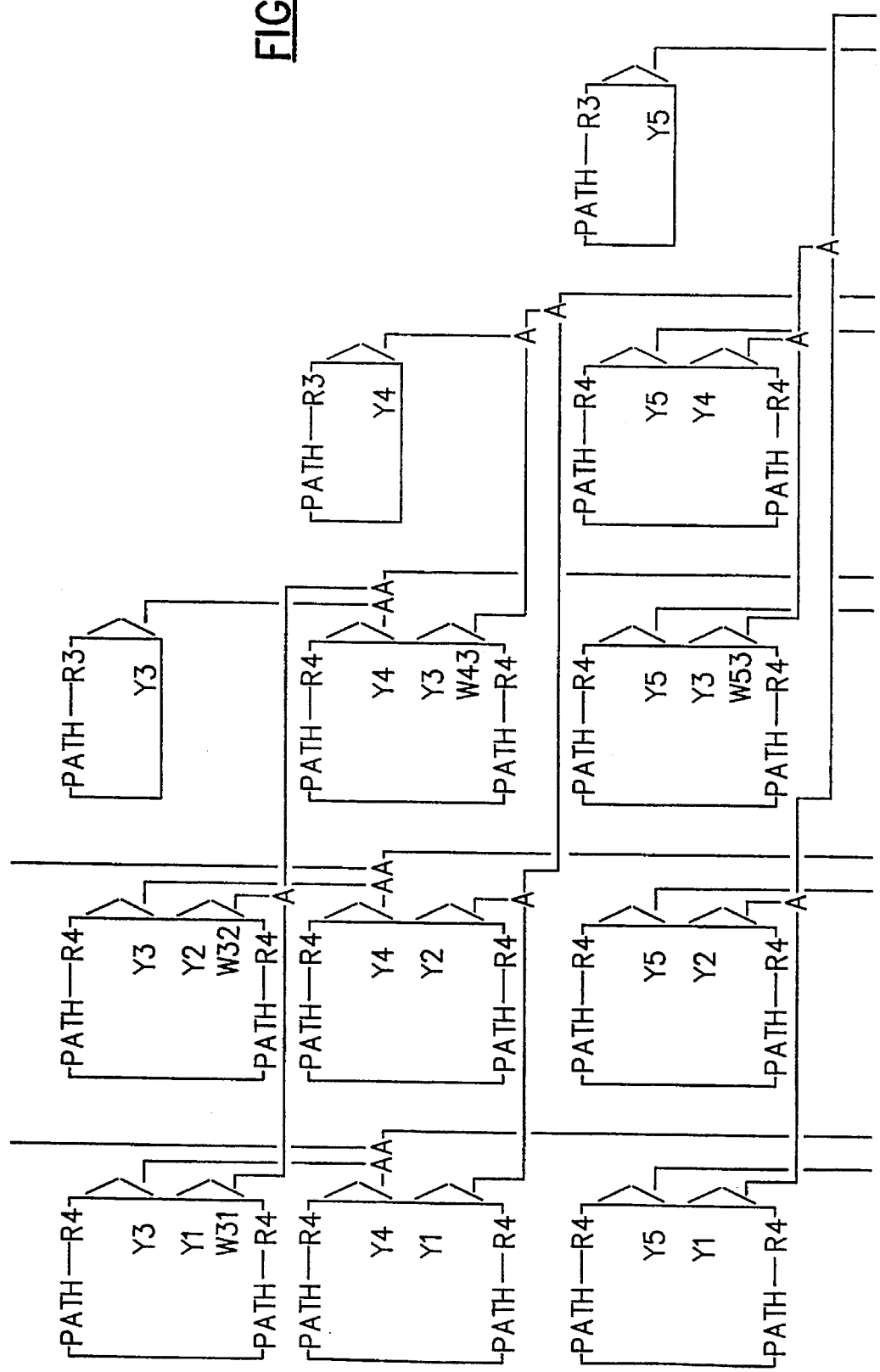
Figure 14C:
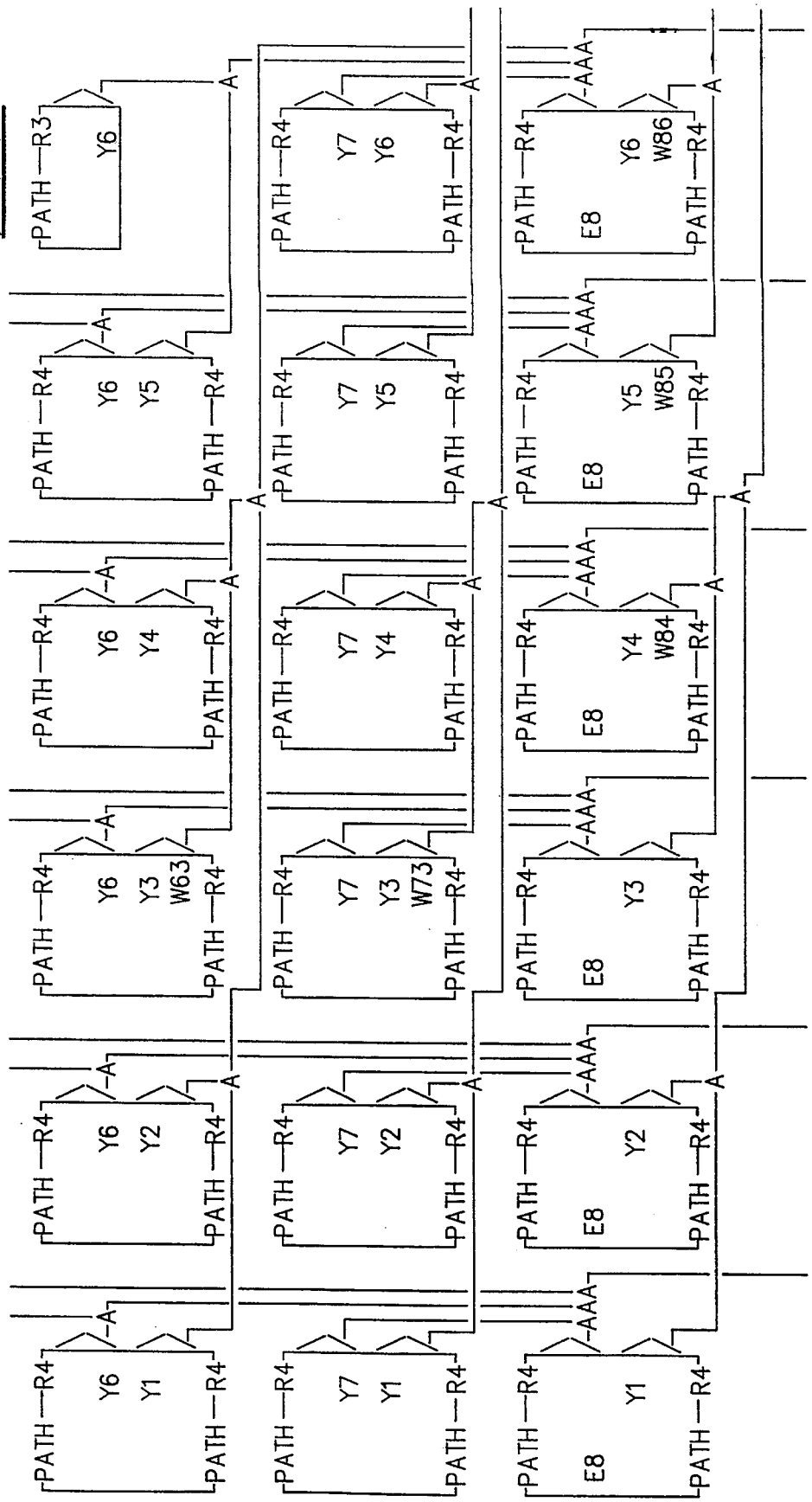
Figure 14D:
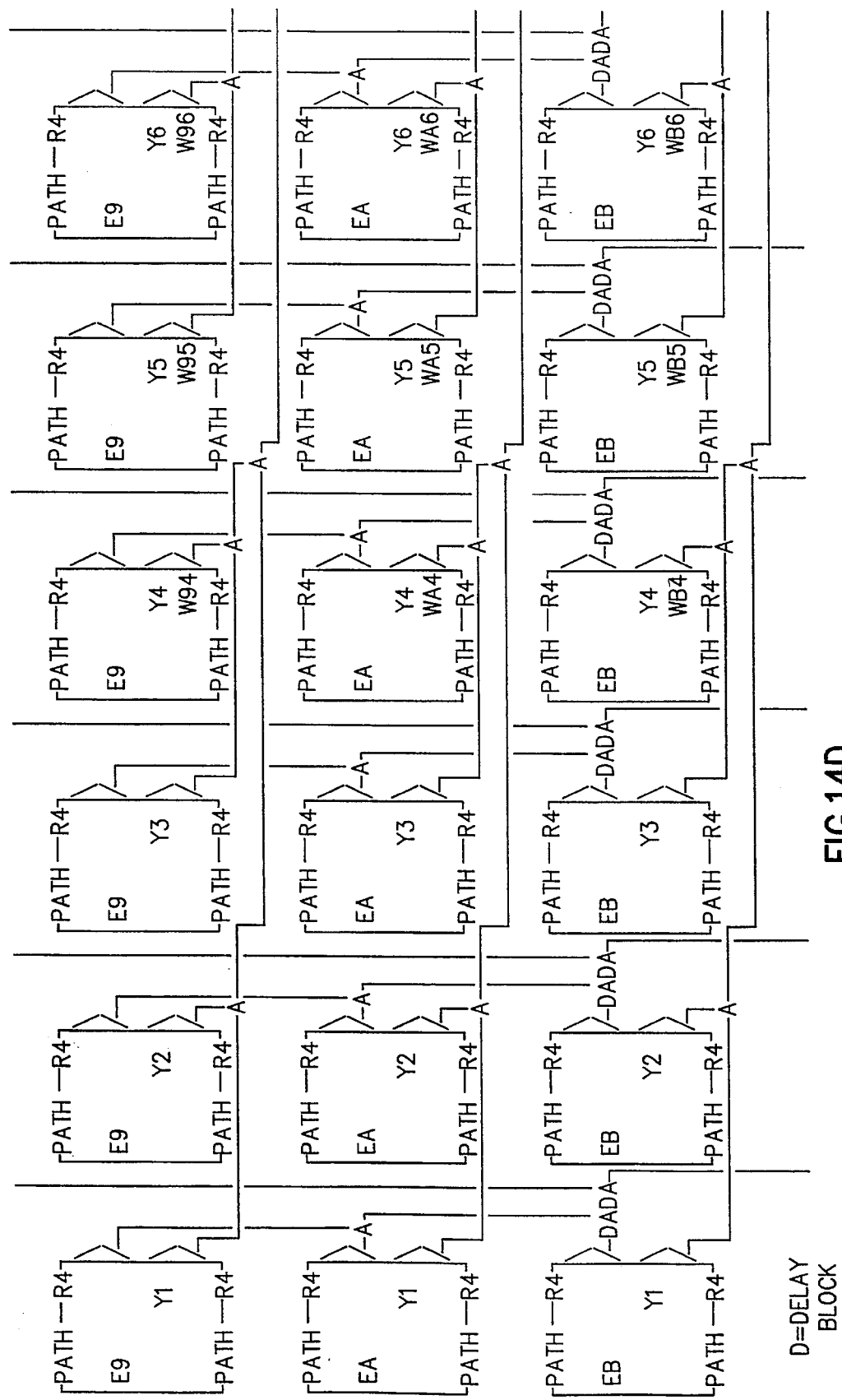
Figure 14E:
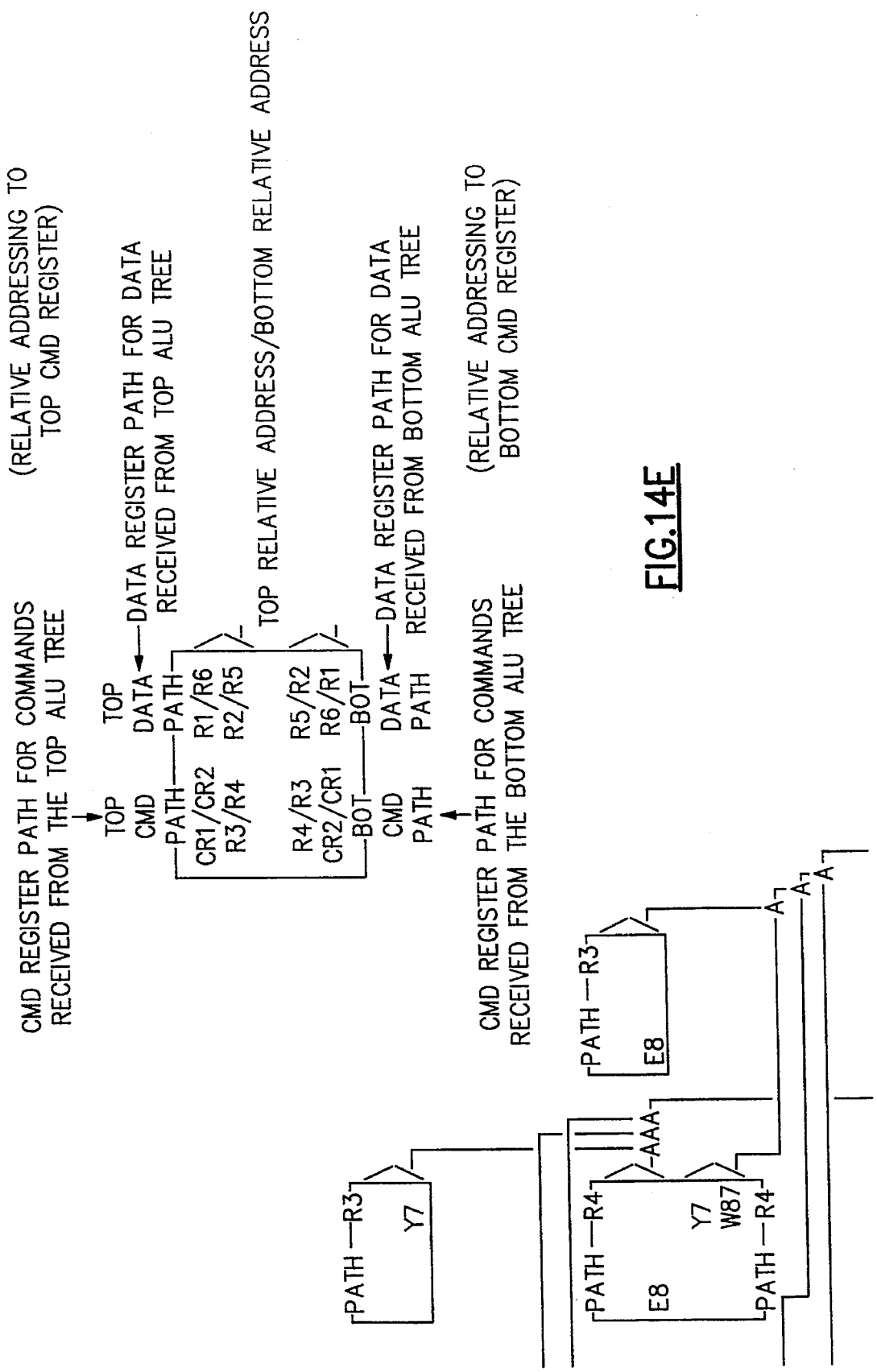
Figure 14F:
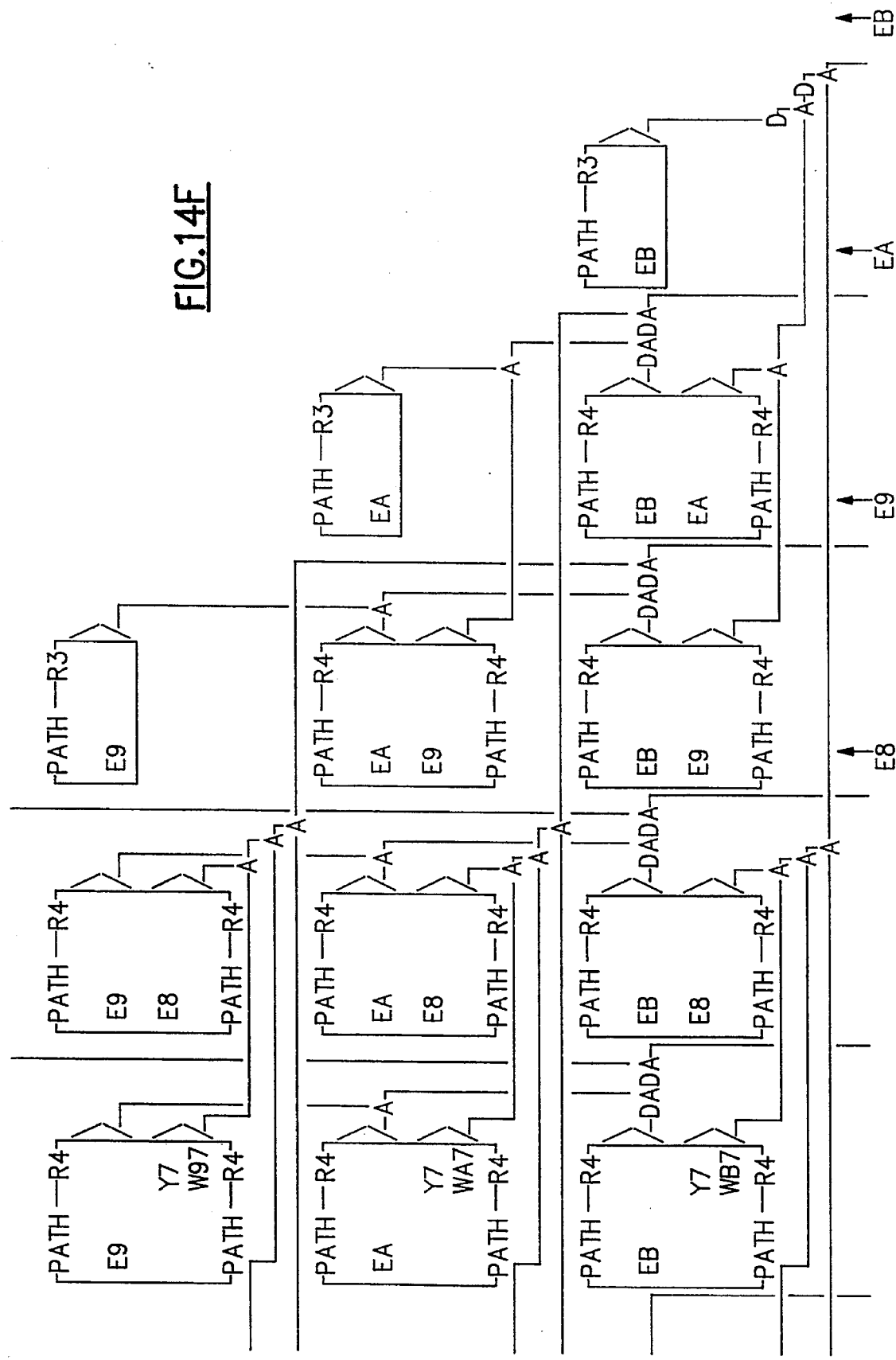
Figures 15, 15A:
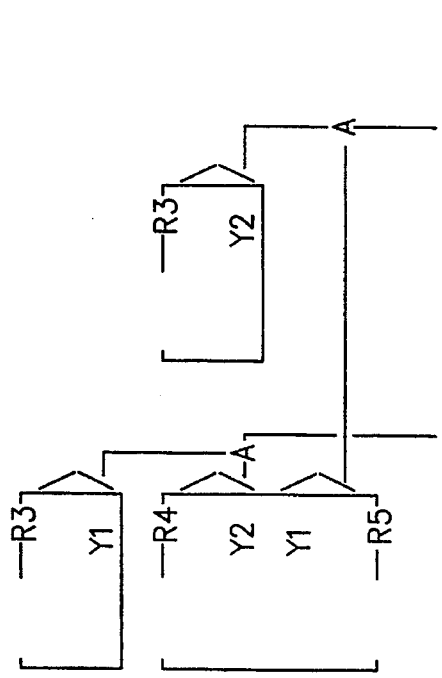
Figure 15B:
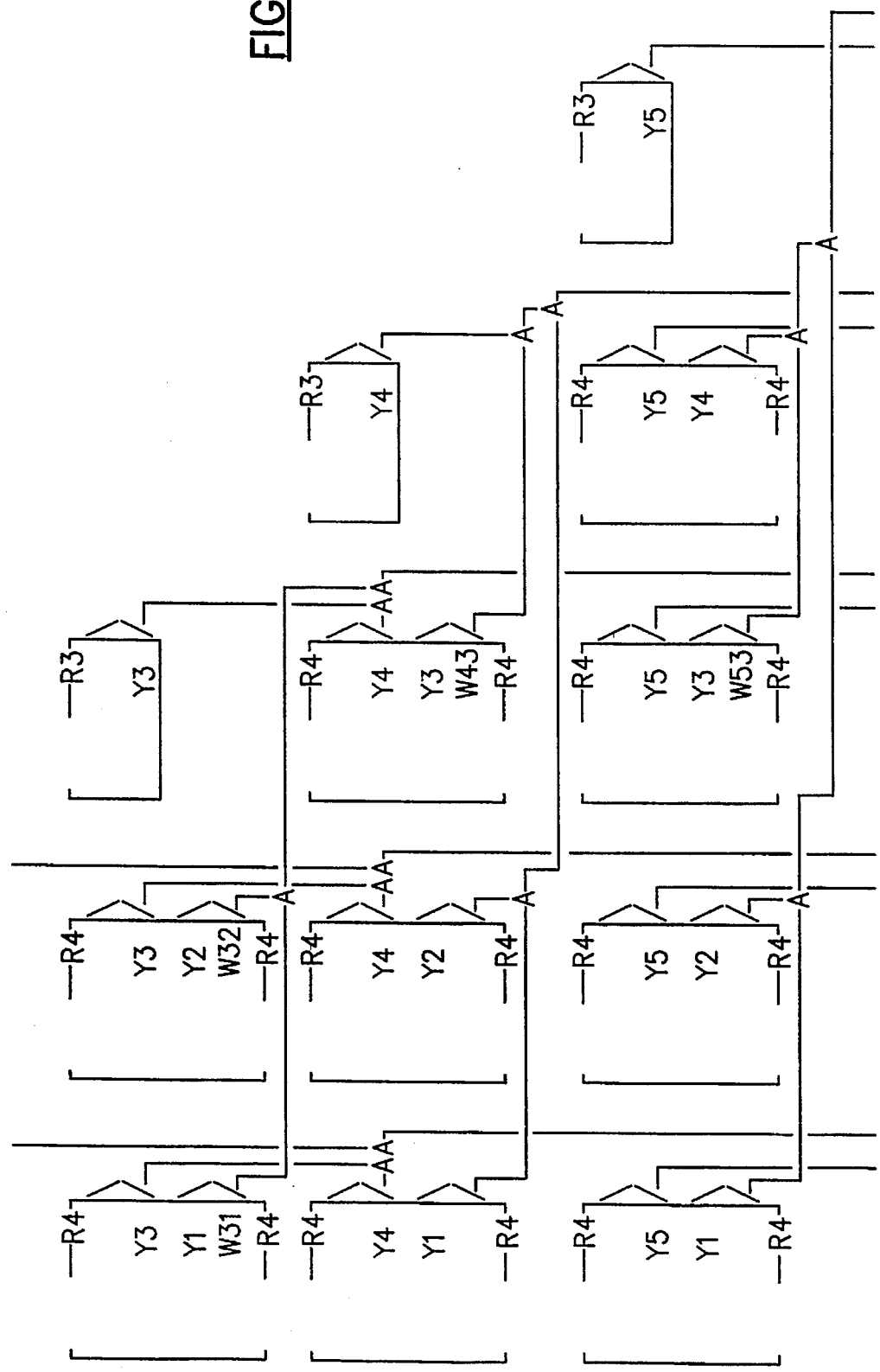
Figure 15C:
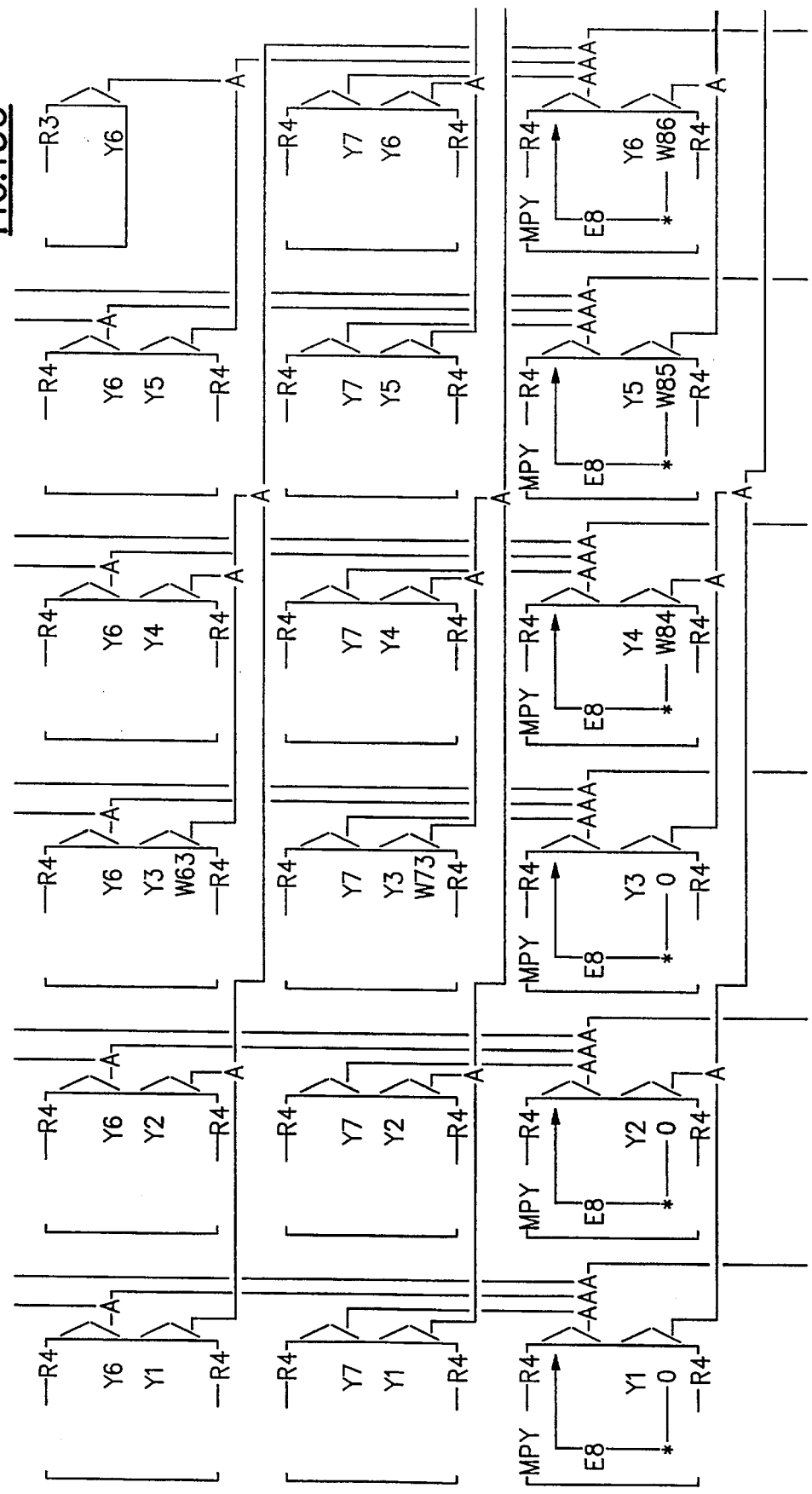
Figure 15D:
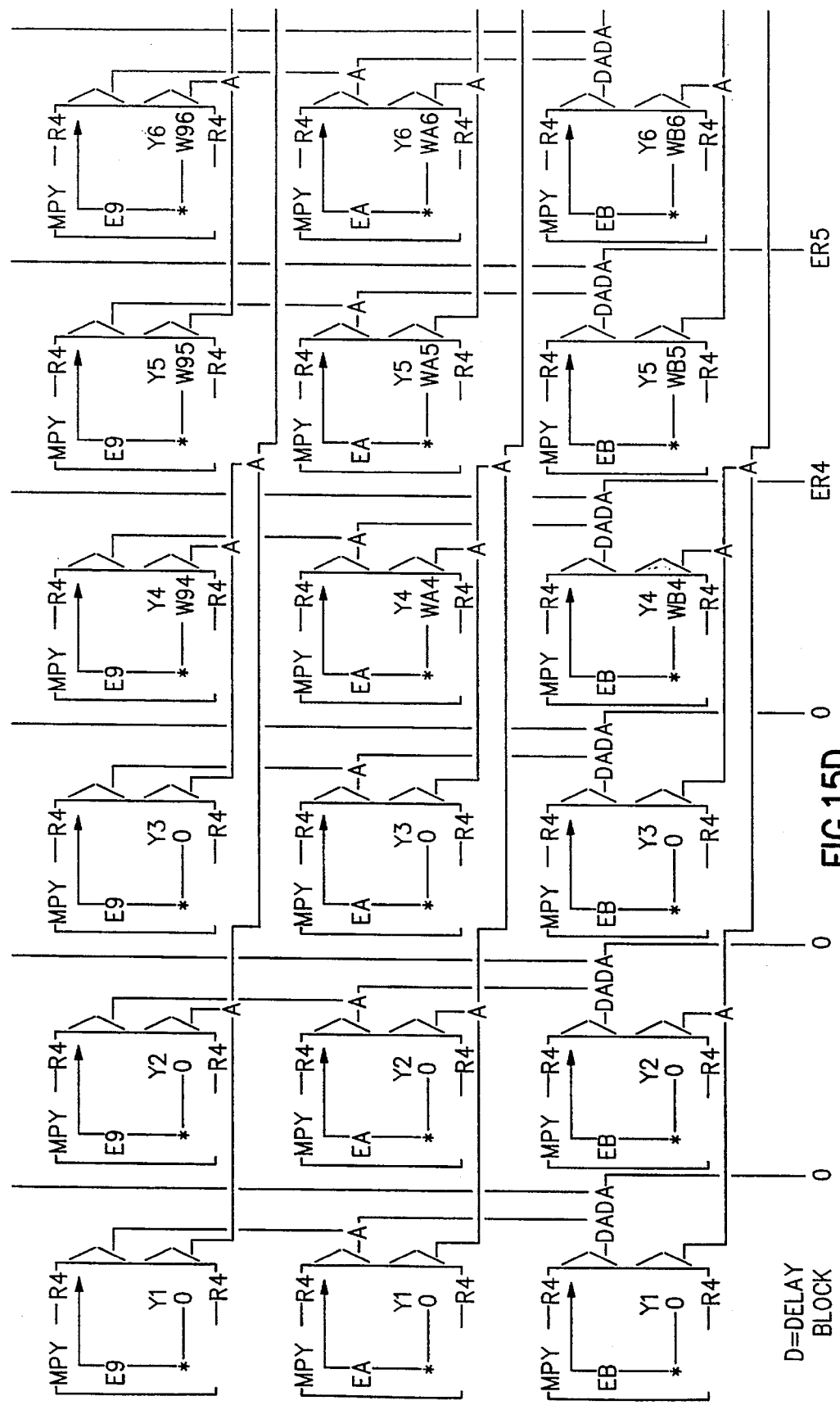
Figure 15F:
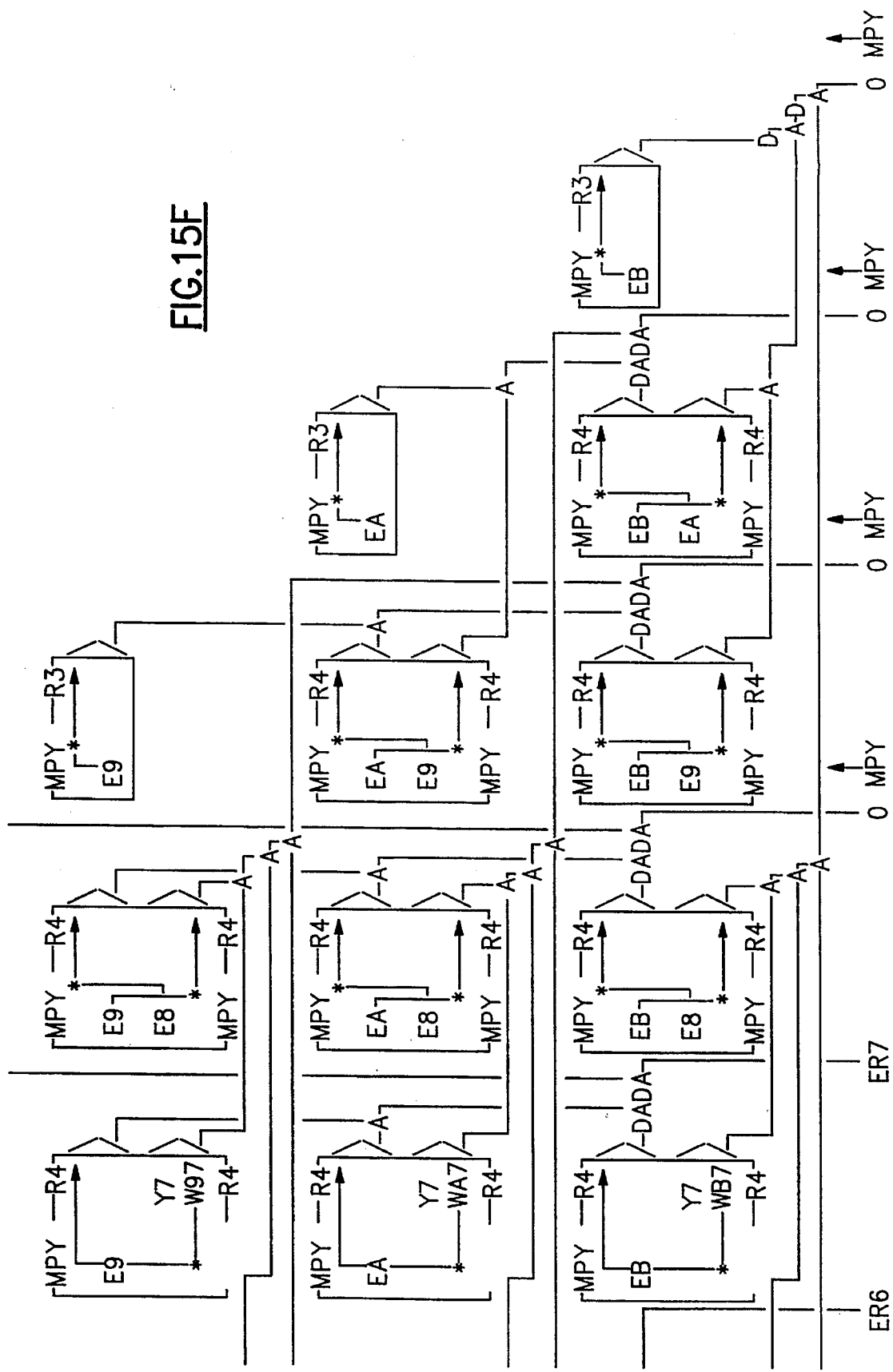
Figures 16, 16A:
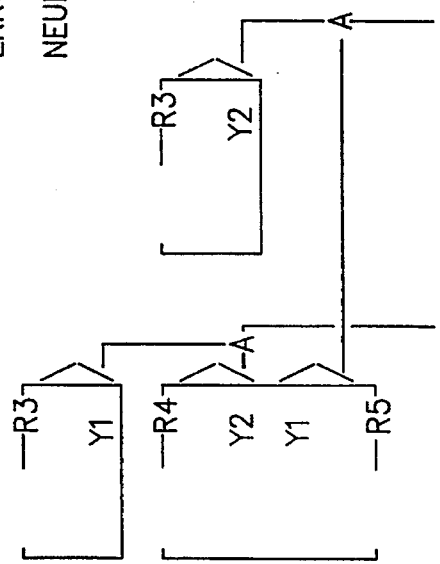
Figure 16B:
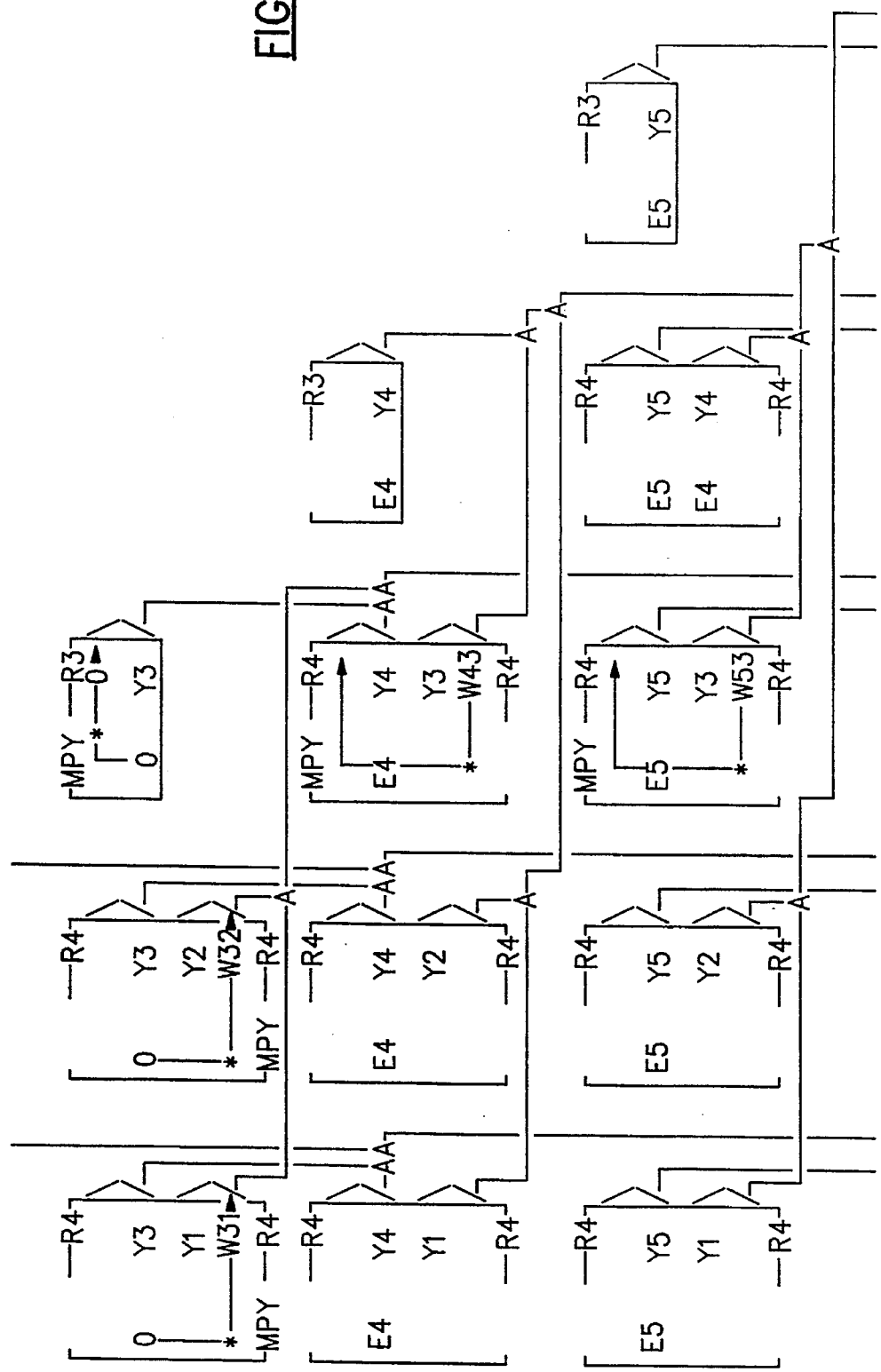
Figure 16C:
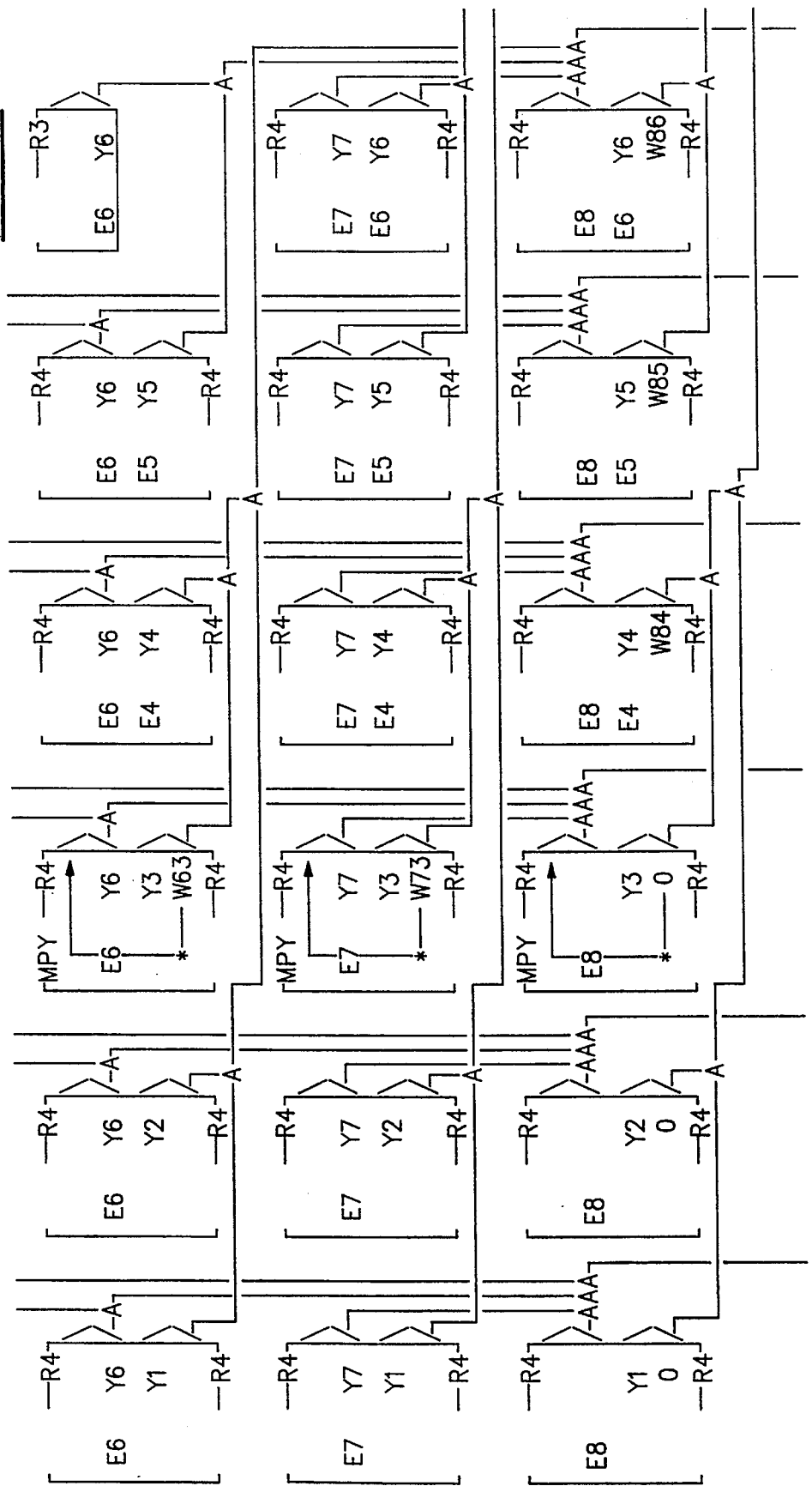
Figure 16D:
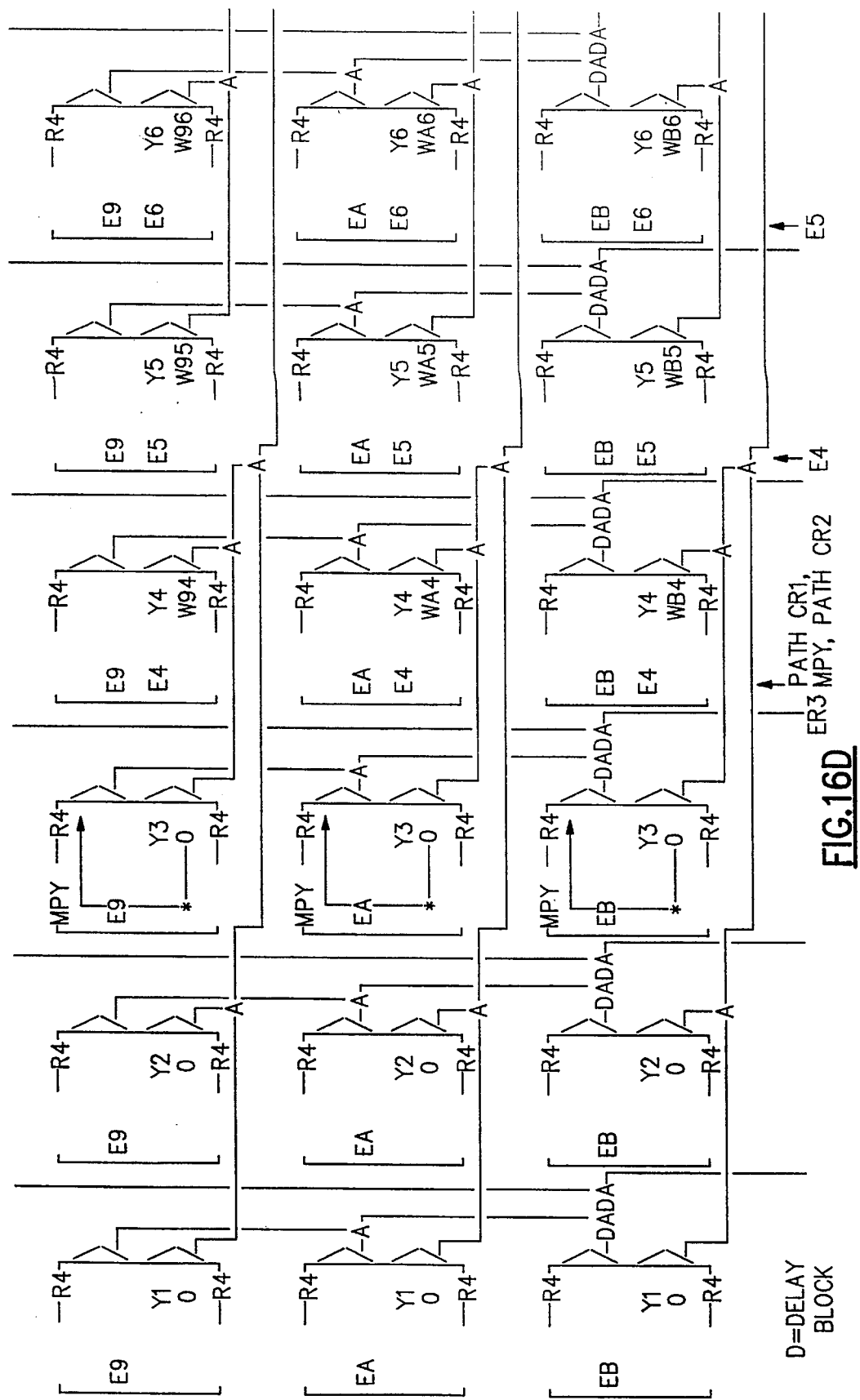
Figure 16F:
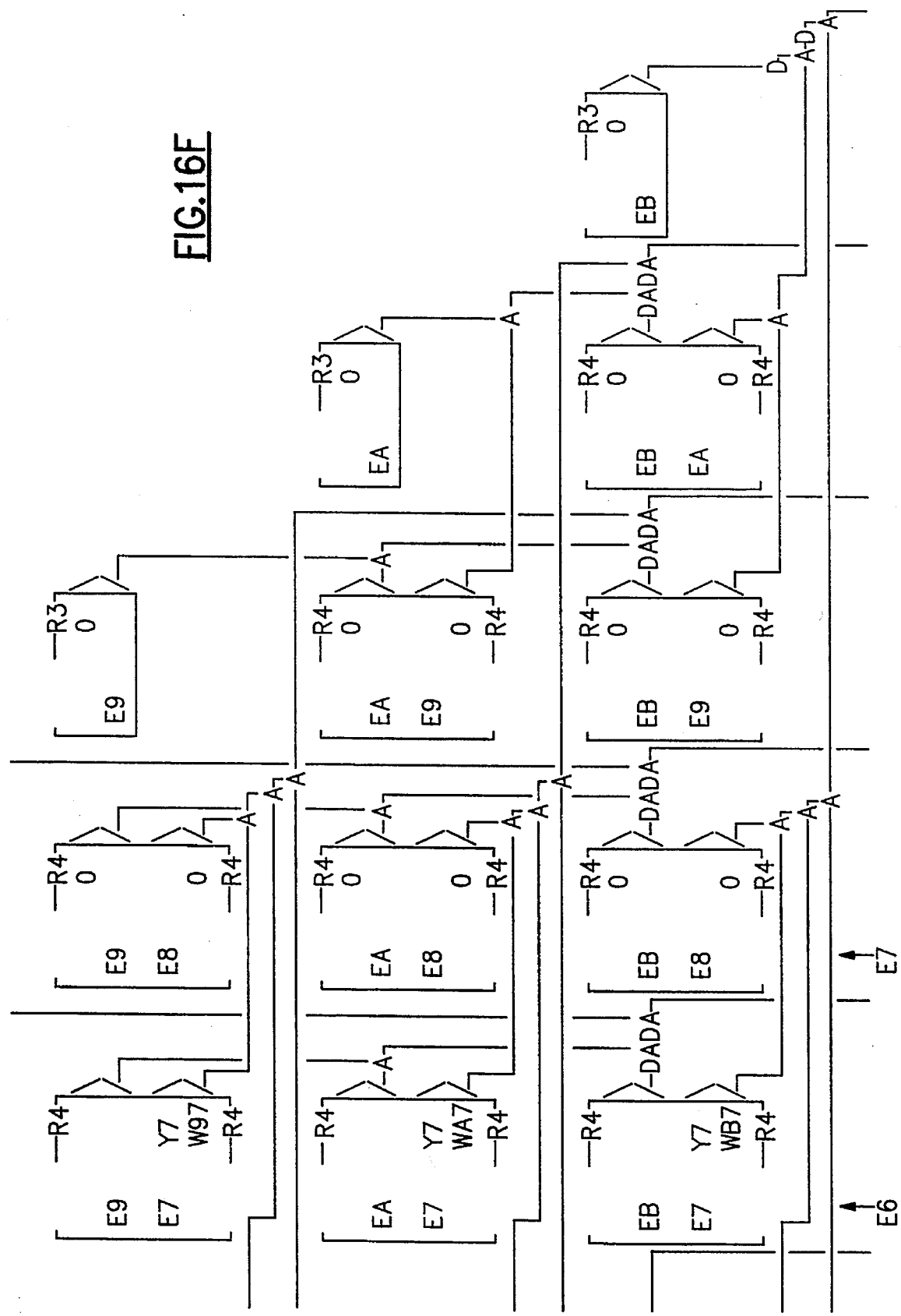
Figure 17A:
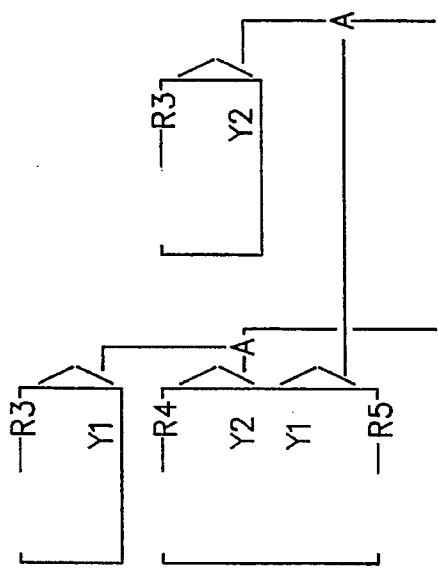
Figure 17B:
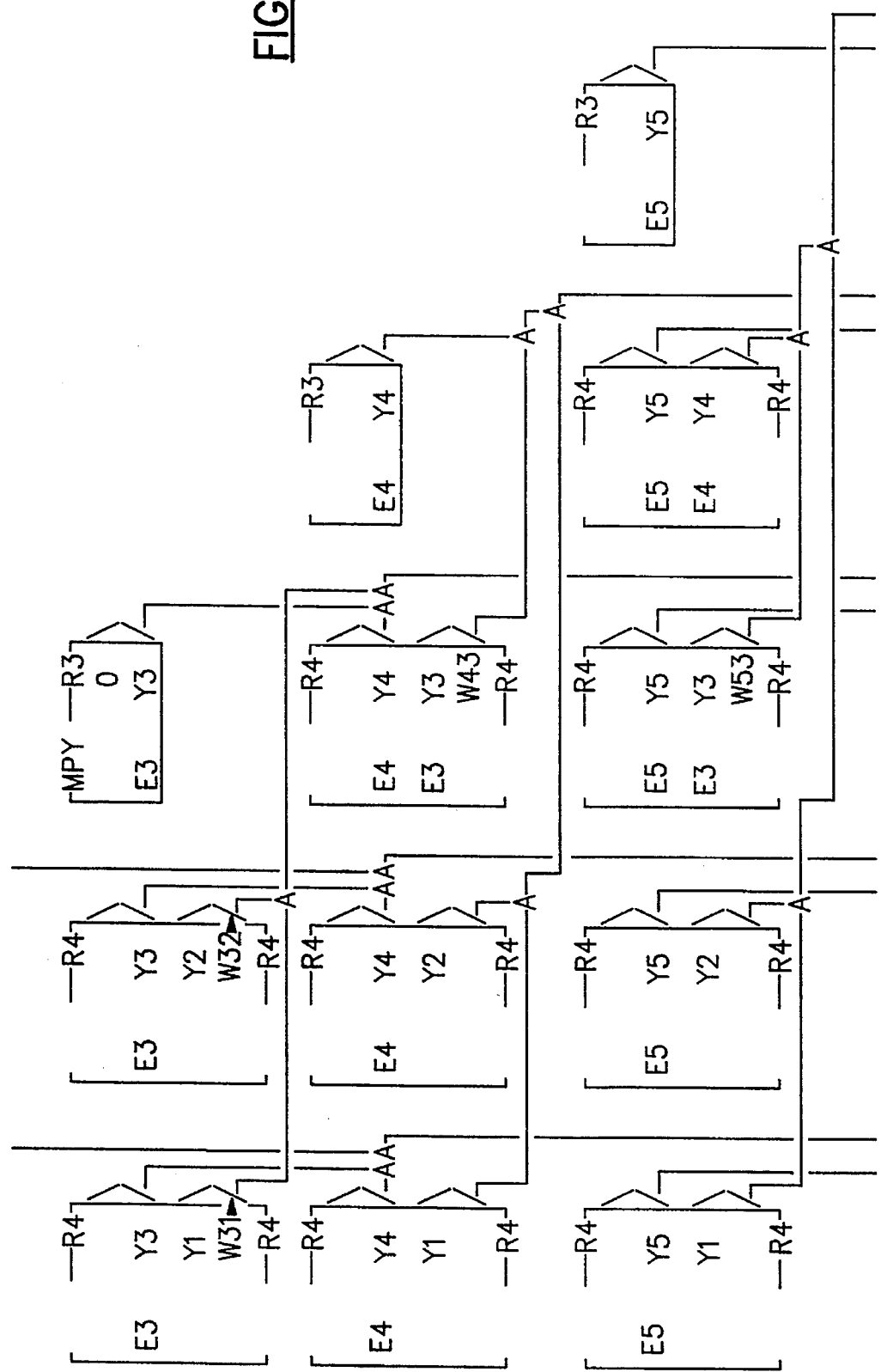
Figure 17D:
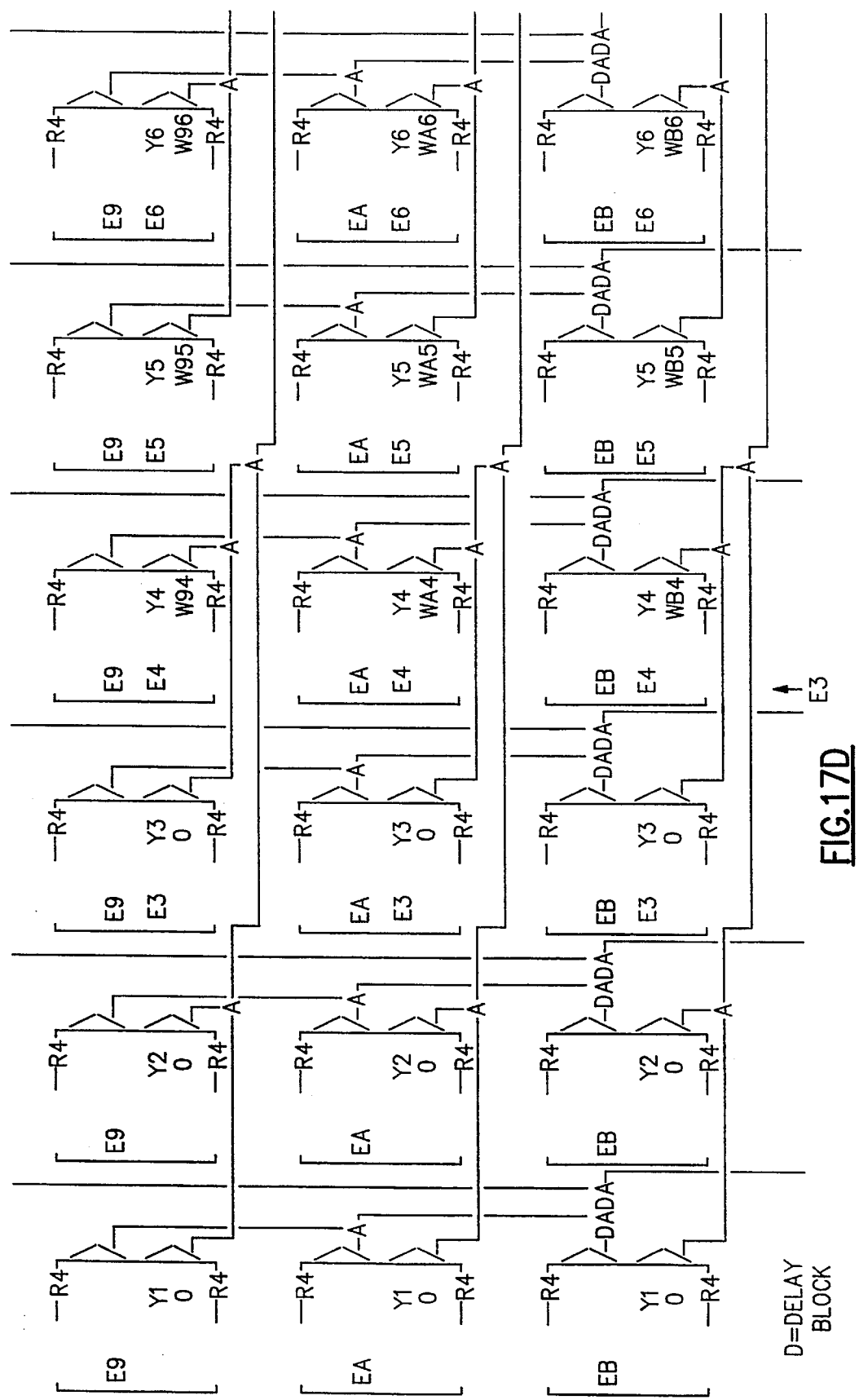
Figure 17E:
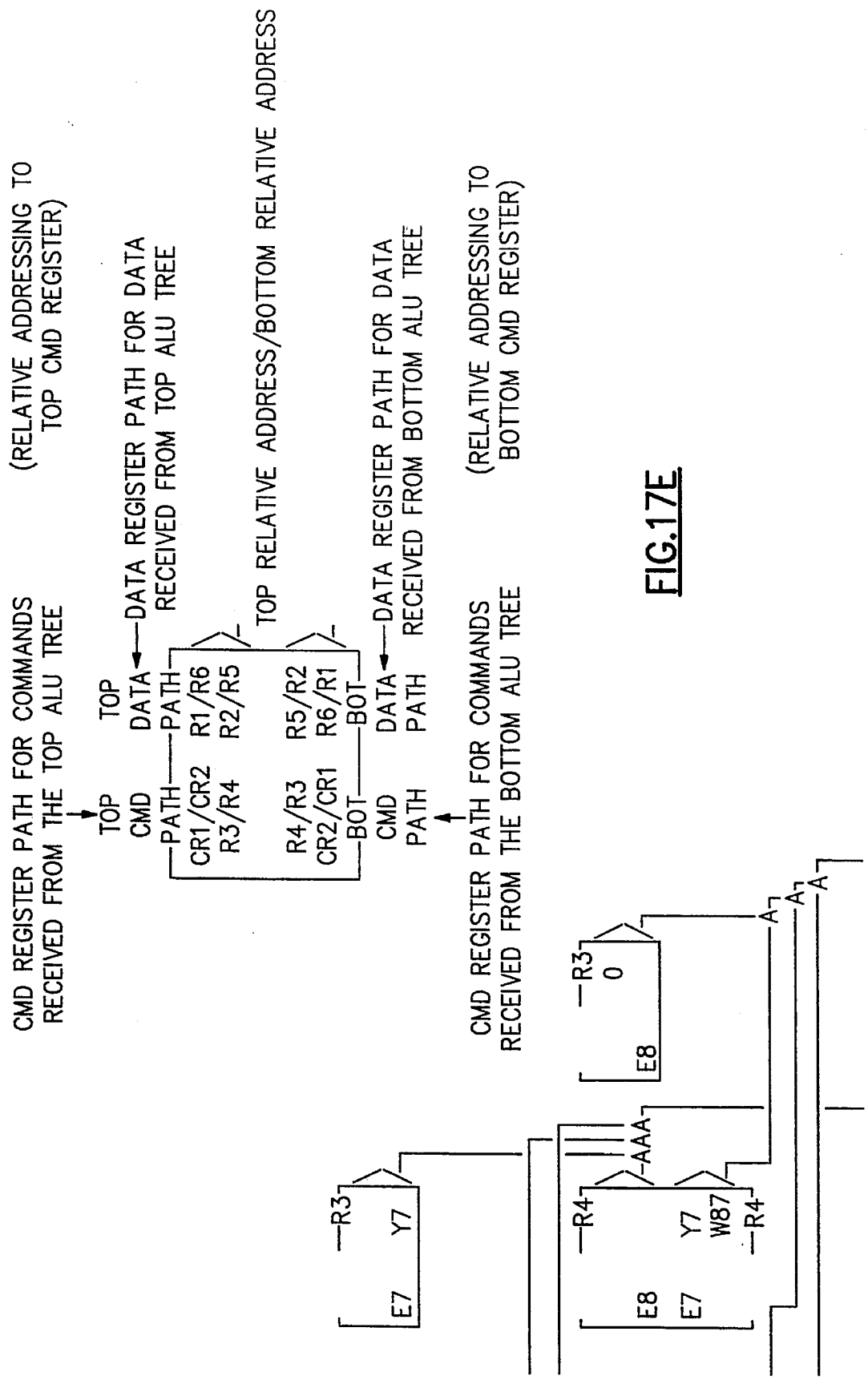
Figure 17F:
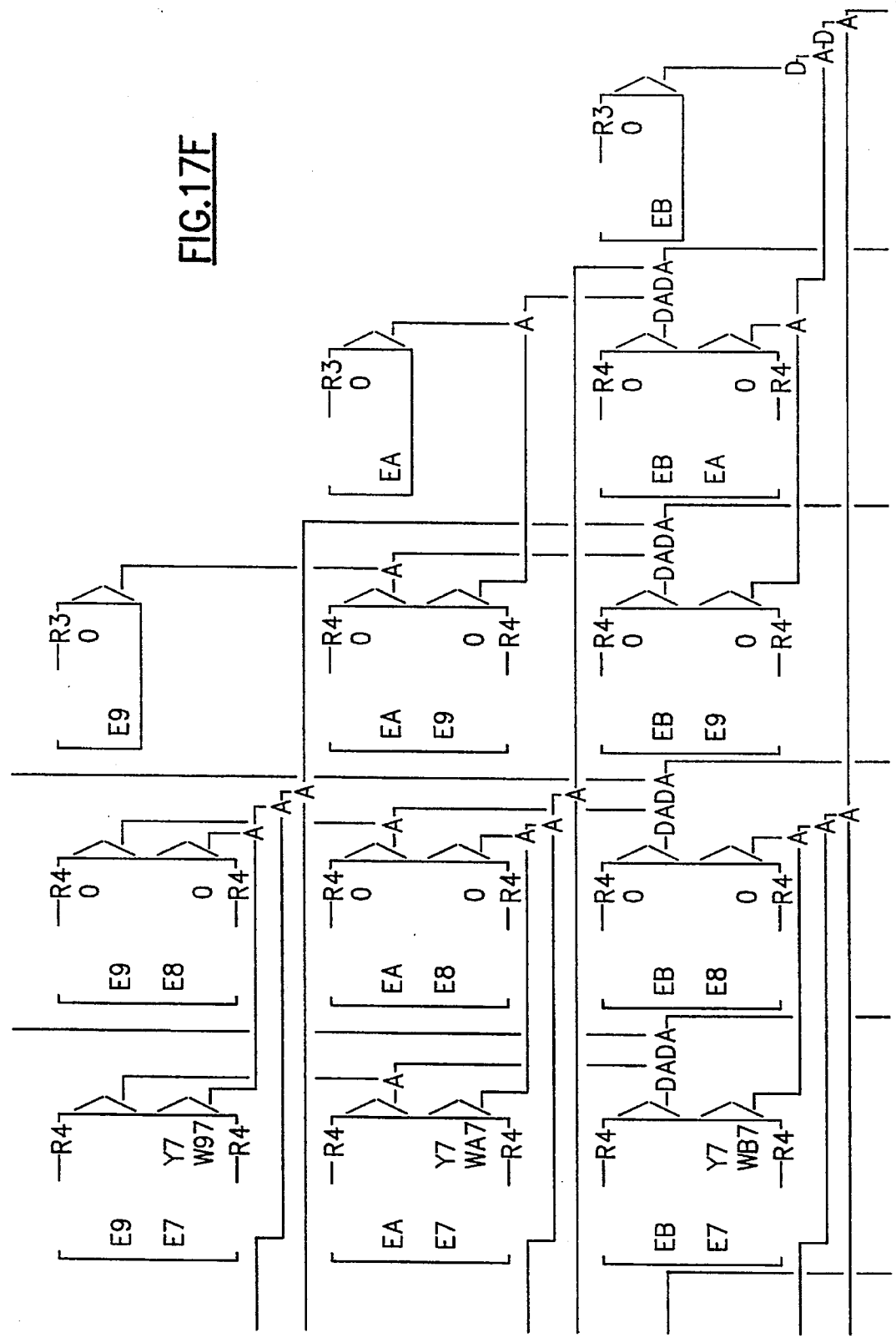
Figures 18, 18A:
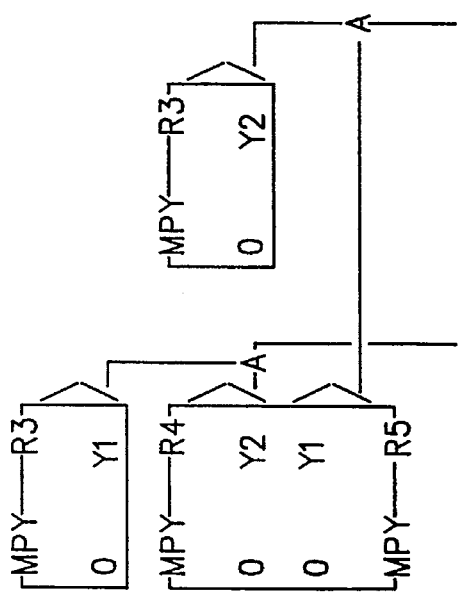
Figure 18B:
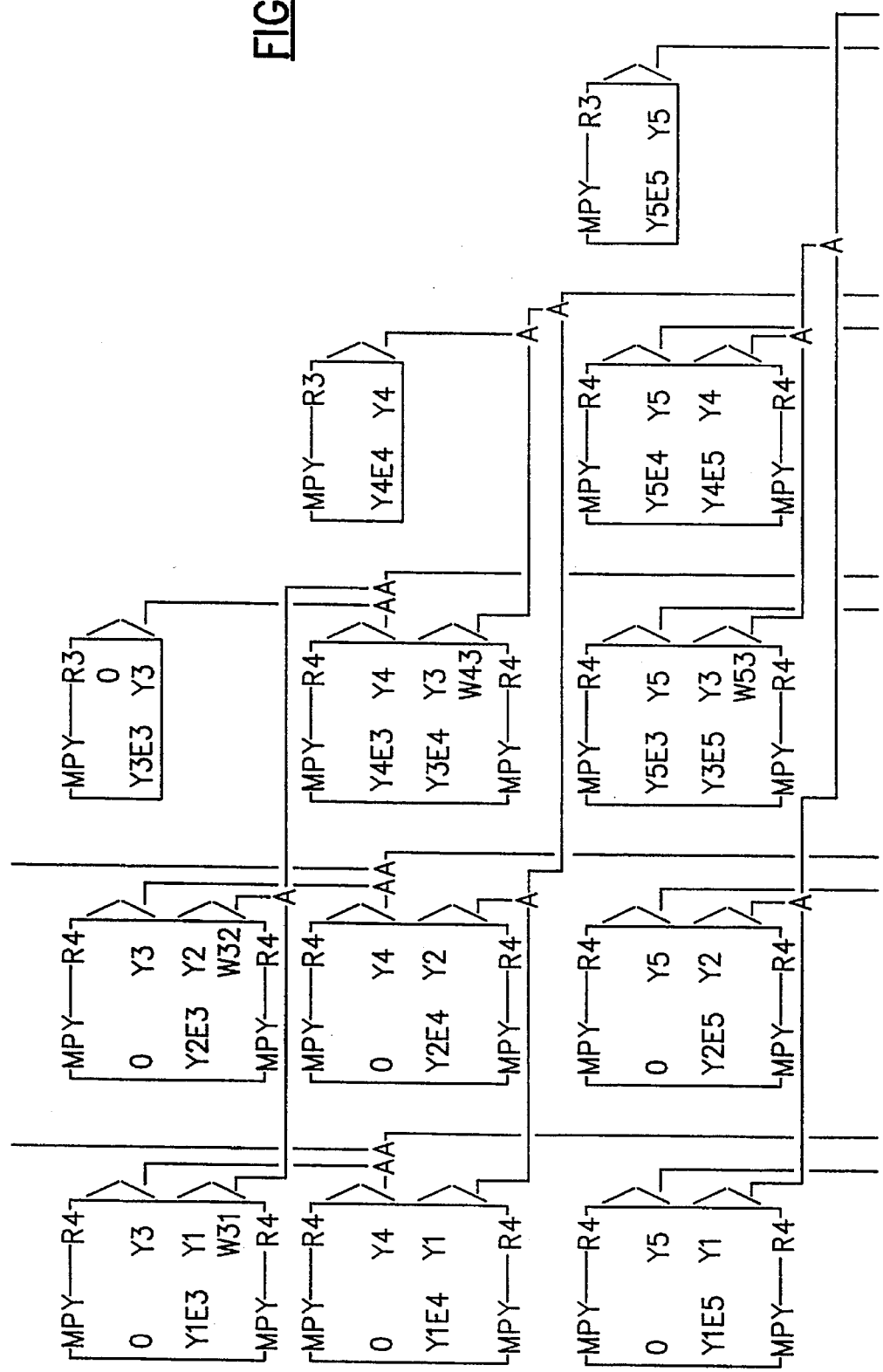
Figure 18C:
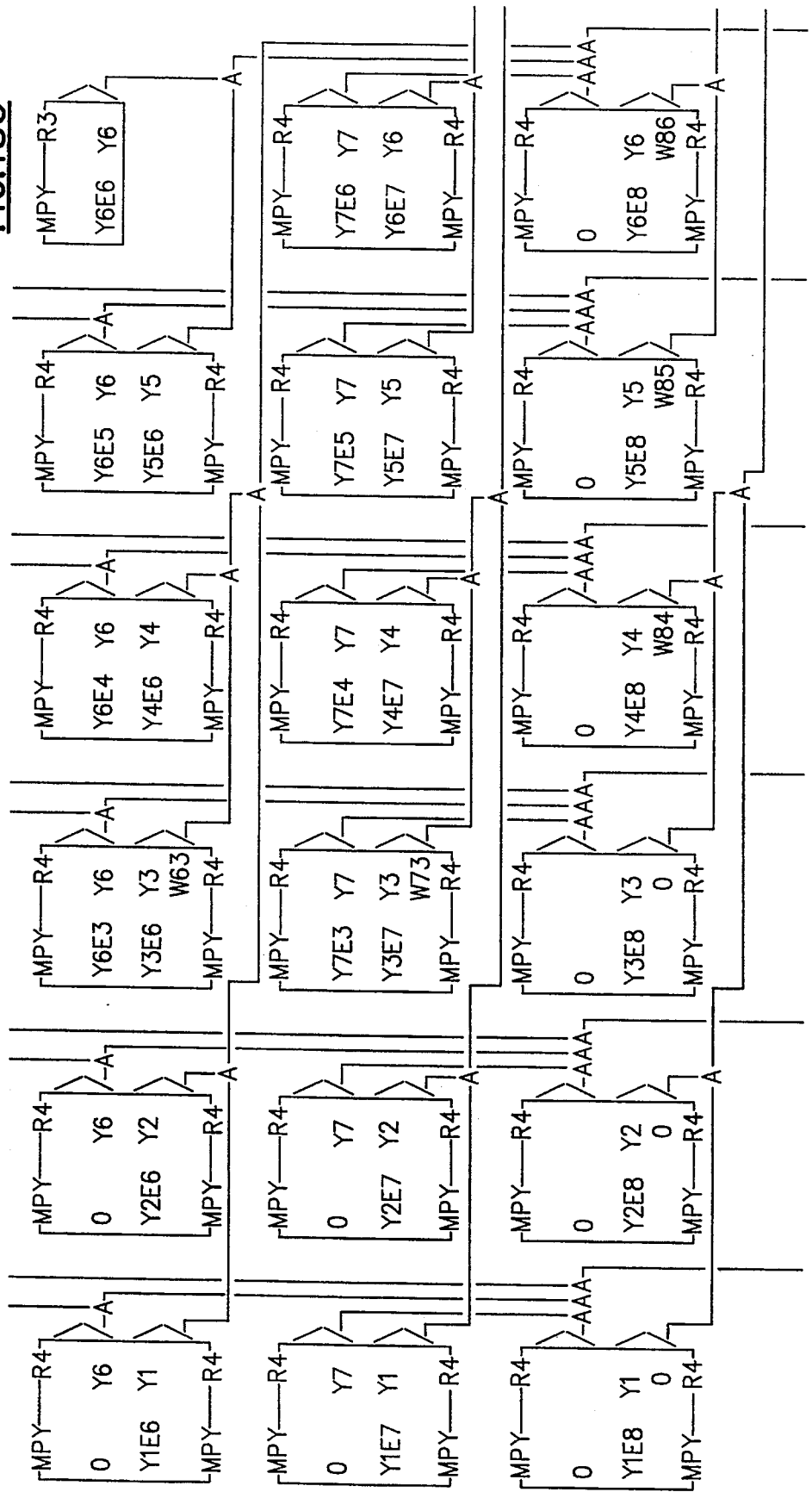
Figure 18D:
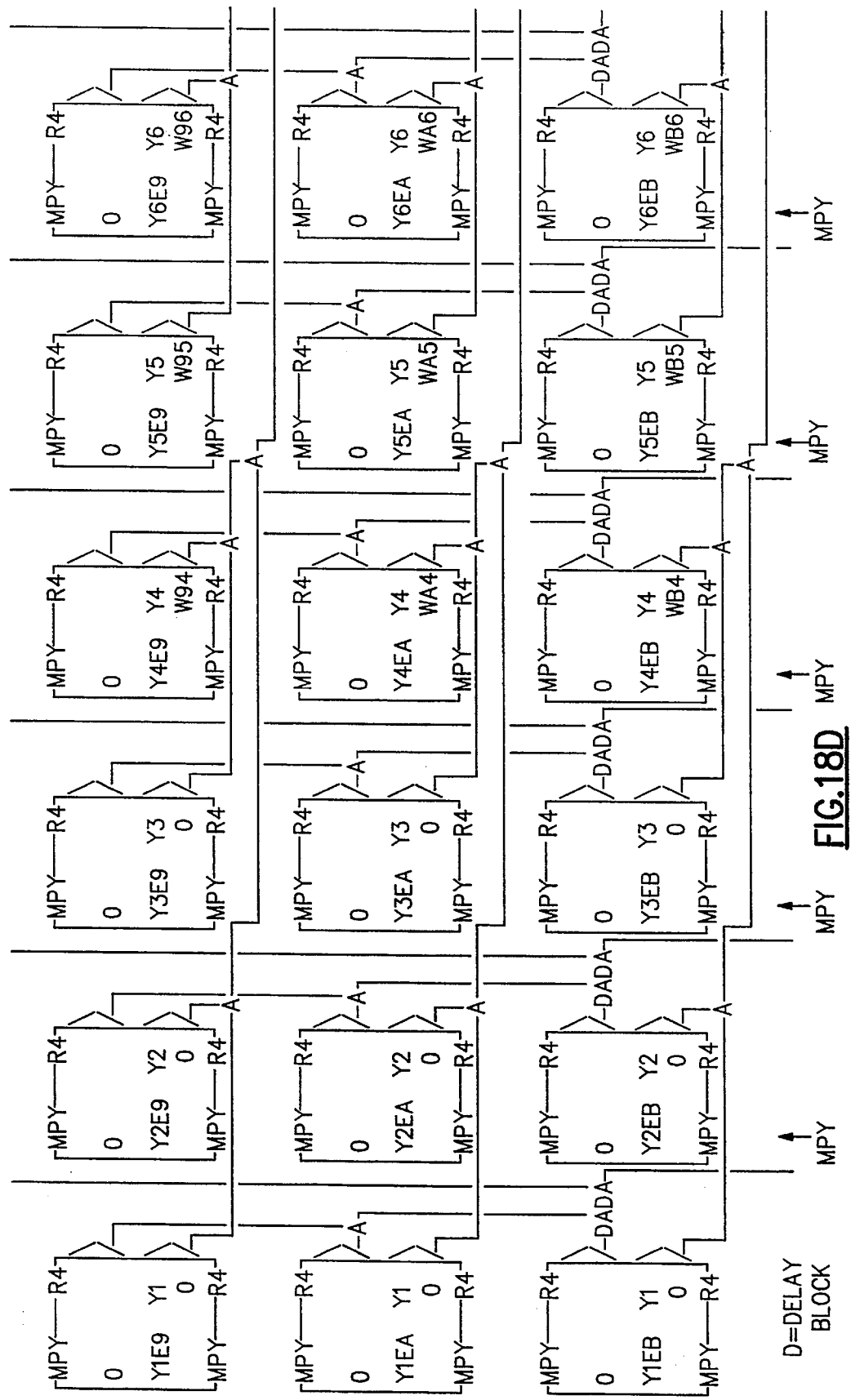
Figure 18E:
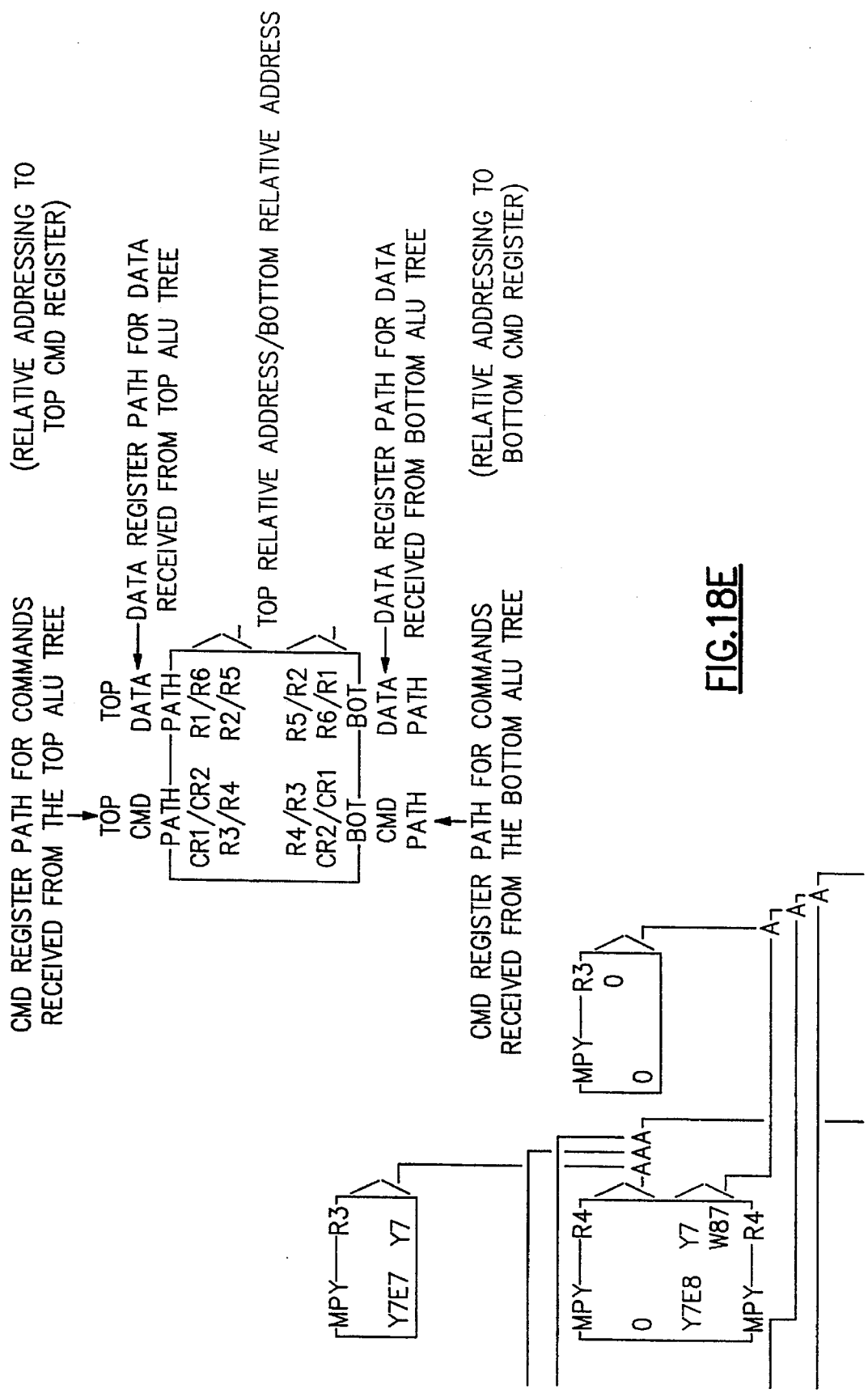
Figure 18F:
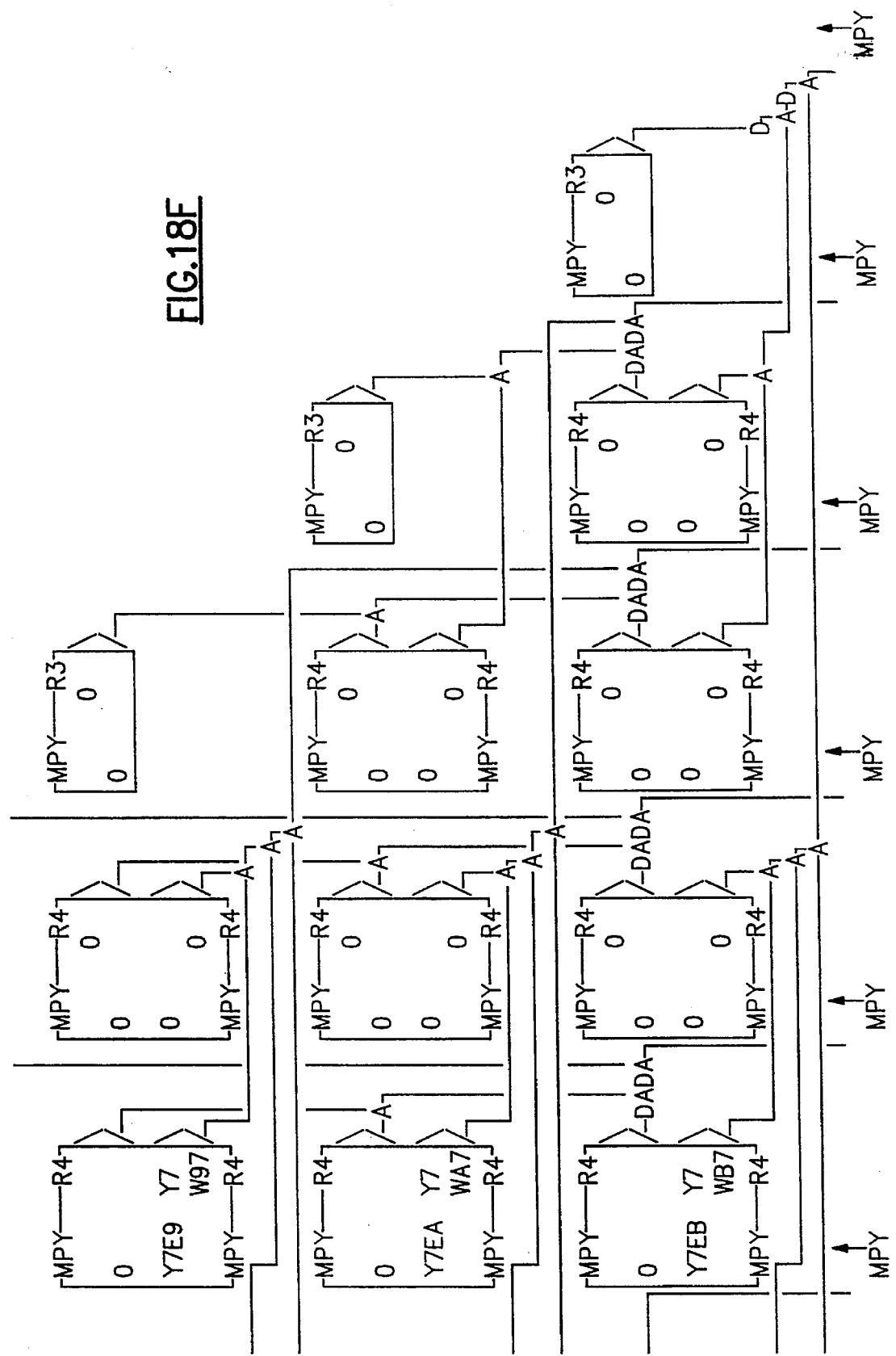
Figure 19A:
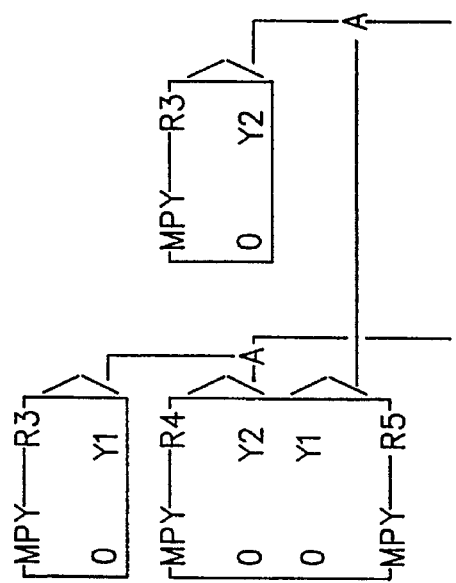
Figure 19B:
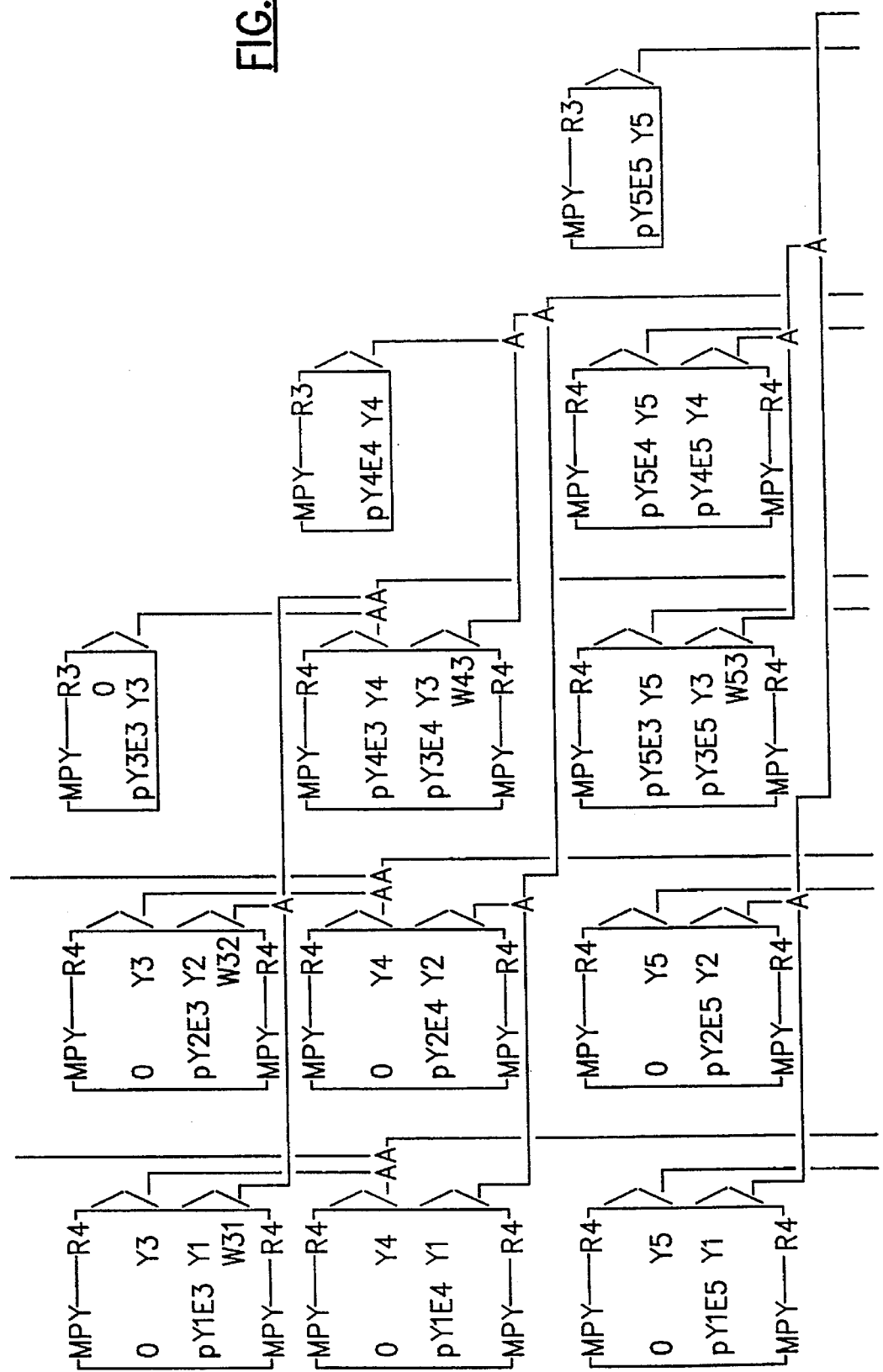
Figure 19D:
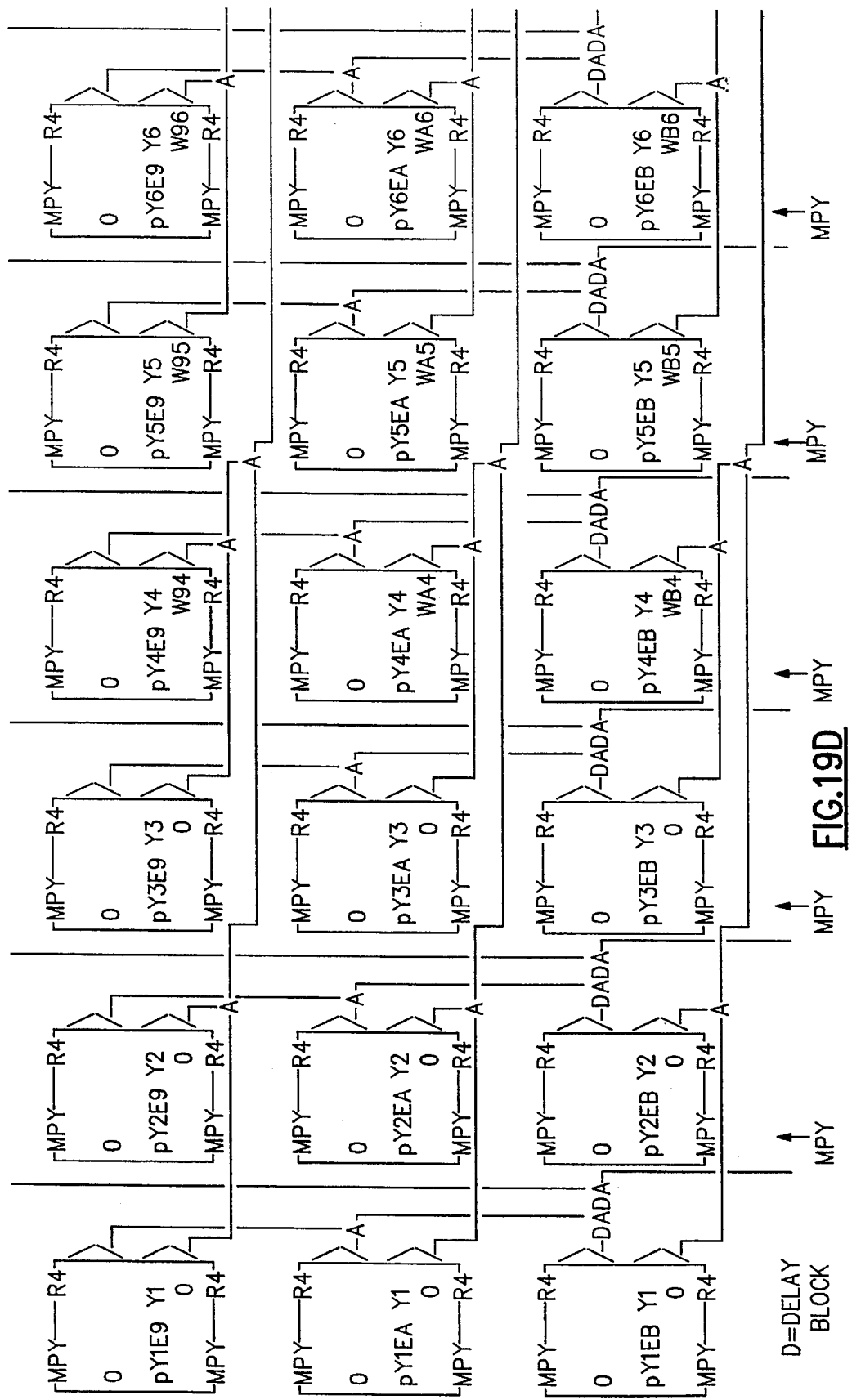
Figure 19E:
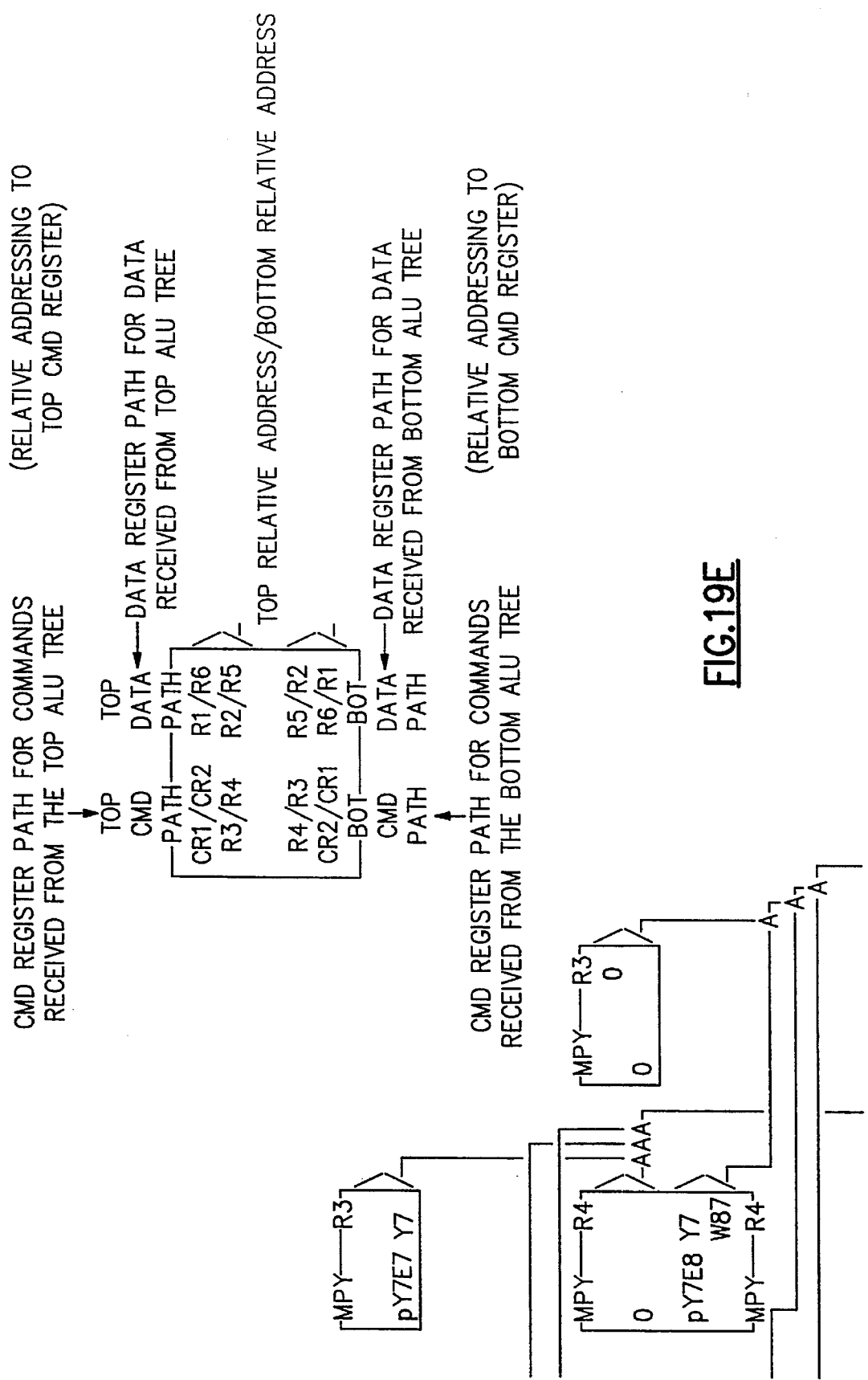
Figure 19F:
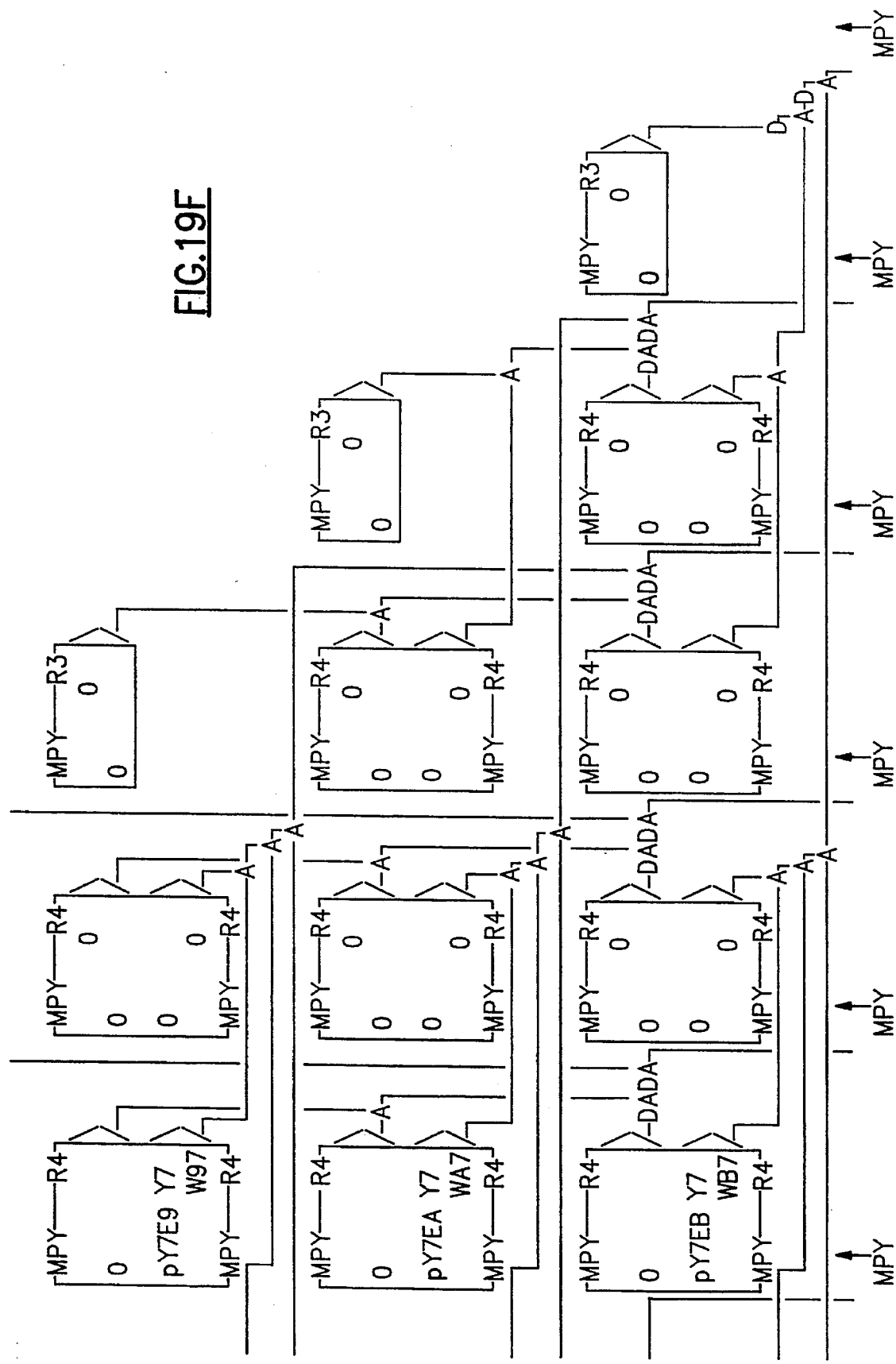
Figures 20, 20A:
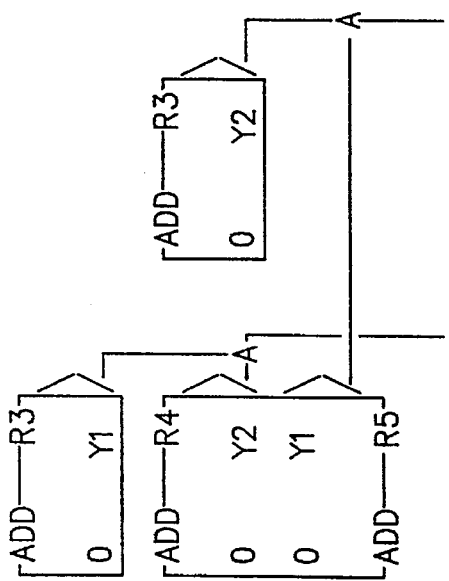
Figure 20B:
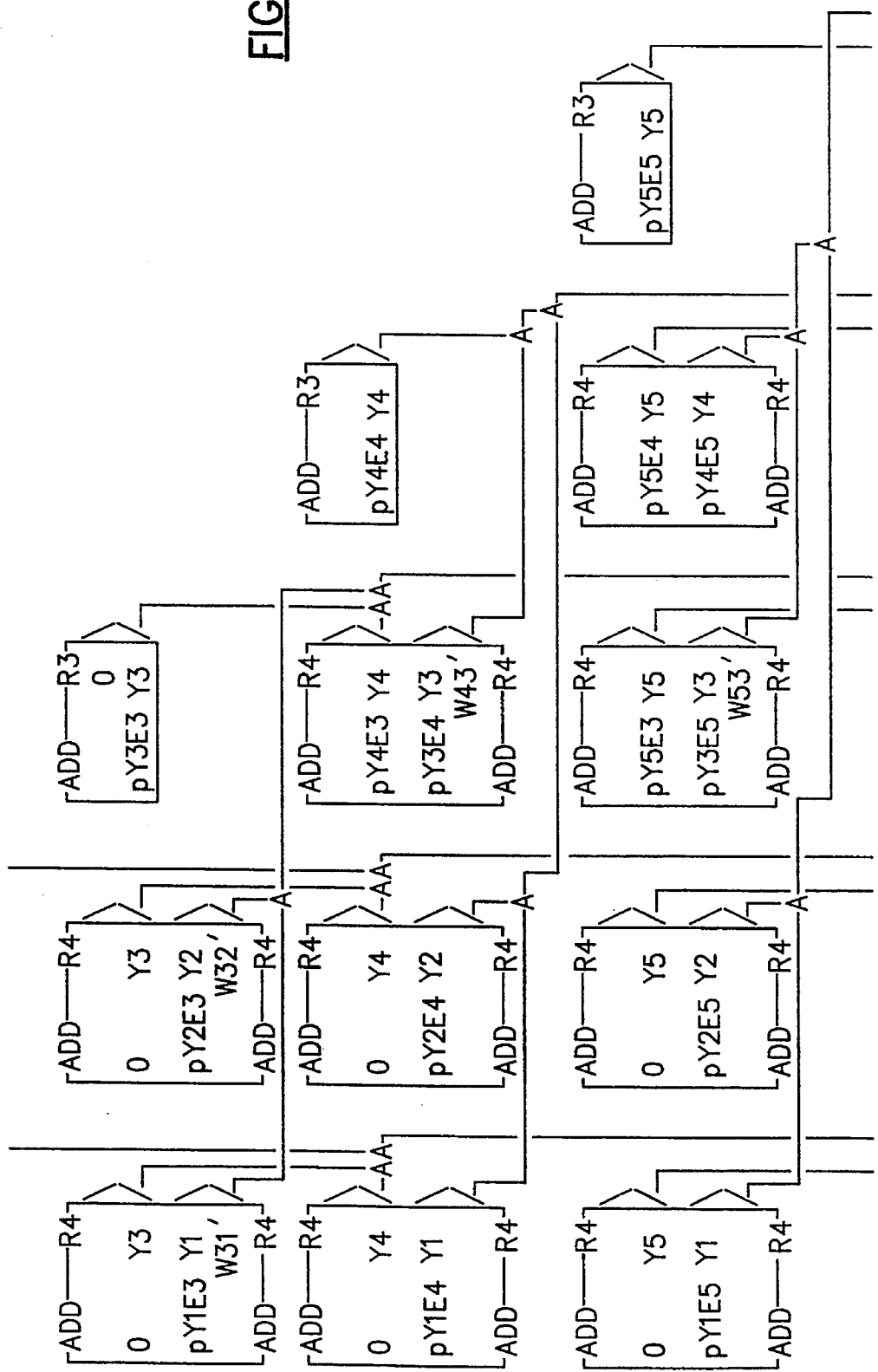
Figure 20C:
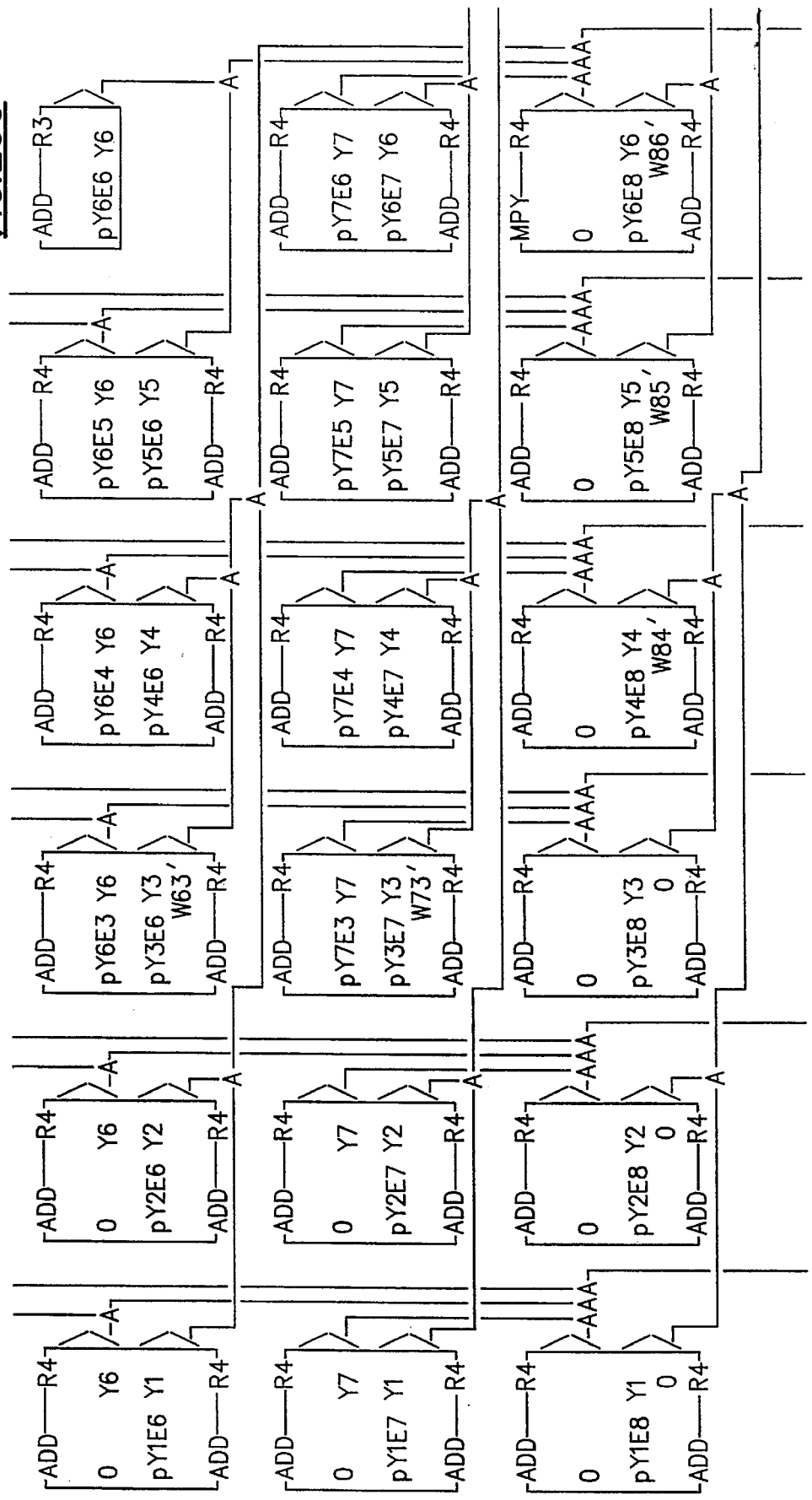
Figure 20D:
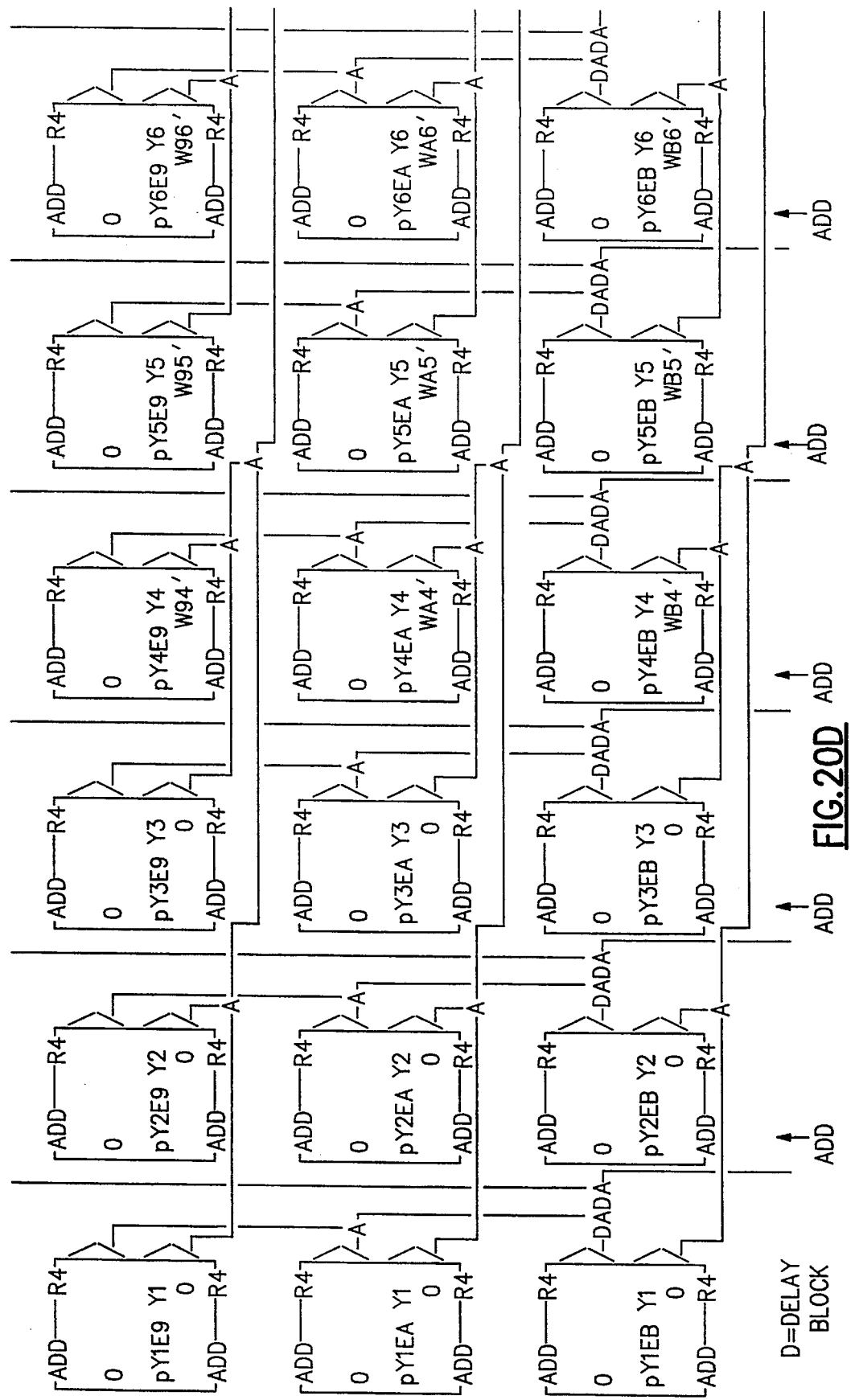
Figure 20E:
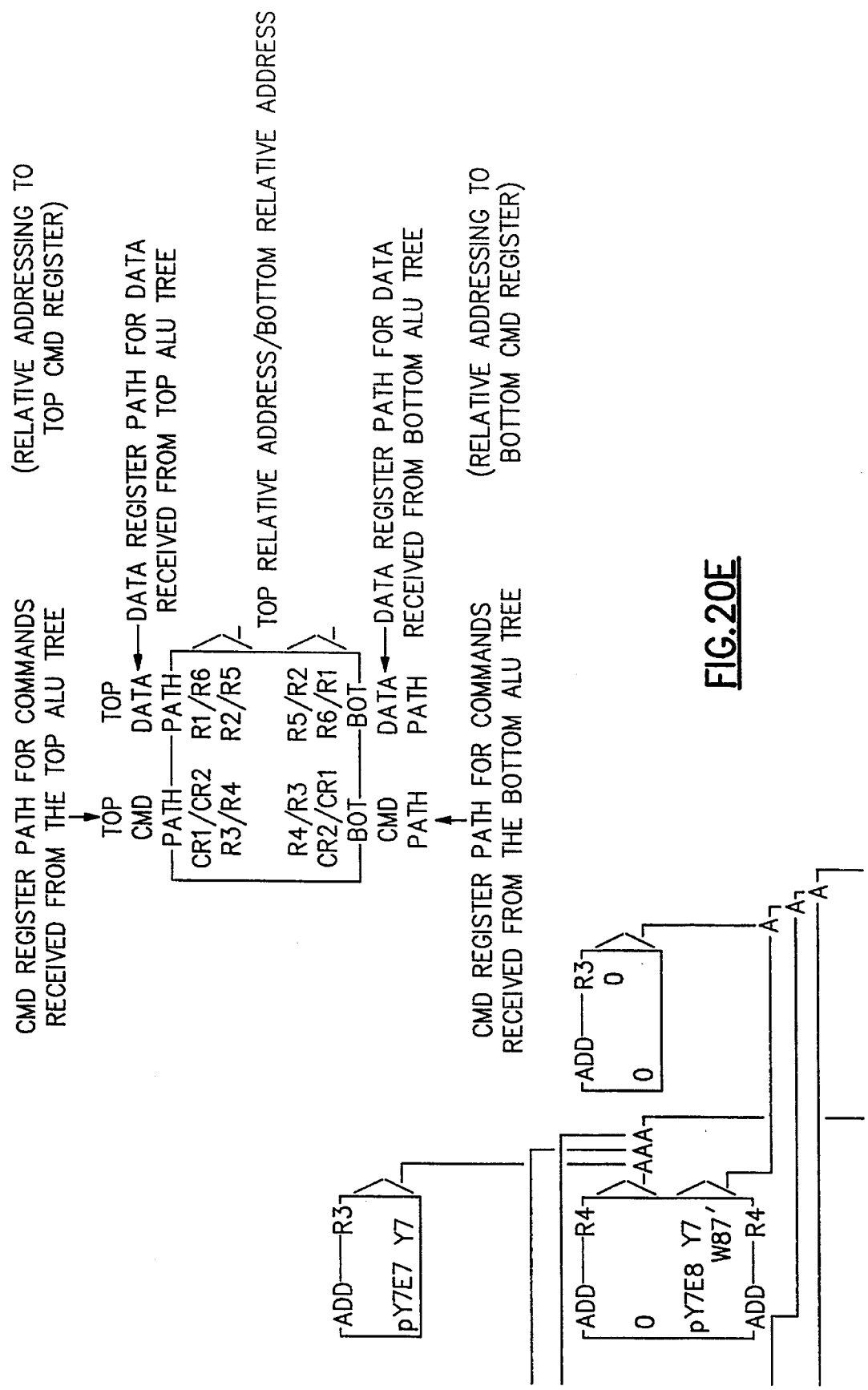
Figure 20F:
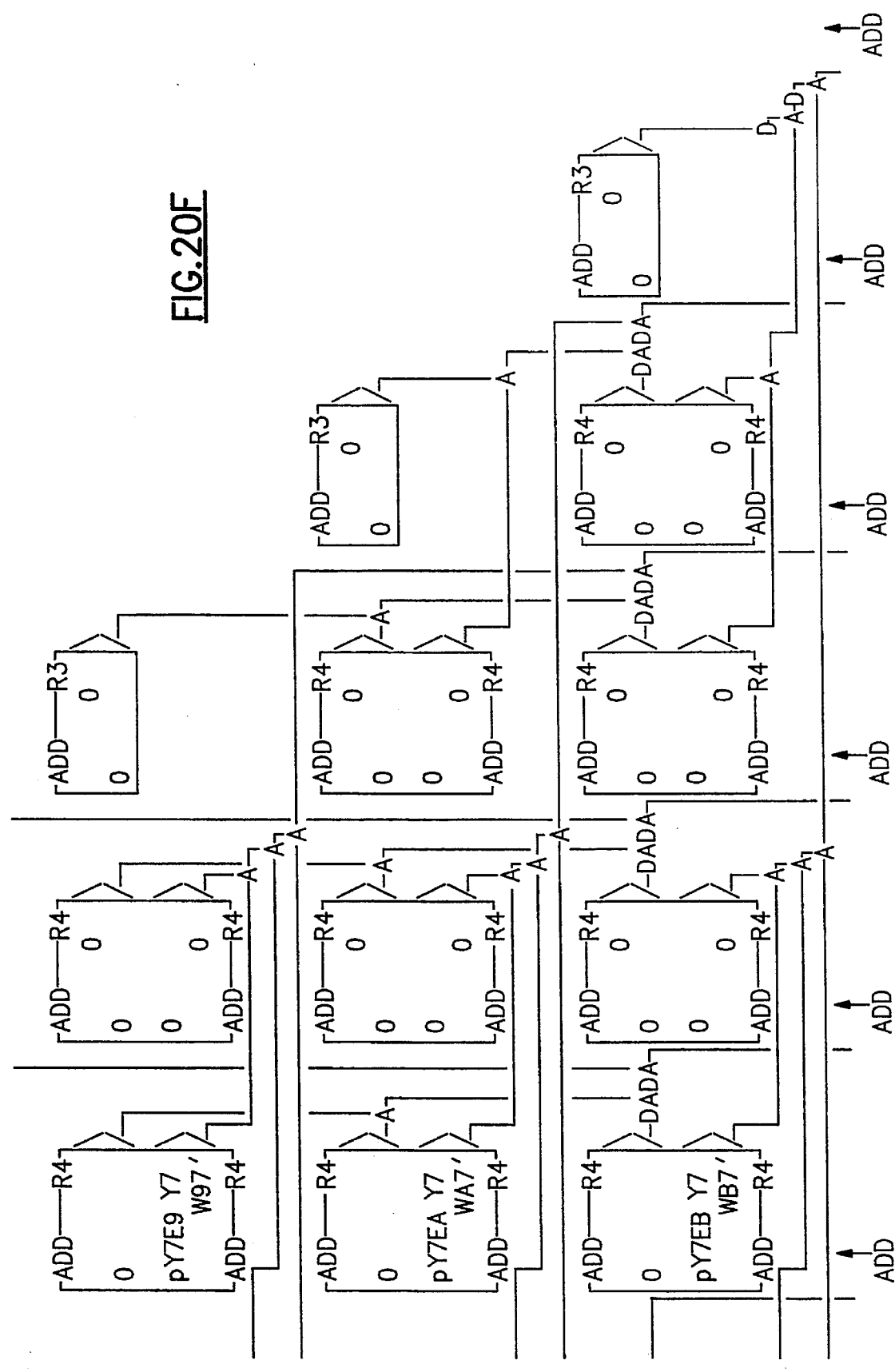

FIG. 9 shows the general 11 neuron GPLM with each neuron's CMD, Weight, Y value, and Temp. register values for a completely connected 11 neuron structure but with the learning processor, sigmoid, and derivative blocks removed for clarity. There are Ceiling ($\log_2 N$) adder stages used with delay blocks, equivalent to an adder stage delay, used as required. The ceiling function takes the next largest integer of the operand value, i.e. Ceiling ($\log_2 11 = 3.459...$)=4.

During execution mode, the Y values are calculated layer by layer, layer 1 first whose Y value results are used for layer 2, and continuing through the layers. After all K layers of neurons have been processed the network is placed into a learning mode. The output neurons calculate the error signals from the output layer and then reverse communicate the error signal values through the tree to the synapse processing cells. The back-propagation of error signals is done layer by layer beginning at the output layer and continuing to the input layer. By executing the proper instructions in the various synapse processors, the back-propagation algorithm can be executed.

A detailed example with ordered procedures will explain how the input/output encoder learning problem is implemented with a back-propagation algorithm when mapped onto the GPLM.

For some pattern p (in general the superscript p is removed for clarity), the following itemized procedure is followed in the GPLM neurocomputer: The "no-connection" weights are blanked out for clarity. The positions of the registers as viewed relative to the command register are shown in FIG. 9.

1. GPLM is initialized by scanning in the initial set of weight values with the weight register's CEB bit set to a "1" as shown in FIG. 10. The other weight values and all Y value registers are scanned in with a zero value.

2. After initialization GPLM is placed into execution mode and an input pattern applied, EX1 and EX2. The default path is assumed for the General Synapse Processors. Specifically, commands received from the top ADD tree go to CR2, the bottom command register, and commands received from the bottom ADD tree go to CR2, the top command register. Data received from the top ADD tree goes to R5 the $Y_i$ register and data received from the bottom ADD tree goes to R5 the $Y_j$ register. (Relative addressing is assumed.)

3. Neurons 1, 2, . . . , 11 issue MPYA R1*R2→ADD TREE. (Where the ADD tree is specified for the summation operation.) The automatic mode is used to improve performance by not having to reissue the multiply instruction for each layer of the network execution. Since the Y value registers in the GPLM structure are initially zero, all weight times Y values will produce a zero product which when summed produce a zero summation value.

4. The first layer of neurons is executed on the GPLM structure creating the first layer neuron outputs and their derivatives, FIG. 10. (The learning processor ignores the other neuron output values, namely $Y_3, Y_4, \ldots, Y_{11}$.)

- $Y_1 = F(Ex_1)$
- $Y_2 = F(Ex_2)$
- $Dr_1 = Y_1(1-Y_1)$
- $Dr_2 = Y_2(1-Y_2)$

5. The first layer neuron outputs are fed back into GPLM, and the second layer of neurons is executed creating the second layer of neuron outputs and their derivatives, FIG. 11. (Only neuron 3 responds as no data or commands are reverse communicated for the other neurons, and only neuron 3 has a valid weight, weight register CEB=1, and Y value product.) •

Reverse communicate $Y_1$ and $Y_2$.

- $Y_3 = F(W_{3,1}Y_1 + W_{3,2}Y_2)$
- $Dr_3 = Y_3(1-Y_3)$

6. This continues until all layers have been executed, and the network output and their derivatives are obtained, FIGS. 12 and 13.

- Reverse communicate $Y_3$
- $Y_4 = F(W_{4,3}Y_3)$
- $Y_5 = F(W_{5,3}Y_3)$
- $Y_6 = F(W_{6,3}Y_3)$
- $Y_7 = F(W_{7,3}Y_3)$
- $Dr_4 = Y_4(1-Y_4)$
- $Dr_5 = Y_5(1-Y_5)$
- $Dr_6 = Y_6(1-Y_6)$
- $Dr_7 = Y_7(1-Y_7)$
- Reverse communicate $Y_4, Y_5, Y_6,$ and $Y_7$
- $Y_8 = F(W_{8,4}Y_4 + W_{8,5}Y_5 + W_{8,6}Y_6 + W_{8,7}Y_7)$
- $Y_9 = F(W_{9,4}Y_4 + W_{9,5}Y_5 + W_{9,6}Y_6 + W_{9,7}Y_7)$
- $Y_{10} = F(W_{10,4}Y_4 + W_{10,5}Y_5 + W_{10,6}Y_6 + W_{10,7}Y_7)$
- $Y_{11} = F(W_{11,4}Y_4 + W_{11,5}Y_5 + W_{11,6}Y_6 + W_{11,7}Y_7)$
- $Dr_8 = Y_8(1-Y_8)$
- $Dr_9 = Y_9(1-Y_9)$
- $Dr_{10} = Y_{10}(1-Y_{10})$

- $Dr_{11} = Y_{11}(1-Y_{11})$

7. After all 11 neuron values and their derivatives have been calculated and placed into a Y value and Y derivative array, GPLM is placed into the learning mode.

8. The learning processor checks the $Y_i$s for convergence to the minimum specified error. If reached, the learning process can be stopped for pattern p. If the convergence has not been reached, the learning for pattern p continues.

ConvergenceTest$Y_8 = |(t_8 - Y_8)| \leq$ MinimumError

- ConvergenceTest$Y_9 = |(t_9 - Y_9)| \leq$ MinimumError
- ConvergenceTest$Y_{10} = |(t_{10} - Y_{10})| \leq$ MinimumError
- ConvergenceTest$Y_{11} = |(t_{11} - Y_{11})| \leq$ MinimumError 9. The learning processor calculates the $\delta_i^p$ for the output neurons for use in updating the weights between the output neurons and the neurons in the previous layer.

$$\delta_i^p = (t_i^p - Y_i^p) Dr_i^p$$

- $\delta_8 = E8 = (t_8 - Y_8) Dr_8$
- $\delta_9 = E9 = (t_9 - Y_9) Dr_9$
- $\delta_{10} = E10 = (t_{10} - Y_{10}) Dr_{10}$
- $\delta_{11} = E11 = (t_{11} - Y_{11}) Dr_{11}$ 10. The data path is changed and the error signals are then reverse communicated to their respective multiplier input cells temporary registers, FIG. 14.

- Neurons 1, 2, . . . , 11 change the data path by issuing PATH R4. The issuance of PATH R4 stops the automatic multiply mode specified by MPYA issued in step 3 above. The data being received goes to the relative address R4 temporary register in the GSYPs and R3 in the DSYPs. The command path remains unchanged.
- E8, E9, E10, and E11 are reverse communicated from the $Y_8, Y_9, Y_{10},$ and $Y_{11}$ source points.

11. Issue MPY instruction to multiply the error signals times the appropriate weights. The products are summed, creating the error summations, $ER_i^p$, to be used in the next layer back weight modification process, FIG. 15. Since the command path was not changed, i.e. top ADD tree command to bottom command register (CR2) and bottom ADD tree command to top command register (CR2), the error signals are residing in R3 the temporary register address relative to the received commands.

$$ER_i^p = \sum_{c=m+1}^{N} \delta_c^p W_{ci} \qquad (25)$$

Where $m = M_1 + M_2 + \ldots + M_L$

- Neurons 8, 9, 10, and 11 issue MPY R6*R3→ADD TREE. Valid sum of products will only be obtained through the GSYP's top ADD trees as the bottom commands R6 (weight register relative to the bottom command) weight register CEB bit is equal to zero.
- $ER_4 = W_{8,4}E8 + W_{9,4}E9 + W_{10,4}E10 + W_{11,4}E11$
- $ER_5 = W_{8,5}E8 + W_{9,5}E9 + W_{10,5}E10 + W_{11,5}E11$
- $ER_6 = W_{8,6}E8 + W_{9,6}E9 + W_{10,6}E10 + W_{11,6}E11$
- $ER_7 = W_{8,7}E8 + W_{9,7}E9 + W_{10,7}E10 + W_{11,7}E11$ 12. The error signals in layer L are calculated for use in the next layer previous to L, if present, by using equation 21 in terms of the newly calculated derivative, equation 24, and error summation equation 25, FIG. 16. Neuron 3 will be placed in YINMODE via PATH CR1, Neuron 3 will then be issued a multiply command, and finally Neuron 3 will be placed in YOUTMODE via PATH CR2 to be consistent with the other neurons in the GPLM structure.

$$\delta_i^p = Dr_i^p ER_i^p \qquad (26)$$

- $\delta_4 = E4 = Dr_4 ER_4$
- $\delta_5 = E5 = Dr_5 ER_5$
- $\delta_6 = E6 = Dr_6 ER_6$
- $\delta_7 = E7 = Dr_7 ER_7$
- Reverse communicate E4, E5, E6, and E7 to their respective multiplier input cells.
- PATH CR1
- Neuron 3 issues MPY R6*R3→ADD TREE.
- $ER_3 = W_{4,3}E4 + W_{5,3}E5 + W_{6,3}E6 + W_{7,3}E7$
- PATH CR2

13. The error signal for layer 2 (E3) is calculated and reverse communicated in the structure, FIG. 17.

$$\delta_i^p = Dr_i^p ER_i^p \qquad (26)$$

- $\delta_3 = E3 = Dr_3 ER_3$
- Reverse communicate E3 to its respective multiplier input cells.
- Since no weights are to be adjusted in the first layer, the back-propagation algorithm can now be stopped.

14. The neurons' $\Delta W_{ij}$ can now be calculated in three instruction steps. Substituting $\delta_i = Ei$.

$$\Delta W_{ij} = \rho Y_j^p Ei^p \qquad (27)$$

a. STEP 1 - Neurons 1,2, . . ., 11 issue MPY R5*R3 → R4
  FIG. 18.
  - TEMPREG$_{3,1}$ = $Y_1 E3$
  - TEMPREG$_{3,2}$ = $Y_2 E3$
  - TEMPREG$_{4,3}$ = $Y_3 E4$
  - continuing until:
  - TEMPREG$_{11,7}$ = $Y_7 E11$ b. STEP 2 - Neurons 1,2, . . ., 11 issue MPY R4*IMD → R4
  FIG. 19, IMD contains the learning rate ρ.
  - $\Delta W_{3,1}$ = ρTEMPREG$_{3,1}$
  - $\Delta W_{3,2}$ = ρTEMPREG$_{3,2}$
  - $\Delta W_{4,3}$ = ρTEMPREG$_{4,3}$
  - continuing until:
  - $\Delta W_{11,7}$ = ρTEMPREG$_{11,7}$ c. STEP 3 - Neurons 1,2, . . ., 11 issue ADD R6 + R4 → R6
  (The new weight values are now calculated) FIG. 20 where the new weight values are indicated as W'$_{ij}$.
  New $W_{ij}$ = OLD $W_{ij}$ + $\Delta W_{ij}$   equation 23 for all neurons
  - W'$_{3,1}$ = $W_{3,1}$ + $\Delta W_{3,1}$
  - W'$_{3,2}$ = $W_{3,2}$ + $\Delta W_{3,2}$
  - W'$_{4,3}$ = $W_{4,3}$ + $\Delta W_{4,3}$
  - continuing until:
  - W'$_{11,7}$ = $W_{11,7}$ + $\Delta W_{11,7}$ 15. A new path command is sent in preparation for the next learning cycle, PATH R2, so that the new Y values are sent to the proper registers.

16. GPLM is placed in execution mode, and the existing pattern p is applied again until the adjusted weights allow the output pattern to match the teaching pattern with a minimum specified error. Until the minimum specified error is reached, GPLM will alternate between execution mode and learning mode. After convergence to the minimum specific error is reached, a new pattern can be applied and the process repeated until all teaching patterns have been applied.

| FEED-FORWARD EXECUTION AND BACK-PROPAGATION PERFORMANCE |
|---|
| The steps for various modes of exeuction are illustrated hereinbelow. |

EXECUTION MODE:
First Layer Timing:

MPYA instruction issue: $(L - 1) + (\log_2 N)\delta_A$
MPY plus ADD tree: $\delta_M + (\log_2 N)\delta_A + \delta_A$
Sigmoid delay: $\delta_S$
Second Layer Timing:

Reverse communicate Y values overlapped with sigmoid delay: $(\log_2 N)\delta_A$
MPY plus ADD tree: $\delta_M + (\log_2 N)\delta_A + \delta_A$ Sigmoid delay: $\delta_S$
This continues for all K layers such that in general for K layers the feed-
forward execution delay is: (Note that each layer is done sequentially.)
$(L - 1) + K(\delta_M + 2(\log_2 N)\delta_A + \delta_A + \delta_S)$
LEARNING MODE:
New definitions are:

$\delta_{Ei}$ = Error signal calculation delay.
$\delta_{CT}$ = Convergence test delay.
$\delta_{CMD/ND} = (L - 1) + (\log_2 N)\delta_A$ delay for communicating a command (CMD)
or separate non overlapped data (ND).
$\delta_{ADD} = L\delta_A + 1$
L bit length of data and command words.
Assuming no weighted inputs on the first layer that need to be calculated, as
in the input/output encoder neural network, and all Y value derivatives are
available, then:
Set Up:

Convergence test and PATH command: $\delta_{CT} + \delta_{CMD}$
First Back-Propagation:

Calculate error signals, reverse communicate the calculated error signals:
$\delta_{Ei} + \delta_{ND}$
MPY and sum error signals: $\delta_{CMD} + \delta_M + (\log_2 N)\delta_A$
Second Back-Propagation:

Calculate error signals, issue PATH, reverse communicate the calculated
error signals: $\delta_{Ei} + \delta_{ND}$, and issue PATH.
MPY and sum error signals: $\delta_{CMD} + \delta_M + (\log_2 N)\delta_A$
This continues for K-2 similar back-propagations such that in general for K
layers: $(K - 2)(\delta_{Ei} + \delta_{ND} + \delta_{CMD} + \delta_M + 2(\log_2 N)\delta_A)$
The final back-propagation does not require a forward summation operation,
consequently: $\delta_{Ei} + \delta_{ND}$
The final weight updating is done in three steps made up of three local com-
mands: two MPYs and one ADD: $3\delta_{CMD} + 2\delta_M + \delta_{ADD}$
Substituting for $\delta_{CMD}$ and $\delta_{ND}$ and reducing results in a learning mode timing
delay in general for K layers as:
$\delta_{CT} + \delta_{CMD} + (K - 2)(\delta_{Ei} + \delta_{ND} + \delta_{CMD} + \delta_M + 2(\log_2 N)\delta_A) + \delta_{Ei} + \delta_{ND} + 3\delta_{CMD} + 2\delta_{M + \delta AD}$
Assuming $\delta_A$ is equal to one time unit, the learning mode timing delay is
given by:
$\delta_{CT} + (K - 1)\delta_{Ei} + K\delta_M + 2(K + 1)L + (4K - 3)(\log_2 N) - 2K$
As N increases in size, the learning delay only increases by a small factor of
$\log_2 N$ and the convergence test time and error signal calculation delay time.
For example, assuming N = 128 neurons and L = 52 bits, then the learning
mode timing delay is:
$\delta_{CT(N=128)} + (K - 1)\delta_{Ei(N=128)} + K\delta_M + 130K + 83$
If N = 1024 and L = 58 bits then the learning time would be:
$\delta_{CT(N=1024)} + (K - 1)\delta_{Ei(N=1024)} + K\delta_M + 154K + 86$

BOLTZMANN LIKE MACHINE LEARNING EXAMPLE

The following discussion is not meant to be a tutorial on the Boltzmann machine—see Ackley 85—but rather a presentation of how a Botzmann algorithm, from Ackley 85, Rumelhart 86, and McClelland 88, can be mapped onto GPLM.

The Boltzmann machine is made up of a network of completely connected binary threshold neural units just as in the original Hopfield network—as in Hopfield 82. Instead of the random and asynchronous neuron selection coupled with a deterministic update rule Hopfield used, a probabilistic update rule is used on the asynchronously selected neuron units. In addition, instead of the Hopfield single layer of neurons, the Boltzmann machine can be specified as a multilayer machine with input, hidden, and output units where the input and output units can be "clamped", i.e. set to a desired value. In order to modify the connection weights, all neuron outputs must be monitored and the statistics of their activation values recorded since the change in the connection weight between two connected units is proportional to the difference in probabilities of the connected units being "on" at the same time in a free running mode versus a "clamped" mode after the network has achieved "equilibrium" in both modes. Simulated annealing involving the use of the Temperature parameter T plays an important role in the Boltzmann machine, and "equilibrium" is obtained through the control of the temperature. For the input/output encoder problem described in Ackley 85, the "equilibrium" procedure followed was that ". . . all the unclamped units were randomized with equal probability "on" or "off" (corresponding to raising the temperature to infinity), and then the network was allowed to run for the following times at the following temperatures: (2@20, 2@15, 2@12, and 4@10). After this annealing schedule it was assumed that the network had reached equilibrium, and statistics were collected at a temperature of 10 for 10 units of time. (note) One unit of time is defined as the time required for each unit to be given, on the average, one chance to change its state. This means that if there are n unclamped units, a time period of 1 involves n random probes in which some unit is given a chance to change its state.". The statistics concern how often connected pairs of units are "on" together at "equilibrium".

A Boltzmann like machine implementation of an input/output encoder problem as modeled on GPLM will be described. The network of neurons is assumed to be three layers with $M_1$, $M_2$, and $M_3$ neurons in layer 1, 2, and 3 respectively. Layers 1 and 3 are completely connected within their respective layers but are not connected to each other. Instead both layers 1 and 3 are completely connected to the hidden layer 2, in which the hidden units are not connected with each other. All weights of the indicated connections are initially set to zero with the weight CEB bit is set to a "1" for all valid connection weights. Neurons are binary having a "0" or a "1" activation state. The "on"/"off" 0 energy difference &El for the $i^{th}$ neuron is defined as:

$$\Delta E_i = \sum_{j=1}^{N} W_{ij} Y_j$$

Assuming an N neuron input/output encoder network with its specified connection weights has been initialized on GPLM and a set of known input/output patterns which can act as teachers exist, then with a random "seed" specified to allow cycle repeatability:

1. Begin a network update cycle by "clamping" the input and output units to one of the I/O encoder patterns.
   - In GPLM this is accomplished by reverse communicating the network input Y values and network output Y values to their respective synapse processor, switching the path i.e. top ADD tree values go to bottom Y value register and vise versa. Random Y values with equal probability of being "on" or "off" are chosen for the hidden units and reverse communicated in the same fashion as the input/output Y values.

2. Randomly select a hidden unit neuron for updating, as input/output units are clamped.
   - Learning processor requires a random number generator which can produce a uniformly distributed random integer between 1 and N.
   - Issue PATH command to selected neuron to change the command path so that no switch occurs, i.e. top ADD tree command to top command register and visa versa. (PATH CR1) (The data path remains unchanged.)
   - Issue MPY R1*R2→ADD TREE to the selected neuron.

3. Determine the "On" State Probability, OSP, of the selected $i^{th}$ neuron.

$$OSP_i = \frac{1}{\left(1 + e^{-\Delta \frac{E_i}{T}}\right)}$$

- The sigmoid generator must have a T parameter input loadable from the learning processor.

4. OSP is the output of the sigmoid function for the selected neuron due to the previously issued MPY R1*R2→ADD TREE instruction to the selected neuron.

5. The learning processor determines the selected neuron's activation value Y.

IF (random #≦$OSP_i$)THEN $Y_i$=1

ELSE $Y_i$=0

6. The newly updated Y value is reverse communicated in the network.

7. Continue with neuron selection and updating process until enough cycles have been run to obtain statistically significant neuron activity and the network reaches "equilibrium" through an annealing schedule, ie. varying the parameter T. The learning processor records, for the connected neurons, a value indicating how often the connected units were "on" at the same time.

8. If there are more patterns to be run, select the next input/output encoder pattern and "clamp" it on the network and run the network as defined above beginning with step 2. Continue taking statistics over all patterns run on the network.

9. After running all the patterns, the statistic values recorded represent the probability that a pair of connected neurons were "on" together. The learning processor keeps an array of the "clamped" statistics.

10. The network is "unclamped", all neuron values randomized with equal probability of being "on" or "off", and the network, following an annealing schedule, is allowed to reach "equilibrium".

11. Statistics of pairs of "on" units are then recorded for as many annealings as were done in the "clamped" mode of operation. The learning processor keeps an array of the "unclamped" statistics.

12. Two methods for updating the connection weights in the network structure are:
   a.

$$\Delta W_{ij} = \rho(p_{ij} - p'_{ij})$$

b.

$\Delta W_{ij}$=+fixed weight step–IF $p_{ij}$>$p'_{ij}$ or–fixed weight step–IF $p_{ij}$<$p'_{ij}$.

- Where: $p_{ij}$ is the average probability of a pair i, j being "on" simultaneously in the "clamp" mode and $p'_{ij}$ is the average probability of a pair i, j being "on" simultaneously in the free running mode of operation.

For example, the first weight update method above can be accomplished by using the synapse processors' Y and temp registers and a procedure, such as the following, based on a PASCAL like pseudo-code with explanations in parenthesis. The FOR loops would be translated into N parallel operations across the N neurons.

a. For i=1 to N (The next operations are done in parallel across all N neurons.)

b. -For j=1 to N shift register scan $P_{ij}$ into neuron i's Y registers. (N values scanned into Y registers in one operation done in parallel for N neurons.)

c. ---For j=1 to N shift register scan - $P'_{ij}$ into neuron i's Temp registers. (N values scanned into Temp registers in one operation done in parallel for N neurons.)

d. ----ADD R2+R3→R3, $(P_{ij}-P'_{ij})$→R3. (N ADD instructions issued in parallel, one per neuron.)

e. ----MPY R3*IMD1/2→R3, $\Delta W_{ij}$→R3. (N MPY instructions issued in parallel, one per neuron.)

f. ----ADD R1+R3→R1, $W'_{ij}$→R1. (N ADD instructions issued in parallel, one per neuron.)

g. ---END h. -END i. END

13. Repeat the process until the difference $P_{ij}-P'_{ij}$ is less than or equal to some specified minimum error.

PARALLEL DATA ALGORITHMS

MATRIX MULTIPLICATION

The neuron input sum of product calculation can be viewed as a matrix multiplication as shown in FIG. 21 where there are i columns and j rows. The neuron input matrix $z_i$ is defined as:

$$z_i = Y_1 W_{i1} Y_2 W_{i2} + \ldots + Y_N W_{iN}$$

NEURON CALCULATIONS AS MATRIX OPERATIONS

Neuron calculations are illustrated by FIG. 21. This is a subset of the general case of matrix multiplications. Consider two N×N matrices as shown in FIG. 22, with i columns and j rows.

GENERAL MATRIX MULTIPLICATION

FIG. 22 illustrates general matrix multiplication. Assuming a row of the Y value matrix is loaded into GPLM by reverse communicating a j row of the Y matrix for each result j row in result matrix z, N values of the result matrix z are calculated in parallel under the general form such as the following, based on a PASCAL like pseudo-code. The FOR loops would be translated into N parallel operations across the N neurons.

1. FOR i=1 to N
2. FOR k=1 to N $$z_{ik} = \sum_{j=1}^{N} Y_{jk} W_{ij}$$

3. END FOR
4. END FOR

The following procedure will be followed: (Delays in parenthesis assume the ADD tree stage delay $\delta_A=1$.)

1. Load W matrix (scan in values assuming N W values per neuron and scanning in the N neurons' N W values in parallel takes (NL) time)

2. Load first Y row by reverse communicating Y values $((L-1)+\log_2 N)$

3. MPYA R1*R2→ADD TREE (Where the ADD tree has been initialized for the summation process.) $((L-1)+\log_2 N)$ 4. Calculate first row of result z matrix—Multiply Y & W registers followed by summation tree $(\delta_M+\log_2 N)$ 5. Store the N z values in learning processor $(\delta_{STORE})$ 6. Reverse communicate second Y row—$((L-1)+\log_2 N)$ 7. When the new Y values have been received, calculate second row of the result z matrix—Multiply Y & W registers followed by summation tree $(\delta_M+\log_2 N)$ 8. Store the N z values in learning processor. $(\delta_{STORE})$ 9. Continue with row calculations until 10. Reverse communicate $N^{th}$ Y row—$((L-1)+\log_2 N)$ 11. When the new Y values have been received, calculate $N^{th}$ row of result z matrix—Multiply Y & W registers followed by summation tree $(\delta_M+\log_2 N)$ 12. Store final row of result z matrix in learning processor. $(\delta_{STORE})$ 13. End After the initialization of the W matrix by scanning in the W values and assuming the store operations can be overlapped with the reverse communication of the next row Y values, the total processing time for the N×N² calculations is:

$$N \times N \text{ Matrix Multiplication} = (L-1) + \log_2 N + N(\delta_M + (L-1) + 2\log_2 N) + \delta_{STORE}$$

MATRIX ADDITION AND BOOLEAN OPERATIONS

Assuming matrices of the same form as given in FIG. 22 both Y and W matrices can be loaded into GPLM structure since there are $N^2$ unique Y and W registers in the structure. Local addition or Boolean operations on the Y and W registers can be done within the structure with the result sent to the temporary registers. At completion of the operation the original Y and W matrices will remain intact in the structure and the temp registers will contain the result matrix. The result can be scanned out or individually read out from the synapse processor cells or used for further operations (chaining or linking of instructions).

While we have described our preferred embodiments of our inventions it will be understood that those skilled in the art, both now and in the future, upon the understanding of these discussions will make various improvements and enhancements thereto which fall within the scope of the claims which follow. These claims should be construed to maintain the proper protection for the inventions first disclosed.

What is claimed is:

1. A method of emulating a completely connected N neuron structure on a computer system apparatus having a neural synapse processor structure, where N is an integer greater than one, comprising the steps of:

switching N communicating adder trees to a communications mode;

loading the structure with initial weights, neuron output values, general cell data paths, and command path bits;

issuing a multiply instruction to the communicating adder trees;

receiving the multiply instruction in synapse processor units;

switching the communicating adder trees to a function mode;

multiplying neuron values by weight values;

summing the products of neuron and weight values in the communicating adder trees;

receiving and adding an external input value to the sum of the products of neuron and weight values;

generating N neuron output values from neuron activation function units;

switching the communicating adder trees to a communications mode; and issuing the neuron output values to the communicating adder trees.

2. A method of emulating back-propagation learning on a neural network device comprising the steps of:

a) initializing weight value registers and neuron output value registers;

b) switching the device to a forward execution mode and inputting into at least one first layer neuron a data pattern;

c) selected neurons each issuing a multiply instruction and a portion of said selected neurons specifying one of a plurality of adder trees each coupled to each one of said portion of said selected neurons for carrying out a summation operation;

d) executing a first layer of said selected neurons for creating first neuron layer outputs and derivatives;

e) feeding the first layer neuron outputs back into the device including reverse communicating the first layer neuron outputs and executing a second layer of neurons for creating second neuron layer outputs and derivatives;

f) executing remaining layers of neurons in succession, each succeeding layer executing after a previously executed layer has fed its outputs back into the device;

g) switching the device into a learning mode after all layers of neuron outputs and derivatives have been stored in neuron output and derivative arrays; and h) checking neuron outputs for convergence to specified values with a minimum specified error and terminating the learning mode if the minimum specified error is reached.

3. A method of emulating back-propagation learning according to claim 2, wherein if the minimum specified error is not reached, further comprising the steps of:

i) reverse communicating error signals to respective multiplier input cells;

j) multiplying the error signals by appropriate weights and specifying an adder tree for a summation operation producing an error summation value;

k) calculating a product of the error summation values and a derivative for a previous layer's error signals to produce newly calculated error signals;

l) reverse communicating the newly calculated error signals to their respective multiplier input cells;

m) repeating steps j)–l) until all layer error signals have been calculated and reverse communicated;

n) calculating in each synapse processing unit an amount the weight values are to change using the reverse communicated error signals;

o) updating old weight values stored in the synapse processors by adding changes in weight values to the old weight values stored in the synapse processors;

p) switching to the forward execution mode and executing each network layer until all layers have been executed;

q) switching to learning mode and testing for convergence to expected values within a specified error; and r) repeating steps i)–q) until convergence within the specified error is reached or it is determined by a programmable processor controlling apparatus to stop the method of emulation.

4. A method of emulating a Boltzmann machine on a neural network device by asynchronously executing individual neurons, comprising the steps of:

a) clamping input and output neuron units to a selected encoder pattern including reverse communicating network input values and network output values to their respective neuron units;

b) randomly selecting a hidden neuron unit for updating including issuing to the hidden neuron unit a multiply command and a command to select one of a plurality of coupled adder trees for carrying out a summation;

c) determining an on-state probability of the selected hidden neuron unit;

d) determining the selected hidden neuron unit's activation value;

e) reverse communicating the activation value through the network;

f) continuing steps b–e until the network reaches equilibrium as defined by an annealing schedule;

g) selecting a remaining encoder pattern and, if any, repeating steps a–f; and h) storing performance statistics over all the encoder patterns run on the network which represents a probability that a pair of connected neurons were "on" simultaneously.

5. The method according to claim 4, further comprising the steps of:

i) unclamping the network and randomly assigning values to all the neuron units;

j) following the annealing schedule until the network reaches equilibrium;

k) storing statistics for pairs of "on" neurons recorded during clamped and unclamped annealings;

l) calculating a change in weight values and multiplying by a learning rate;

m) adding the change in weight values to an old weight value;

n) repeating steps a)–m) until the clamped and unclamped annealing statistics indicate a difference in probability within a minimum specified error.

6. The method according to claim 4, wherein the step a) includes commanding a general neuron unit to store a top adder tree value in a bottom output value register and a bottom adder tree values in a top output value register.

7. The method according to claim 4, wherein the step b) includes commanding the hidden neuron unit to store a top adder tree value in a top output value register and a bottom adder tree value in a bottom output value register.

8. A method for performing matrix multiplication on a neural network device via parallel operation of the synapse processors comprising the steps of:

a) loading a synapse processor array with matrix values of a first matrix;

b) loading a second synapse processor array with first row matrix values of a second matrix by reverse communicating the first row matrix values through communicating adder trees;

c) issuing a multiply instruction and initializing the communicating adder trees for a summation operation;

d) calculating first row values of a result matrix by multiplying the matrix values of the first matrix by the first row matrix values of the second matrix followed by the summation operation;

e) storing the values of the result matrix in a programmable processor controlling apparatus;

f) loading next row matrix values, if any, of the second matrix by reverse communication through the communicating adder trees;

g) if the loading of next row matrix values of step f) was performed, calculating next row values of a result matrix by multiplying the matrix values of the first matrix by the next row matrix values of the second matrix followed by the summation operation;

h) if the calculation of next row values of step g) was performed, storing the next row values of the result matrix in the programmable processor controlling apparatus; and i) repeating steps f)–h) until a final row of the result matrix is calculated and stored.

* * * * *